United States Patent
Qiao

(10) Patent No.: US 9,875,298 B2
(45) Date of Patent: Jan. 23, 2018

(54) AUTOMATIC GENERATION OF A SEARCH QUERY

(75) Inventor: Hong Liang Qiao, Epping (AU)

(73) Assignee: LEXXE PTY LTD, Epping, NSW (AU)

( * ) Notice: Subject to any disclaimer, the term of this patent is extended or adjusted under 35 U.S.C. 154(b) by 272 days.

(21) Appl. No.: 13/595,168

(22) Filed: Aug. 27, 2012

(65) Prior Publication Data

US 2012/0323904 A1  Dec. 20, 2012

Related U.S. Application Data

(63) Continuation-in-part of application No. 13/012,690, filed on Jan. 24, 2011, which is a continuation-in-part of application No. 12/112,774, filed on Apr. 30, 2008.

(60) Provisional application No. 61/298,166, filed on Jan. 25, 2010, provisional application No. 60/998,810, filed on Oct. 12, 2007, provisional application No. 60/999,813, filed on Oct. 18, 2007, provisional application No. 61/535,895, filed on Sep. 16, 2011.

(51) Int. Cl.
   *G06F 17/30* (2006.01)

(52) U.S. Cl.
   CPC .. *G06F 17/30672* (2013.01); *G06F 17/30731* (2013.01); *G06F 17/30864* (2013.01); *G06F 17/30867* (2013.01)

(58) Field of Classification Search
   CPC .................................................. G06F 17/30672
   USPC ............................................. 707/708; 704/9
   See application file for complete search history.

(56) References Cited

U.S. PATENT DOCUMENTS

| 5,151,857 A | * | 9/1992 | Matsui ............................. 704/9 |
| 6,189,002 B1 | * | 2/2001 | Roitblat ............. G06F 17/3061 |
| 7,117,207 B1 | * | 10/2006 | Kerschberg ....... G06F 17/30702 |
| 7,213,205 B1 | * | 5/2007 | Miwa et al. .................. 715/234 |
| 7,827,125 B1 | * | 11/2010 | Rennison ............ G06F 17/3066 706/14 |
| 8,015,183 B2 | | 9/2011 | Frank |

(Continued)

FOREIGN PATENT DOCUMENTS

| KR | 1020000050225 | 8/2000 |
| KR | 1020070052028 | 5/2007 |
| KR | 1020080017686 | 2/2008 |

OTHER PUBLICATIONS

Demartini, Gianluca, "ARES: A Retrieval Engine Based on Sentiments," Proceedings of the 33ed European Conferennce on Advances in Information Retrival, Apr. 18, 2011.

(Continued)

*Primary Examiner* — Boris Gorney
*Assistant Examiner* — Bao Tran

(57) ABSTRACT

A method, computer-readable medium, and system for automatic generation of a search query are disclosed. A semantic key may be automatically recognized in a first search query, thereby allowing a second search query to be automatically generated based on the first search query. A first search may be performed using the second search query. Search results generated responsive to the first search may include one or more instances of at least one semantic sub-key associated with the semantic key. In this manner, more relevant search results may be returned while relieving the user of manually entering the semantic key separately from the search query keywords and/or demarcating the semantic key and the search query keywords.

14 Claims, 48 Drawing Sheets

(56) References Cited

U.S. PATENT DOCUMENTS

| | | |
|---|---|---|
| 8,856,096 B2 | 10/2014 | Marchisio et al. |
| 9,286,377 B2 | 3/2016 | Cheslow |
| 9,396,262 B2 | 7/2016 | Qiao |
| 2002/0178152 A1 | 11/2002 | Azzam |
| 2003/0115187 A1 | 6/2003 | Bode et al. |
| 2003/0130993 A1 | 7/2003 | Mendelevitch et al. |
| 2004/0054661 A1 | 3/2004 | Cheung et al. |
| 2005/0108212 A1 | 5/2005 | Karimisetty et al. |
| 2005/0154690 A1 | 7/2005 | Nitta et al. |
| 2005/0267871 A1 | 12/2005 | Marchisio et al. |
| 2005/0278321 A1* | 12/2005 | Vailaya ............ G06F 17/30864 |
| 2006/0010111 A1 | 1/2006 | Jones et al. |
| 2006/0031216 A1* | 2/2006 | Semple et al. .................... 707/4 |
| 2006/0041549 A1 | 2/2006 | Gundersen et al. |
| 2006/0173821 A1* | 8/2006 | Hennum et al. ................. 707/3 |
| 2006/0184516 A1 | 8/2006 | Ellis |
| 2006/0235689 A1 | 10/2006 | Sugihara et al. |
| 2006/0235843 A1 | 10/2006 | Musgrove et al. |
| 2007/0106657 A1 | 5/2007 | Brzeski et al. |
| 2007/0288248 A1 | 12/2007 | Raunch |
| 2008/0114750 A1 | 5/2008 | Saxena et al. |
| 2008/0120279 A1 | 5/2008 | Xue |
| 2008/0172377 A1 | 7/2008 | Kapadia et al. |
| 2009/0043749 A1 | 2/2009 | Garg et al. |
| 2009/0055390 A1 | 2/2009 | Maeda et al. |
| 2009/0063472 A1* | 3/2009 | Pell .................. G06F 17/30696 |
| 2009/0089047 A1* | 4/2009 | Pell et al. ........................ 704/9 |
| 2009/0100042 A1 | 4/2009 | Qiao |
| 2009/0182737 A1 | 7/2009 | Melman |
| 2009/0222445 A1* | 9/2009 | Tavor .................. G06F 17/2217 |
| 2009/0248511 A1 | 10/2009 | Mehta et al. |
| 2010/0057725 A1 | 3/2010 | Matsumura |
| 2011/0119261 A1 | 5/2011 | Qiao |

OTHER PUBLICATIONS

Hu et al., "Mining and summarizing Customer Reviews," Proceedings of the Tenth ACM SIGKDD International Conference on Knowledge Discovery and Datat Mining, 2004.

Liu et al., "Opinion Observer: Analysing and Comparing Opinions on the Web," Proceedings of the 14th International Conference on World Wide Web, pp. 342-351, 2005.

Liu et al., "Opinion Searching in Multi-Product Reviews" of the Sixth IEEE International Conference on Computer and Information Technology, 2006.

Magnini et al., "A WordNet-Based Approach to Named Entitites Recognition," in proceedings of the SemaNet'02 workshop entitled "Building and Using Semantic Networks," 2002.

Popescu et al., "Extracting Product Features and Opinions from Reviews," Proceedings of the Conference on Human Language Technology and Emperical Methods in Natural Language Processing, 2005.

Qiao, Hong Liang, "Lexxe Search Engine," from http://www.hcsnet.edu.au, Sep. 2006.

* cited by examiner

1700

| Semantic Key | Semantic Sub-Key |
|---|---|
| Fruit | Apple |
| | Cherry |
| Computer Brand | Apple |
| | Dell |
| | Toshiba |

| Word | Document | Location |
|---|---|---|
| Apple | $D_1$ | $L_A$ |
| | $D_2$ | $L_E$ |
| | $D_3$ | $L_F$ |
| | $D_{10}$ | $L_B$ |
| Cherry | $D_4$ | $L_C$ |
| | $D_5$ | $L_D$ |
| Dell | $D_6$ | $L_G$ |
| | $D_8$ | $L_H$ |
| Toshiba | $D_7$ | $L_I$ |
| | $D_9$ | $L_J$ |

| Semantic Key | Semantic Sub-Key | Document | Location |
|---|---|---|---|
| Fruit | Apple | $D_1$ | $L_A$ |
| | | $D_{10}$ | $L_B$ |
| | Cherry | $D_2$ | $L_C$ |
| | | $D_5$ | $L_D$ |
| Computer Brand | Apple | $D_2$ | $L_E$ |
| | | $D_3$ | $L_F$ |
| | Dell | $D_6$ | $L_G$ |
| | | $D_8$ | $L_H$ |
| | Toshiba | $D_7$ | $L_I$ |
| | | $D_9$ | $L_J$ |

| Semantic Key | Semantic Sub-Key | Attribute |
|---|---|---|
| United States State Flower | Poppy | California |
| | Orange Blossom | Florida |
| | Rose | New York |

| Semantic Sub-Key Set 1 | Semantic Sub-Key Set 2 |
|---|---|
| apples | $2.99 |
| apples | $1.99 |
| oranges | $0.99 |
| watermelon | $5.99 |
| grapes | $3.99 |
| grapes | $3.99 |
| grapes | $3.49 |

| | | |
|---|---|---|
| apples | $1.99 | 5% |
| | $2.99 | 23% |
| grapes | $3.49 | 15% |
| | $3.99 | 20% |
| oranges | $0.99 | 10% |
| watermelon | $5.99 | 27% |

| oranges | $0.99 | 10% |
| --- | --- | --- |
| apples | $1.99 | 5% |
|  | $2.99 | 23% |
| grapes | $3.49 | 15% |
|  | $3.99 | 20% |
| watermelon | $5.99 | 27% |

| apples | $1.99 | 5% |
|---|---|---|
| oranges | $0.99 | 10% |
| grapes | $3.49 | 15% |
| | $3.99 | 20% |
| apples | $2.99 | 23% |
| watermelon | $5.99 | 27% |

| Semantic Key | Semantic Sub-Key | Attribute |
|---|---|---|
| River | Nile River | Africa, African |
| | Amazon River | South America, South American |
| | Yangtze River | Asia, Asian |
| | Mississippi River | North America, North American |
| | Yenisei River | Europe, European |
| | Yellow River | Asia, Asian |
| | Mekong River | Asia, Asian |

AUTOMATIC GENERATION OF A SEARCH QUERY

RELATED APPLICATIONS

The present application is a continuation-in-part of U.S. patent application Ser. No. 13/012,690, filed Jan. 24, 2011, entitled "SEARCHING USING SEMANTIC KEYS," naming Hong Liang Qiao as the inventor, which claims the benefit of U.S. Provisional Patent Application No. 61/298,166, filed Jan. 25, 2010, entitled "SYSTEM AND METHOD FOR ENHANCING SEARCH RELEVANCY USING SEMANTIC KEYS," naming Hong Liang Qiao as the inventor, where U.S. patent application Ser. No. 13/012,690 is a continuation-in-part of U.S. patent application Ser. No. 12/112,774, filed Apr. 30, 2008, entitled "SYSTEM AND METHOD FOR ENHANCING SEARCH RELEVANCY USING SEMANTIC KEYS," naming Hong Liang Qiao as the inventor, which claims the benefit of U.S. Provisional Patent Application No. 60/998,810, filed Oct. 12, 2007, entitled "SYSTEM AND METHOD FOR ENHANCING SEARCH RELEVANCY WITH SEMANTIC KEYS," naming Hong Liang Qiao as the inventor, and which also claims the benefit of U.S. Provisional Patent Application No. 60/999,813, filed Oct. 18, 2007, entitled "SYSTEM AND METHOD FOR ENHANCING SEARCH RELEVANCY WITH SEMANTIC KEYS," naming Hong Liang Qiao as the inventor. Those applications are incorporated herein by reference in their entirety and for all purposes.

The present application also claims the benefit of U.S. Provisional Patent Application No. 61/535,895, filed Sep. 16, 2011, entitled "AUTOMATIC RECOGNITION OF SEMANTIC KEYS IN SEARCH QUERIES," naming Hong Liang Qiao as the inventor. That application is incorporated herein by reference in its entirety and for all purposes.

The present application is related to U.S. patent application Ser. No. 13/595,230, filed Aug. 27, 2012, entitled "RANKING DATA UTILIZING MULTIPLE SEMANTIC KEYS IN A SEARCH QUERY," naming Hong Liang Qiao as the inventor. That application is incorporated herein by reference in its entirety and for all purposes.

The present application is related to U.S. patent application Ser. No. 13/595,257, filed Aug. 27, 2012, entitled "SYSTEM AND METHOD FOR ORDERING OF SEMANTIC SUB-KEYS," naming Hong Liang Qiao as the inventor. That application is incorporated herein by reference in its entirety and for all purposes.

The present application is related to U.S. patent application Ser. No. 13/595,290, filed Aug. 27, 2012, entitled "RANKING DATA UTILIZING ATTRIBUTES ASSOCIATED WITH SEMANTIC SUB-KEYS," naming Hong Liang Qiao as the inventor. That application is incorporated herein by reference in its entirety and for all purposes.

BACKGROUND OF THE INVENTION

Conventional search engines commonly use keywords from a user-input search query to locate and display webpages. For example, if a user were interested in learning about which countries border the United States, the user may enter a search query of "country bordering United States." In response, a conventional search engine may return webpages with all or some of the four words "country," "bordering," "United," and "States."

However, such a query would likely return a large number (e.g., tens of millions) of irrelevant or undesired webpages. For example, the results may contain webpages about country music in the United States, general information about the Unites States, etc. As such, users generally perform overly restrictive searches to narrow the number of results to a more manageable amount, thereby excluding many relevant webpages from the results. Thus, finding relevant information on the Internet using conventional keyword-based search engines can be tedious and time-consuming.

The number of relevant results returned by conventional search engines is further limited by the literal nature of the conventional keyword search methodology. For example, webpages may use synonyms or other words related to the keywords entered in the search query, but not use one or more of the exact keywords. In this case, conventional keyword-based search engines may not include these webpages in the search results, especially where a more restrictive search is used (e.g., using an "and" operator, or other type of operator, between keywords of the search query). Accordingly, searching for relevant information using conventional search engines is made even more cumbersome given the literal nature of conventional keyword searches.

Further, some conventional search engines rank search results based on the relevance of the webpages to keywords of the user-input search query. Although this may reorganize the search results, it does not solve the above-mentioned problems of returning irrelevant search results and other problems caused by the literal nature of conventional keyword-based search engines.

SUMMARY OF THE INVENTION

Accordingly, a need exists for a search engine and/or search methodology which returns more relevant results. A need also exists for a search engine and/or search methodology which allows a broader search to be performed while reducing the number of irrelevant results. Additionally, a need exists for a search engine and/or search methodology which returns relevant results in a less tedious and time-consuming manner. Embodiments of the present invention provide novel solutions to these needs and others as described below.

Embodiments of the present invention are directed to a method, computer-readable medium, and system for automatic generation of a search query. More specifically, a semantic key may be automatically recognized in a first search query (e.g., input by user), thereby allowing a second search query (e.g., including at least one keyword and excluding the semantic key) to be automatically generated based on the first search query. A first search may be performed using the second search query. Search results generated responsive to the first search may include one or more instances of at least one semantic sub-key associated with the semantic key. In this manner, more relevant search results may be returned while relieving the user of manually entering the semantic key separately from the search query keywords and/or demarcating the semantic key and the search query keywords.

A second search may be performed based on the first search query in one embodiment. Search results generated responsive to the first and second searches may be analyzed to automatically determine which search results to output for presentation (e.g., to a user via a graphical user interface). The analysis may involve determining the most relevant set of search results by scoring the sets of search results based on one or more parameters, where the most relevant set of search results may be output. The analysis may involve determining a ratio of a quantity associated with the search results of the first search to a quantity associated with the search results of the second search, where the search results of the first search may be output if the ratio exceeds a predetermined threshold. In this manner, a set of search results for output may be automatically selected from multiple sets of search results, thereby allowing more relevant search results to be output in some cases.

In one embodiment, a user may be presented with an option to switch between the sets of search results. For example, a graphical user interface may include an element allowing a user to selectively display search results of the first search and/or search results of the second search. In this manner, a user may quickly determine which set of search results is preferable and/or most relevant, whether the automatically-selected set of search results is preferable and/or most relevant, etc.

The second search query may be generated responsive to determining that a second portion of the first search query (e.g., separate from the first portion including the semantic key) is associated with a predetermined part of speech (e.g., a relative pronoun, an interrogative pronoun, a preposition, a verb, etc.) in one embodiment. In this case, the second search query may be generated such that it is free of the first portion and the second portion (e.g., that were included in or part of the first search query). As such, automatic recognition of a predetermined part of speech in the first search query may provide one or more advantages (e.g., more efficient generation of the second search query by automatically demarcating the semantic key and at least one keyword in the first search query, more relevant search results may be provided by excluding the second portion of the first search query, confirmation of the decision to output search results generated based on the second search query, etc.).

In one embodiment, it may be determined whether a first portion of the first search query (e.g., including the semantic key) and a second portion of the first search query (e.g., including one or more words separate from the semantic key) are associated with a phrase. If it is determined that the first and second portions are not associated with a phrase, then the second search query (e.g., excluding the semantic key) may be generated. Alternatively, if it is determined that the first and second portions are associated with a phrase, then the second search query may not be generated. Accordingly, the first and second portions of the search query may be advantageously used to more efficiently provide search results.

In one embodiment, a computer-implemented method of automated generation of a search query includes accessing a first search query. The method also includes determining that a first portion of the first search query includes a semantic key. Responsive to the determining, a second search query is automatically generated based on the first search query, wherein the second search query is free of the first portion, and wherein the second search query is different from the first search query. A first search may be performed based on the second search query, wherein first search results generated responsive to the first search include a plurality of documents, and wherein each document of the plurality of documents includes at least one respective instance of at least one semantic sub-key associated with the semantic key.

In another embodiment, a computer-readable medium may have computer-readable program code embodied therein for causing a computer system to perform a method of automated generation of a search query. And in one embodiment, a system may include a processor and a memory, wherein the memory includes instructions for causing the processor to implement a method of automated generation of a search query.

BRIEF DESCRIPTION OF THE DRAWINGS

The present invention is illustrated by way of example, and not by way of limitation, in the figures of the accompanying drawings and in which like reference numerals refer to similar elements.

FIG. 17 shows an exemplary table of semantic keys and semantic sub-keys in accordance with one embodiment of the present invention.

FIG. 18 shows an exemplary inverted index in accordance with one embodiment of the present invention.

FIG. 19 shows an exemplary semantic key database in accordance with one embodiment of the present invention.

FIG. 24 shows an exemplary semantic key database including at least one attribute in accordance with one embodiment of the present invention.

FIG. 27 shows an exemplary on-screen graphical user interface for presenting search results in accordance with one embodiment of the present invention.

FIG. 38 shows an exemplary data structure including a plurality of sets of semantic sub-keys associated with semantic keys in accordance with one embodiment of the present invention.

FIG. 39A shows an exemplary data structure depicting a first ordering of data in accordance with one embodiment of the present invention.

FIG. 39B shows an exemplary data structure depicting a second ordering of data in accordance with one embodiment of the present invention.

FIG. 39C shows an exemplary data structure depicting a third ordering of data in accordance with one embodiment of the present invention.

FIG. 41 shows an exemplary data structure including at least one attribute associated with at least one semantic sub-key in accordance with one embodiment of the present invention.

DETAILED DESCRIPTION OF THE INVENTION

Figure 1:
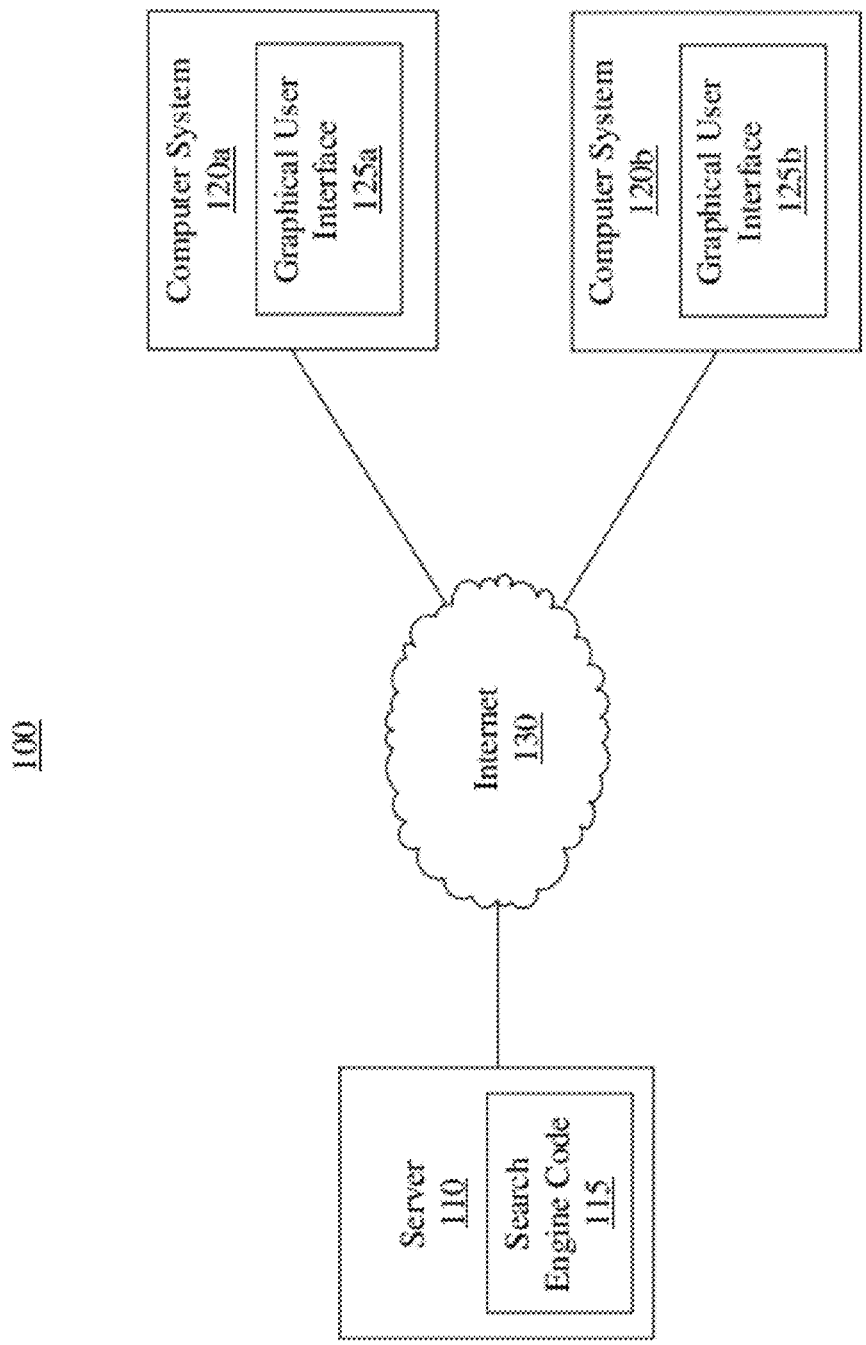
FIG. 1 shows an exemplary system for implementing a search engine in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "creating," "debugging," "defining," "depicting," "detecting," "determining," "displaying," "establishing," "executing," "filtering," "flipping," "generating," "grouping," "hiding," "identifying," "initiating," "interacting," "matching," "modifying," "monitoring," "moving," "ordering," "outputting," "performing," "placing," "presenting," "processing," "programming," "querying," "ranking," "removing," "repeating," "resuming," "sampling," "selecting," "simulating," "sorting," "storing," "subtracting," "suspending," "tracking," "transcoding," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments Of The Invention

FIG. 1 shows exemplary system 100 for implementing a search engine (e.g., an Internet-based search engine) in accordance with one embodiment of the present invention. As shown in FIG. 1, server 110 may comprise search engine code 115 for implementing a process of searching for webpages (e.g., in accordance with 200 of FIG. 2). Server 110 may communicate with one or more computer systems (e.g., 120a, 120b, etc.) via Internet 130 in one embodiment, thereby enabling the search engine code (e.g., 115) to communicate with one or more graphical user interfaces (e.g., 125a of computer system 120a, 125b of computer system 120b, etc.). The graphical user interfaces (e.g., 125a, 125b, etc.) may communicate inputs (e.g., search queries input by a user, commands to initiate a webpage search, etc.) to the search engine code (e.g., 115), and may also display or otherwise present outputs (e.g., results of the webpage search, etc.) received from search engine code. In this manner, the graphical user interfaces (e.g., 125a, 125b, etc.) may implement a graphical user interface (e.g., 1300 of FIGS. 13 and 14) for performing searches of webpages.

Although FIG. 1 shows only two computer systems (e.g., 120a and 120b), it should be appreciated that a larger or smaller number of computer systems may be used in other embodiments. It should also be appreciated that one or more networks, network device, etc. may be coupled to or otherwise used to implement communication between components of system 100 (e.g., server 110, computer system 120a, computer system 120b, etc.). It should also be appreciated that server 110 may communicate with coupled computer systems (e.g., 120a, 120b, etc.) via an intranet (e.g., in place of internet 130, in addition to internet 130, etc.) in one embodiment. Additionally, although only one server (e.g., 110) is depicted in FIG. 1, it should be appreciated that system 100 may comprise a larger number of servers in other embodiments. Further, it should be appreciated that system 100 may comprise additional components (e.g., one or more memories coupled to internet 130 and/or directly to sever 110 for storing search engine code 115, for storing data accessed by server 110 and/or search engine code 115, etc.) in other embodiments.

Figure 2:
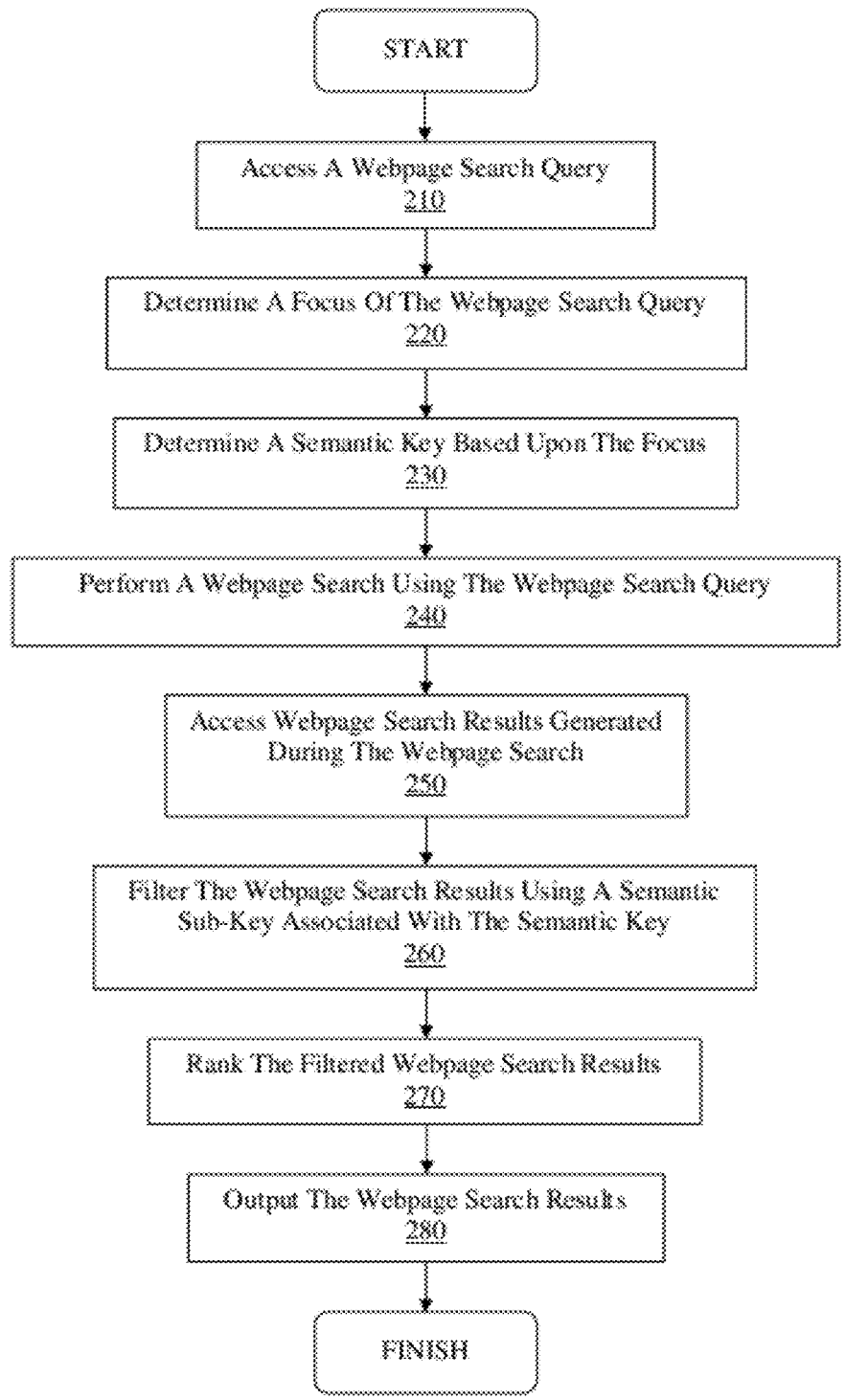
FIG. 2 shows an exemplary flow diagram of a computer-implemented process for performing webpage searches in accordance with one embodiment of the present invention.

FIG. 2 shows an exemplary flow diagram of computer-implemented process 200 for performing webpage searches in accordance with one embodiment of the present invention. As the steps of process 200 are described herein, reference will be made to exemplary data flow diagram 300 of FIG. 3, and to system 100 of FIG. 1, to provide examples and help clarify the discussion.

Figure 3:
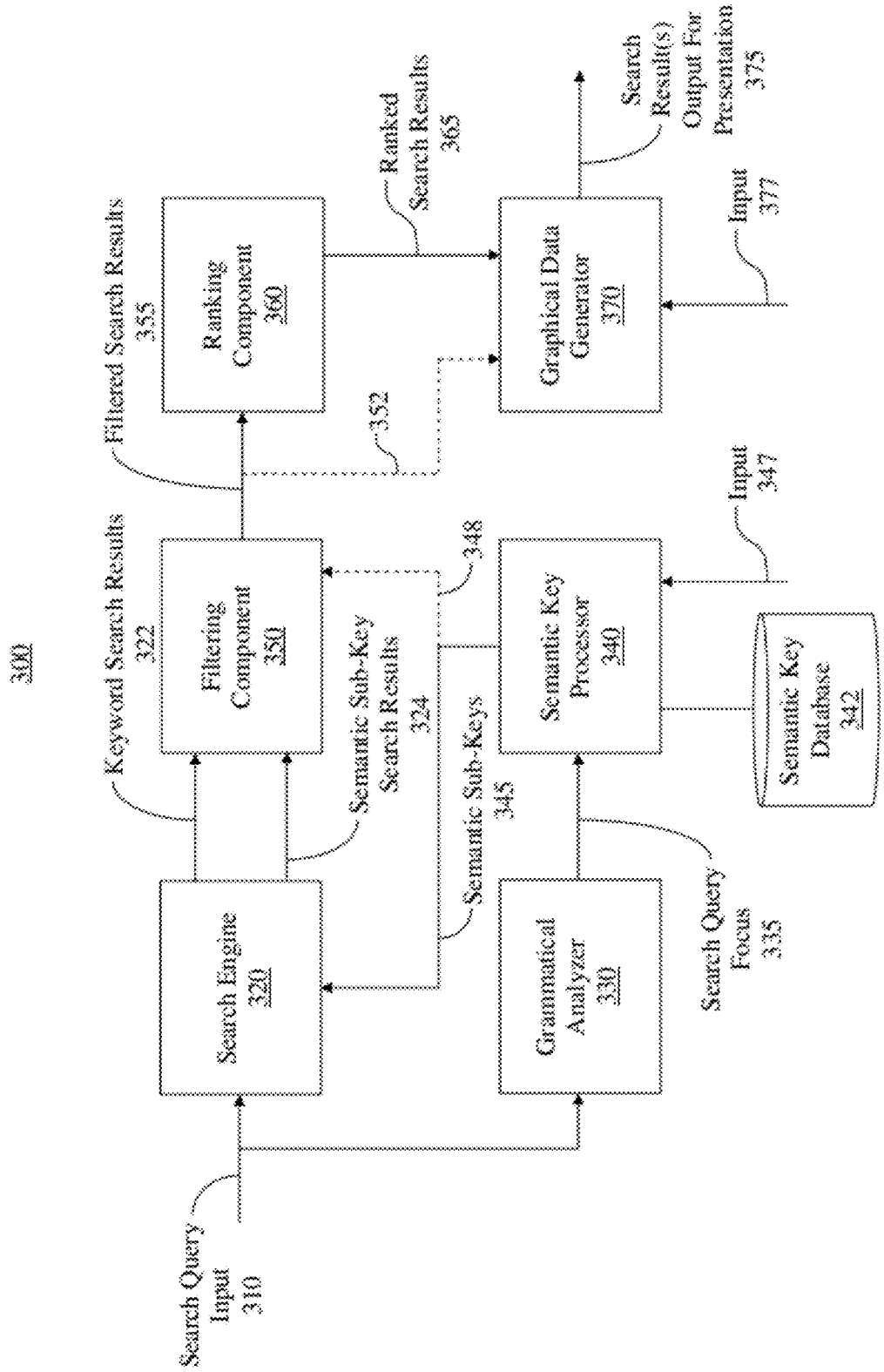
FIG. 3 shows an exemplary data flow diagram of the performance of webpage searches in accordance with one embodiment of the present invention.

Turning briefly to FIG. 3, a broad keyword search may be performed by search engine 320, where the results from the broad keyword search may be subsequently filtered by filtering component 350. Filtering component 350 may filter the search results based upon one or more semantic keys (e.g., accessed from semantic key database 342) determined based upon a focus of the search query (e.g., used by search engine 320 to perform the broad keyword search), where the one or more semantic keys may have at least one associated semantic sub-key. Accordingly, the broad keyword search may provide more complete search results (e.g., omitting fewer relevant search results) which may then be filtered (e.g., by filtering component 350) to reduce the number of irrelevant search results and provide more relevant search results. The search results may then be ranked (e.g., by ranking component 360) in one embodiment, thereby generating ranked search results which are more complete and relevant than those produced by conventional search engines.

As shown in FIG. 2, step 210 involves accessing a webpage search query. The webpage search query (e.g., 310) may be input to a search engine (e.g., 320) in one embodiment. The search query (e.g., 310) may comprise at least one word and/or at least one phrase. Additionally, in one embodiment, the search query (e.g., 310) may comprise at least one operator (e.g., "and," "or," etc.) and/or other data for controlling the search performed by the search engine (e.g., 320).

Step 220 involves determining a focus of the webpage search query. Step 220 may be performed by a grammatical analyzer (e.g., 330) operable to access the search query (e.g., 310) and output a search query focus (e.g., 335) in one embodiment. The focus of the search query may comprise a keyword or phrase of the search query which relates to the information desired by the user inputting the search query. Additionally, where the search query is a question, the focus of the query may comprise a keyword or phrase of the search query which may be used to determine the form and/or content of an answer. For example, if the search query were the question "how tall is the Eiffel Tower," then the focus of the search query may be determined to be the keyword "tall" which relates to a distance. As such, the answer may comprise a distance relating to the height of the Eiffel Tower. As another example, if the search query were the question "which countries border the United States," then the focus of the search query may be determined to be the keyword "countries." As such, the answer may comprise a listing of countries which border the United States.

Figure 4:
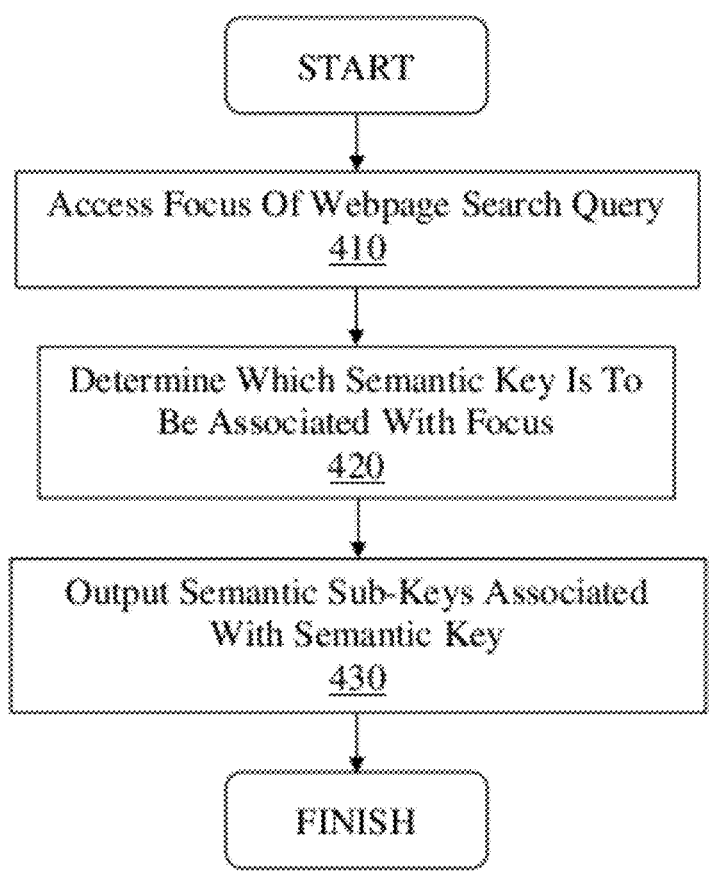
FIG. 4 shows an exemplary flow diagram of a computer-implemented process for determining a semantic key based upon a focus of a search query in accordance with one embodiment of the present invention.

As shown in FIG. 2, step 230 involves determining a semantic key based upon the focus. In one embodiment, step 230 may be performed in accordance with process 400 of FIG. 4. As shown in FIG. 4, step 410 involves accessing a focus (e.g., 335) of a webpage search query (e.g., 310). Step 420 involves determining which semantic key is to be associated with the focus. The semantic key may be determined (e.g., by semantic key generator 340) by comparing the focus (e.g., 335) with possible semantic keys (e.g., stored in semantic key database 342) in one embodiment. Upon finding a match between the focus (e.g., 335) and a semantic key (e.g., 510), or an association between the two, the matched and/or associated semantic key (e.g., 510) may be designated as the semantic key for that focus.

Figure 5:
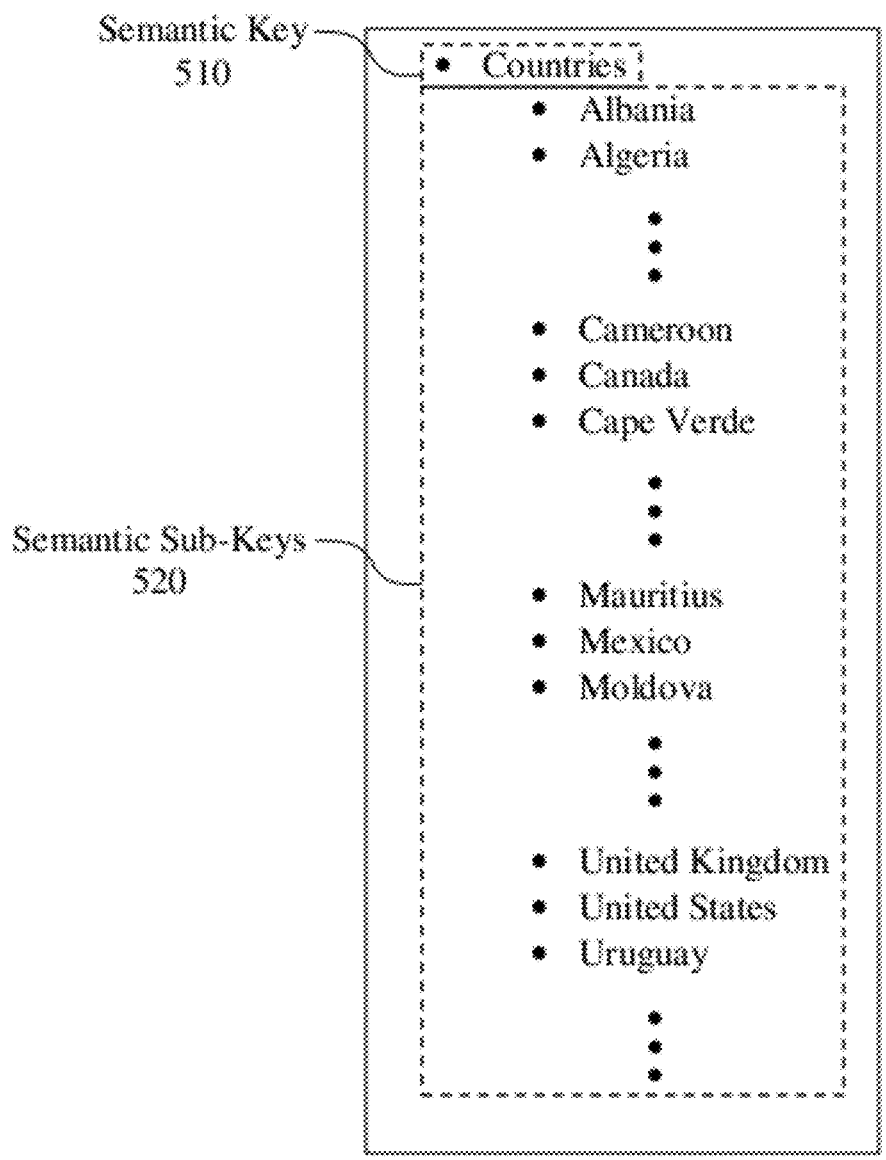
FIG. 5 shows an exemplary organization of semantic sub-keys in accordance with one embodiment of the present invention.

For example, if the focus (e.g., 335) is "country," then a semantic key (e.g., 510 as shown in FIG. 5) associated with a list of countries (e.g., semantic sub-keys 520) may be associated with the focus (e.g., 335). The semantic key (e.g., 510) and/or related semantic sub-keys (e.g., 520) may be organized in a hierarchy with one or more nodes (e.g., semantic key 510 is a superior or parent node, while semantic sub-keys 520 are child nodes of the parent node associated with semantic key 510) in one embodiment. Further, one or more of the semantic sub-keys (e.g., 520) may comprise a hyponym (e.g., semantic key 510 comprises the heading "countries" while semantic sub-keys 520 comprise a listing or index of countries) of a semantic key (e.g., 510).

Figure 6:
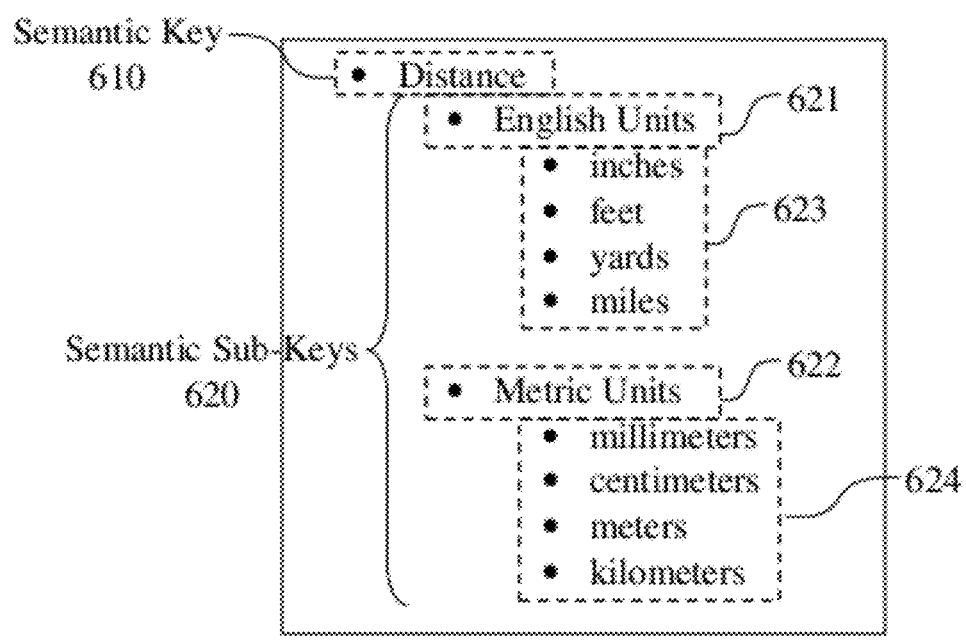
FIG. 6 shows an exemplary organization of semantic sub-keys associated with numerical expressions in accordance with one embodiment of the present invention.

As another example, if the focus (e.g., 335) is "tall," then a semantic key (e.g., 610 as shown in FIG. 6) associated with distance (e.g., semantic sub-keys 620) may be associated with the focus (e.g., 335). The semantic key (e.g., 510) and/or related semantic sub-keys (e.g., 520) may be organized in a hierarchy with one or more nodes (e.g., semantic key 610 is a superior or parent node of semantic sub-keys 620, semantic sub-key 621 is a superior or parent node of semantic sub-keys 623, and semantic sub-key 622 is a superior or parent node of semantic sub-keys 624) in one embodiment. Further, one or more of the semantic sub-keys (e.g., 620) may comprise a hyponym (e.g., semantic key 610 comprises the heading "distance" while semantic sub-keys 620 comprise different units of distance) of a semantic key (e.g., 610).

In one embodiment, step 420 may involve determining at least one alternative version of a semantic key. For example, the semantic key "nation" could be determined in step 420 for the semantic key "country." As another example, the semantic keys "cost," "expense" and/or "money" could be determined for the semantic key "price."

In one embodiment, semantic keys and semantic sub-keys may include other types of data. For example, "email address" (e.g., "electronic mail address" or the like) may be a semantic key, where the corresponding semantic sub-keys may include at least one email address. As another example, "address" (e.g., a physical address including a street name, street number, city, state, nation, etc.) may be a semantic key, where the corresponding semantic sub-keys may include at least one address. As yet another example, "phone number" (e.g., a telephone number, cellular phone number, etc.) may be a semantic key, where the corresponding semantic sub-keys may include at least one phone number. As a further example, "fax number" (e.g., "facsimile number" or the like) may be a semantic key, where the corresponding semantic sub-keys may include at least one fax number. And as another example, a semantic key may be a concept (e.g., significance, meaning, reason/cause, sentiment, a positive word, a negative word, location, a method, etc.), where the corresponding semantic sub-keys may include at least one word related to the concept.

In one embodiment, a semantic sub-key may be determined in step 420 by indexing semantic key database 342 using a semantic key (e.g., determined based on search query focus 335). Semantic key database 342 may include at least one respective semantic sub-key corresponding to each semantic key. Semantic key database 342 may also include at least one respective document (e.g., a webpage, electronic document or file, advertising content, etc.) or identifier thereof corresponding to each semantic key and/or each semantic sub-key (e.g., as shown in FIG. 19). In one embodiment, semantic key database 342 may include at least one respective location (e.g., within a document) corresponding to each semantic key and/or each semantic sub-key (e.g., as shown in FIG. 19). And in one embodiment, semantic key database 342 may include at least one respective attribute corresponding to each semantic key and/or each semantic sub-key (e.g., as shown in FIG. 24).

As shown in FIG. 4, step 430 involves outputting semantic sub-keys (e.g., 520, 620, etc.) associated with the semantic key (e.g., 510, 610, etc.) determined in step 420. The semantic sub-keys (e.g., 345) may be output by a semantic key generator (e.g., 340) as shown in FIG. 3. Additionally, in one embodiment, semantic sub-keys 345 may comprise one or more of semantic sub-keys 520 and/or 620 (e.g., depending upon the at least one respective semantic key assigned to the focus (e.g., 335) of the search query (e.g., 310).

The semantic sub-keys (e.g., 345) output by the semantic key processor (e.g., 340) may be controlled by input 347 in one embodiment. Input 347 may comprise a user input, system-generated input, etc. For example, inputs 347 may select at least one semantic key (e.g., 510, 610, etc.) and/or at least one semantic sub-key (e.g., 345, 520, 620, etc.) for output by semantic key processor 340, where the selection of the semantic sub-keys may be input to a graphical user interface (e.g., 125a, 125b, etc.) in one embodiment. As such, inputs 347 may enable a user to configure and/or refine the search query (e.g., 310) in one embodiment, thereby further enabling a user to configure or refine the searches performed by search engine 320 as discussed below.

Turning back to FIG. 2, step 240 involves performing a webpage search using the webpage search query (e.g., accessed in step 210). The webpage search may comprise a keyword search (e.g., based upon one or more keywords of the search query). And in one embodiment, the webpage search may comprise a keyword search of any well-known fashion. Additionally, the search may be performed by a search engine (e.g., 320) operable to access the search query (e.g., 310) and output search results (e.g., keyword search results 322). In one embodiment, the webpage search may be performed by any well-known, keyword-based search engine. The search engine (e.g., 322) may be implemented by search engine code (e.g., 115 of FIG. 1), and the search query (e.g., 310) may be input to a graphical user interface (e.g., 125a, 125b, etc.) and communicated to a computer system (e.g., server 110) which accesses and/or executes the search engine code (e.g., 115).

Step 250 involves accessing the webpage search results generated during the webpage search (e.g., performed in step 240). The webpage search results (e.g., keyword search results 322) may be accessed by a filtering component (e.g., 350) in one embodiment.

Figure 7A:
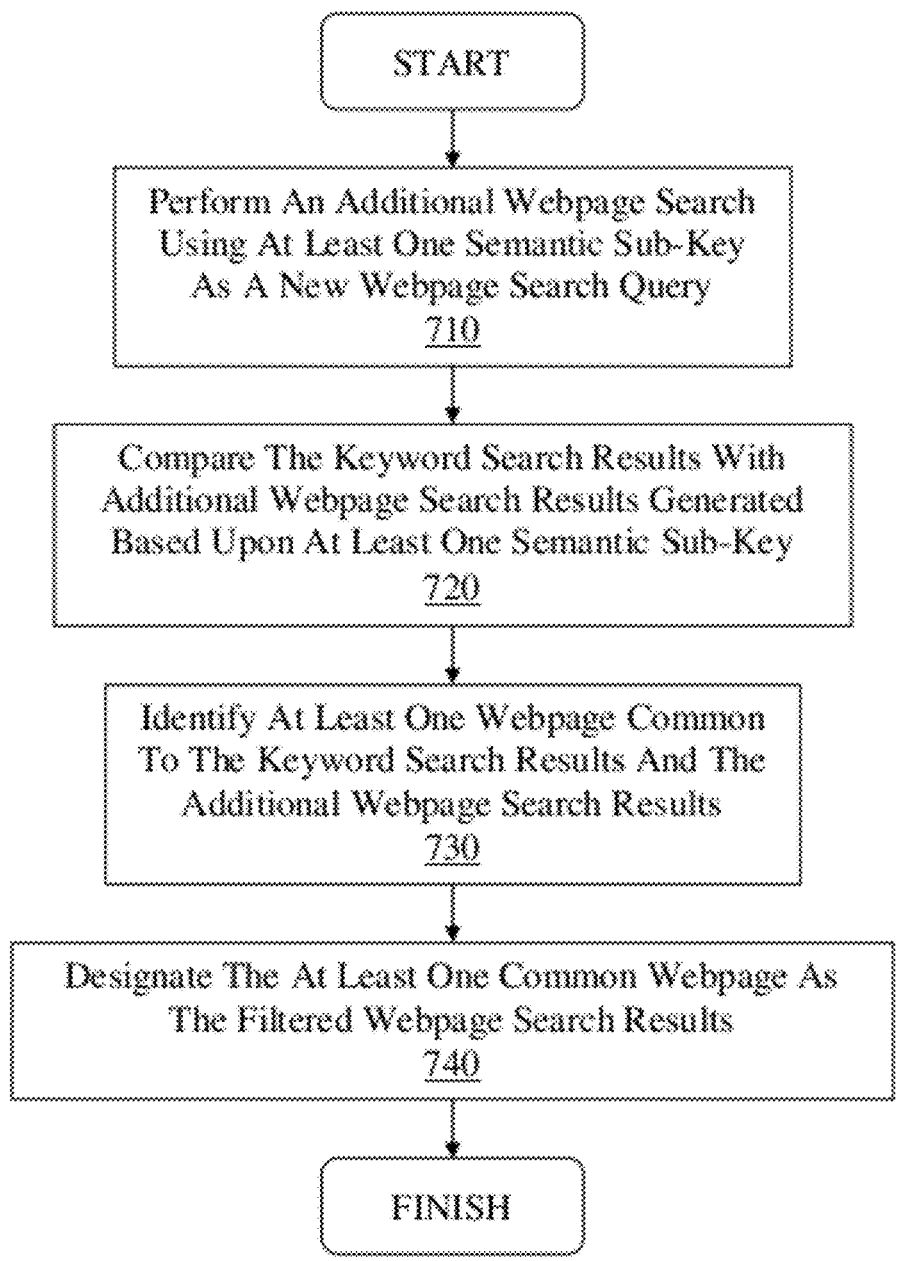
FIG. 7A shows an exemplary flow diagram of a computer-implemented process for filtering webpage search results in accordance with one embodiment of the present invention.

As shown in FIG. 2, step 260 involves filtering the webpage search results (e.g., 322) using a semantic sub-key (e.g., 345, 520, 620, etc.) associated with the semantic key (e.g., determined in step 230). In one embodiment, step 260 may be performed in accordance with process 700 of FIG. 7A. As shown in FIG. 7A, step 710 involves performing an additional webpage search using at least one semantic sub-key (e.g., 345, 520, 620, etc.) as a new webpage search query. The additional webpage search may be performed by a search engine (e.g., 320) operable to access the at least one semantic sub-key (e.g., 345, 520, 620, etc.) and generate the additional webpage search results (e.g., semantic sub-key search results 324).

Keyword search results (e.g., 322) may be compared with the additional webpage search results (e.g., 324) generated based upon the at least one semantic sub-key (e.g., 345, 520, 620, etc.). Step 730 involves identifying at least one webpage common to the keyword search results (e.g., 322) and the additional webpage search results (e.g., 324). Steps 720 and 730 may be performed by a filtering component (e.g., 350) operable to access the keyword search results (e.g., 322) and the additional webpage search results (e.g., 324) in one embodiment.

As shown in FIG. 7A, step 740 involves designating the at least one common webpage as the filtered webpage search results (e.g., those generated as a result of the filtering in step 260). In one embodiment, the filtered webpage search results (e.g., 355) may be output by a filtering component (e.g., 350). In this manner, embodiments may filter irrelevant webpages (e.g., those not comprising at least one semantic sub-key) from the search results (e.g., 355), while maintaining the relevant webpages (e.g., those which comprise at least one semantic sub-key).

Although the filtering performed in step 260 has been described in terms of the steps of exemplary process 700, it should be appreciated that other filtering mechanisms may be performed in other embodiments. For example, each webpage of the results of the keyword search (e.g., 322) may be searched for the semantic sub-keys (e.g., 345, 520, 620, etc.). If a webpage does not contain at least one of the semantic sub-keys (e.g., 345, 520, 620, etc.), then the webpage may be discarded or excluded from the filtered webpage search results (e.g., 355) in one embodiment. In this manner, the filtered webpage search results (e.g., 355) may comprise webpages which contain at least one of the semantic sub-keys (e.g., 345, 520, 620, etc.). Alternatively, other filtering mechanisms may be used in other embodiments to strip irrelevant webpages (e.g., those not intended or desired by search query 310) while maintaining relevant webpages (e.g., those intended or desired by search query 310).

Figure 7B:
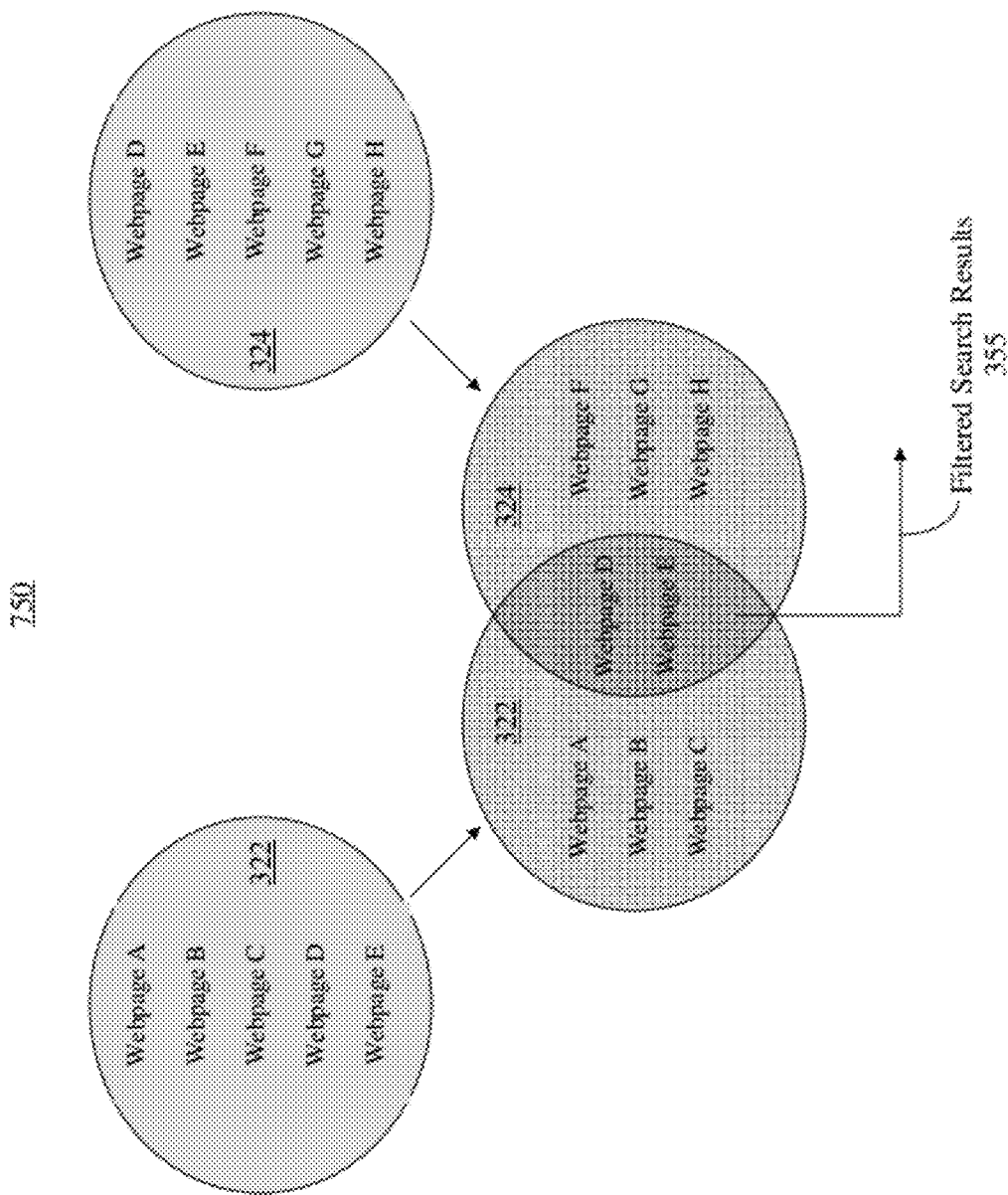
FIG. 7B shows an exemplary block diagram depicting a webpage search filtering mechanism in accordance with one embodiment of the present invention.

FIG. 7B shows exemplary block diagram 750 depicting a webpage search filtering mechanism in accordance with one embodiment of the present invention. As shown in FIG. 7B, search results 322 may comprise webpages A through E, while search results 324 comprise webpages D through H. In one embodiment, keyword search results 322 may include webpages identified, located, etc. in response to a keyword search. Additionally, semantic sub-key search results 324 may include webpages identified, located, etc. in response to a webpage search with a search query including one or more semantic sub-keys (e.g., 345, 520, 620, etc.).

Search results 322 may then be filtered by comparing search results 322 and 324 (e.g., as described in step 720 of process 700 of FIG. 7A) and identifying at least one webpage shared by both search results 322 and 324 (e.g., as described in step 730 of process 700 of FIG. 7A). As depicted in FIG. 7B, the comparison of search results 322 with search results 324 may be depicted by the overlapping of the search results (e.g., 322 and 324). The overlapped area (e.g., comprising webpage D and E) may indicate that webpages D and E are members of both search results 322 and search results 324. Once the webpages (e.g., webpages D and E) shared by both search results 322 and 324 are identified, they may be designated as filtered search results 355 (e.g., as described with respect to step 740 of process 700 of FIG. 7A).

It should be appreciated that search results 322 and/or search results 324 may comprise an aggregation of one or more subsets of search results. For example, where multiple semantic sub-key searches are performed (e.g., where a semantic key associated with focus 335 of search query 310 has more than one semantic sub-key 345 associated therewith), the search results from each search may be combined. For example, search results 324 may comprise search results from a first semantic sub-key search (e.g., using a first semantic sub-key as the search query), search results from a second semantic sub-key search (e.g., using a second semantic sub-key as the search query), and search results from a third semantic sub-key search (e.g., using a third semantic sub-key as the search query). In other embodiments, a larger or smaller number of search results may be combined to form search results 324. In this manner, each webpage of the output search results (e.g., 355) may comprise at least one semantic sub-key (e.g., 345, 520, 620, etc.), thereby increasing the number of relevant results given the association (e.g., via the semantic key) of the semantic sub-key (e.g., 345) to the focus (e.g., 355) of the search query (e.g., 310).

Figure 8A:
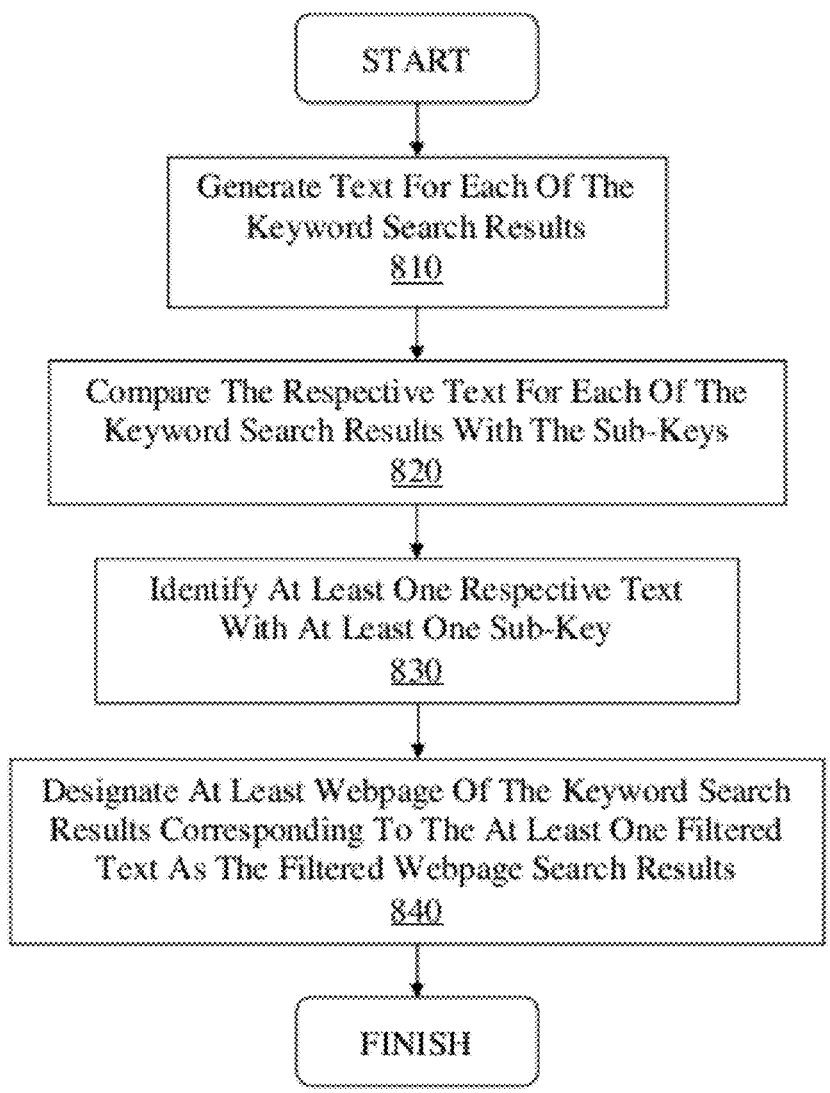
FIG. 8A shows an exemplary flow diagram of a computer-implemented process for filtering webpage search results using text generated from keyword search results in accordance with one embodiment of the present invention.
Figure 8B:
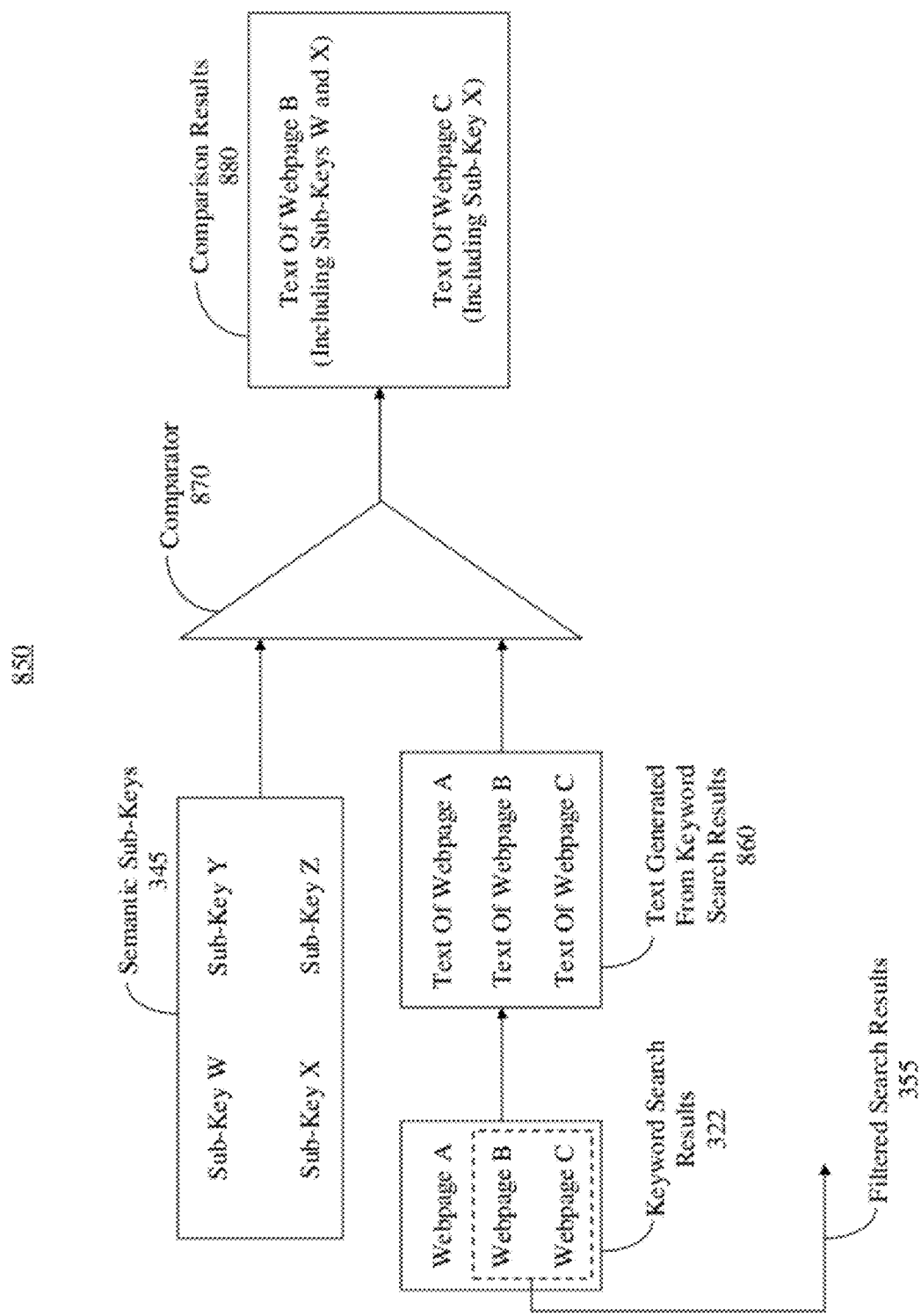
FIG. 8B shows an exemplary block diagram depicting a webpage search filtering mechanism using text generated from keyword search results in accordance with one embodiment of the present invention.

Turning back to FIG. 2, step 260 may be performed in accordance with process 800 of FIG. 8A in one embodiment. FIG. 8B will be described in conjunction with FIG. 8A below.

As shown in FIG. 8A, step 810 involves generating text for each of the keyword search results (e.g., 322). The text (e.g., 860) may be generated by a filtering component (e.g., 350) in one embodiment. Additionally, the text (e.g., 860) may comprise a title of the at least one webpage of the keyword search results (e.g., 322), portions of the bodies or content of the at least one webpage of the keyword search results (e.g., 322), an identifier or other reference to the at least one webpage of the keyword search results (e.g., 322), some combination thereof, etc. For example, as shown in FIG. 8B, text 860 may include text for each of webpages A through C of keyword search results 322.

Step 820 involves comparing the respective text for each of the keyword search results with the sub-keys. For example, as shown in FIG. 8B, semantic sub-keys 345 may include sub-keys W through Z which may be compared (e.g., by comparator 870) to the text (e.g., 860) generated based from the keyword search results (e.g., 322). Comparator 870 may be implemented by filtering component 350 (e.g., which accesses semantic sub-keys 345 from semantic key processor 340 as depicted in FIG. 3 by dashed arrow 348) in one embodiment. The comparison may involve searching text 860 for each of sub-keys 345 individually (e.g., search text 860 for sub-key W, then search text 860 for sub-key X, etc.) until a match is found, or alternatively, may involve searching text 860 for each of sub-keys 345 in parallel (e.g., search text 860 for sub-key W through Z at the same time) to determine if a match is found. Additionally, the comparison may be a text-to-text comparison where sub-keys 345 are text.

As shown in FIG. 8A, step 830 involves identifying at least one respective text (e.g., corresponding to one or more webpages of keyword search results 322) with at least one sub-key (e.g., 345). For example, as shown in FIG. 8B, comparison results 880 (e.g., output by comparator 870) may include text associated with webpages B and C, where the text of webpage B includes sub-keys W and X and the text of webpage C includes sub-key X. The text of webpage A may not include any of sub-keys W through Z in one embodiment, and therefore, may not be included in comparison results 880. Thus, the text corresponding to webpages B and C may be identified (e.g., by comparison results 880) in step 830.

Step 840 involves designating at least one webpage of the keyword search results corresponding to the at least one filtered text as the filtered webpage search results. For example, as shown in FIG. 8B, where comparison results 880 include text for webpages B and C, then webpages B and C from keyword search results 322 may be designated as the filtered search results (e.g., 355).

And in one embodiment, step 840 may include prioritizing or otherwise ranking the designated webpages (e.g., related to or identified using comparison results 880) above other webpages of keyword search results 322 which do not include one or more of sub-keys 345. In this manner, step 840 may implement a pre-ranking step (e.g., performed before ranking in step 270 of FIG. 2). For example, referring to FIG. 8B, webpages B and C (which include one or more sub-keys 345) may be ranked ahead of webpage A (which does not include at least one of sub-keys 345). Thus, filtered search results 355 may include even webpages without at least one semantic sub-key 345 in one embodiment.

Turning back to FIG. 2, step 270 involves ranking the filtered webpage search results (e.g., 355). The filtered search results (e.g., 355) may be ranked by a ranking component (e.g., 360 of FIG. 3), thereby generating ranked search results (e.g., 365), in one embodiment. Additionally, in one embodiment, step 270 may be performed in accordance with one or more of exemplary processes 900-1100 of FIGS. 9-11, respectively.

Figure 9:
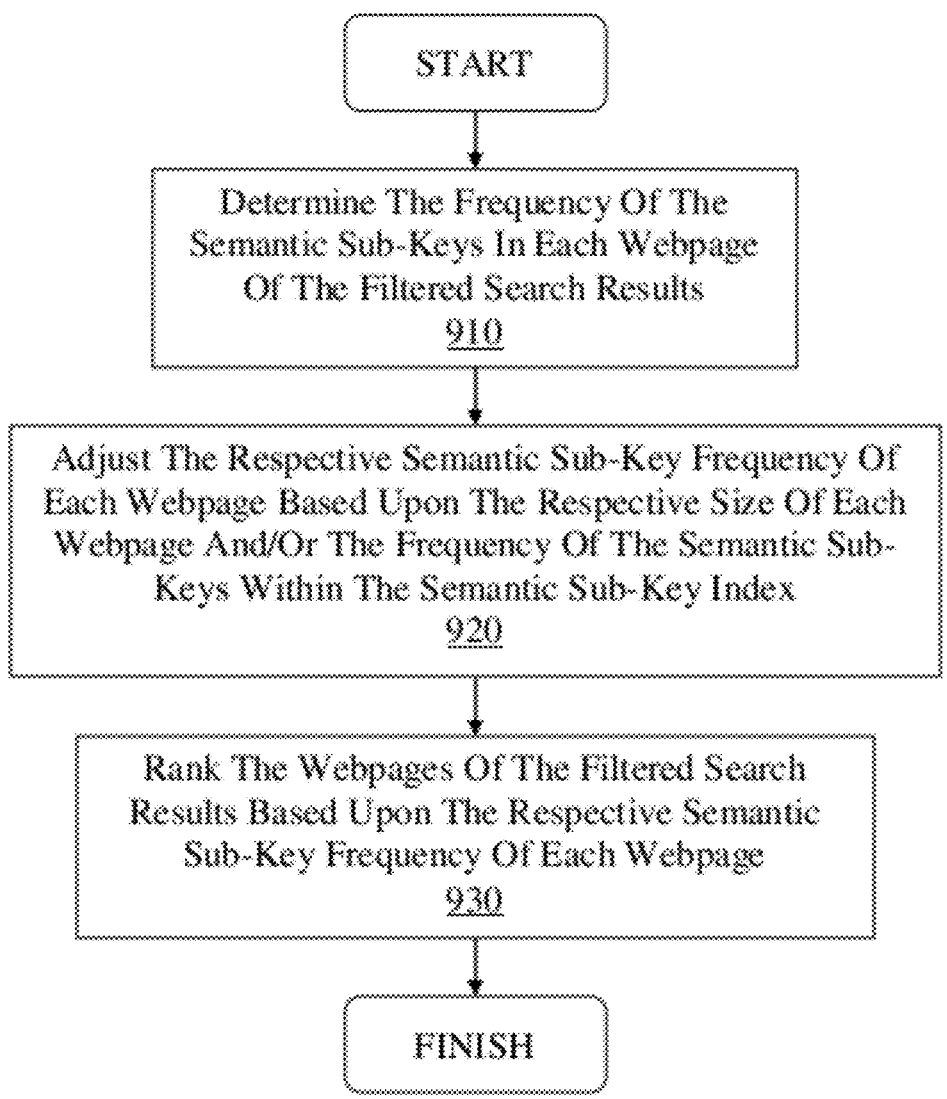
FIG. 9 shows an exemplary flow diagram of a computer-implemented process for ranking webpage search results in accordance with a semantic sub-key frequency in accordance with one embodiment of the present invention.

FIG. 9 shows an exemplary flow diagram of computer-implemented process 900 for ranking webpage search results in accordance with a semantic sub-key frequency in accordance with one embodiment of the present invention. As shown in FIG. 9, step 910 involves determining the frequency of the semantic sub-keys in each webpage of the filtered search results (e.g., 355). In one embodiment, the semantic sub-key frequency for each webpage may be determined based upon the total number of instances of all semantic sub-keys (e.g., 245, 520, 620, etc.) of each webpage of the search results (e.g., 355). For example, if webpage X comprises 30 instances of semantic sub-key 1 and 40 instances of semantic sub-key 2, then the semantic sub-key frequency for webpage X may be 70 (e.g., the sum of 30 and 40) in one embodiment. Alternatively, the semantic sub-key frequency for each webpage may be determined based upon the number of instances of one or more selected semantic sub-keys (e.g., 245, 520, 620, etc.) of each webpage of the search results (e.g., 355). For example, the semantic sub-key frequency for webpage X may be 30 if semantic sub-key 1 is used to determine the semantic sub-key frequency. Alternatively, the semantic sub-key frequency for webpage X may be 40 if semantic sub-key 2 is used to determine the semantic sub-key frequency.

Step 920 involves adjusting the respective semantic sub-key frequency of each webpage based upon the respective size of each webpage and/or the frequency of the semantic sub-keys within the semantic sub-key index (e.g., stored within semantic key database 342). For example, the semantic sub-key frequency for each webpage of the search results may be scaled (e.g., divided) by a factor associated with its respective webpage size (e.g., number of words, number of lines, frame size, etc.) in one embodiment. Alternatively, the semantic sub-key frequency for each webpage of the search results may be scaled by the frequency of its respective semantic sub-key (e.g., the semantic sub-key used to produce the search results comprising the webpage) within the semantic sub-key index (e.g., the collection of semantic sub-keys associated with a given semantic key). For example, if a semantic sub-key appears three times within a given semantic sub-key index (e.g., each instance under a different sub-node within the index associated with a semantic key), then the semantic sub-key frequency for each webpage search result associated with that semantic sub-key may be scaled (e.g., divided) by a factor (e.g., three) associated with the frequency of the semantic sub-key within the semantic sub-key index. And in other embodiments, step 920 may be omitted.

As shown in FIG. 9, step 930 involves ranking the webpages of the filtered search results based upon the respective semantic sub-key frequency of each webpage. For example, if webpage X has a semantic sub-key frequency (e.g., non-scaled as determined in step 910 and/or scaled as determined in step 920) of 70, while webpage Y has a semantic sub-key frequency of 80, then webpage Y may be ranked ahead of webpage X in one embodiment. In this case, a higher semantic sub-key frequency of webpage Y may indicate that webpage Y is more relevant to the search query (e.g., 310) than webpage X in one embodiment, hence the higher ranking of webpage Y with respect to webpage X.

Figure 10:
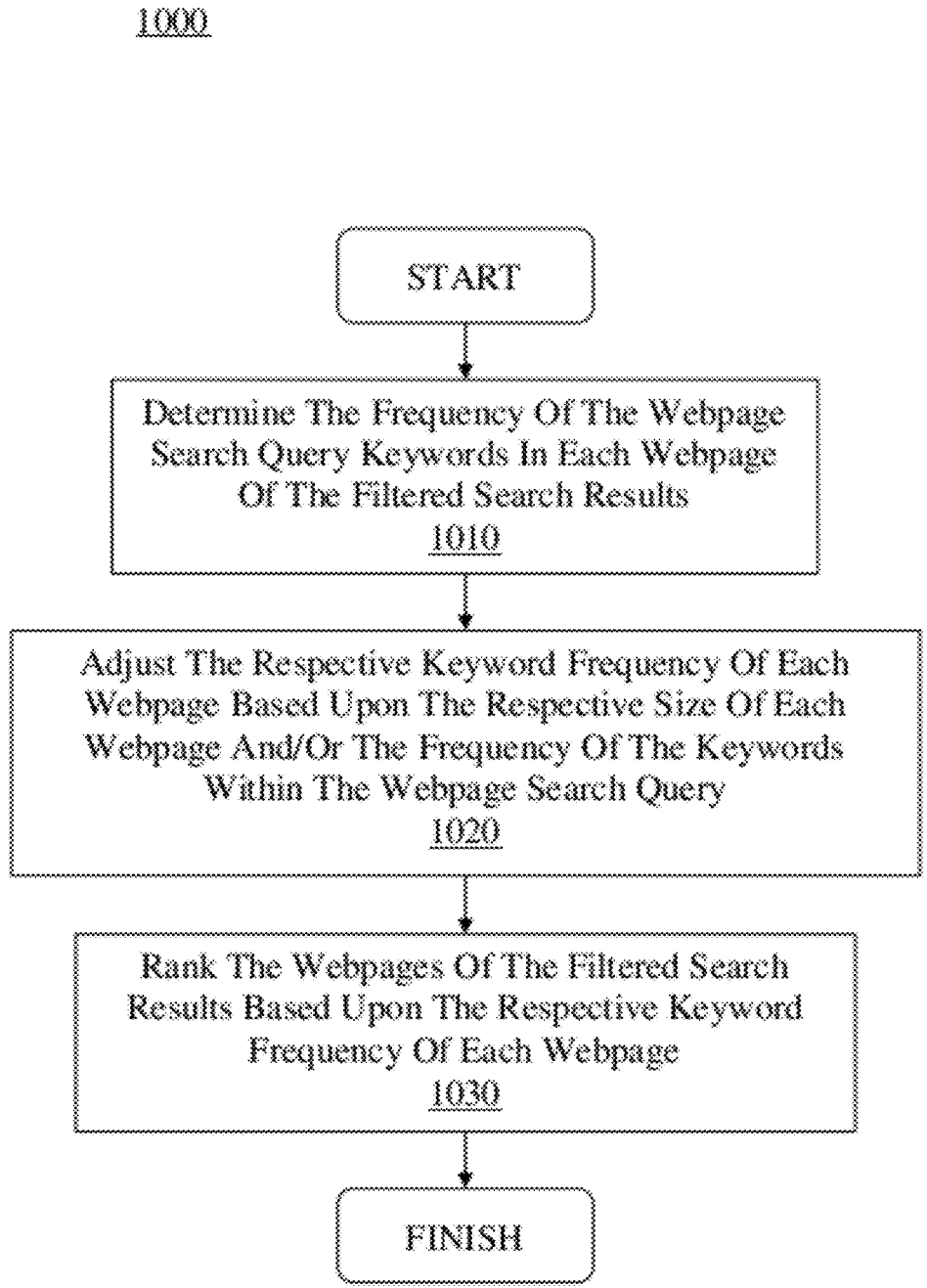
FIG. 10 shows an exemplary flow diagram of a computer-implemented process for ranking webpage search results in accordance with a keyword frequency in accordance with one embodiment of the present invention.

FIG. 10 shows an exemplary flow diagram of computer-implemented process 1000 for ranking webpage search results in accordance with a keyword frequency in accordance with one embodiment of the present invention. As shown in FIG. 10, step 1010 involves determining the frequency of the webpage search query keywords (e.g., of search query 310) in each webpage of the filtered search results (e.g., 355). In one embodiment, the keyword frequency for each webpage may be determined based upon the total number of instances of all search query keywords of each webpage of the search results (e.g., 355). For example, if webpage X comprises 10 instances of keyword 1 and 50 instances of keyword 2, then the keyword frequency for webpage X may be 60 (e.g., the sum of 10 and 50) in one embodiment. Alternatively, the keyword frequency for each webpage may be determined based upon the number of instances of one or more selected search query keywords of each webpage of the search results (e.g., 355). For example, the keyword frequency for webpage X may be 10 if keyword 1 is used to determine the keyword frequency. Alternatively, the keyword frequency for webpage X may be 50 if keyword 2 is used to determine the keyword frequency.

Step 1020 involves adjusting the respective keyword frequency of each webpage based upon the respective size of each webpage and/or the frequency of one or more keywords within the search query (e.g., 310). For example, the keyword frequency for each webpage of the search results may be scaled (e.g., divided) by a factor associated with its respective webpage size (e.g., number of words, number of lines, frame size, etc.) in one embodiment. Alternatively, the keyword frequency for each webpage of the search results may be scaled by the frequency of one or more keywords within the search query. For example, if a keyword appears three times within the search query, then the keyword frequency for each webpage search result comprising the keyword may be scaled (e.g., divided) by a factor (e.g., three) associated with the frequency of the keyword within the search query (e.g., 310). And in other embodiments, step 1020 may be omitted.

As shown in FIG. 10, step 1030 involves ranking the webpages of the filtered search results based upon the respective keyword frequency of each webpage. For example, if webpage X has a keyword frequency (e.g., non-scaled as determined in step 1010 and/or scaled as determined in step 1020) of 60, while webpage Y has a keyword frequency of 90, then webpage Y may be ranked ahead of webpage X in one embodiment. In this case, a higher keyword frequency of webpage Y may indicate that webpage Y is more relevant to the search query (e.g., 310) than webpage X in one embodiment, hence the higher ranking of webpage Y with respect to webpage X.

Figure 11:
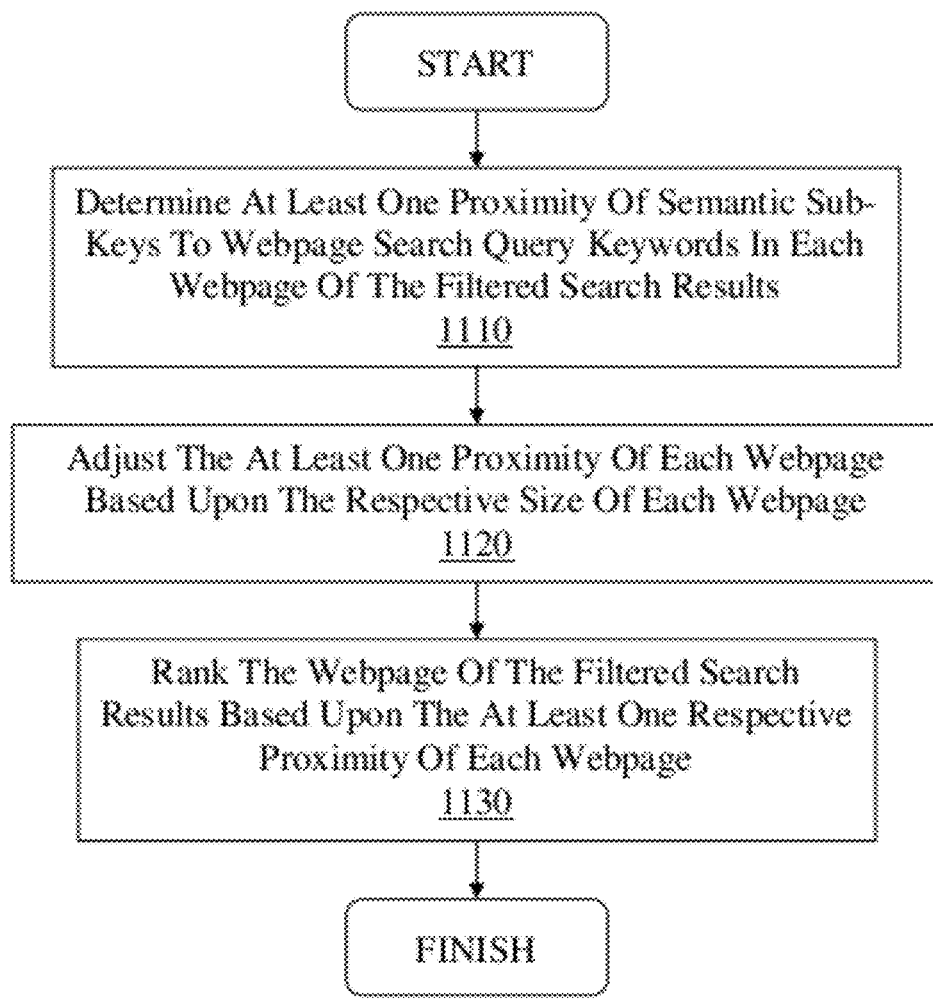
FIG. 11 shows an exemplary flow diagram of a computer-implemented process for ranking webpage search results in accordance with a proximity of semantic sub-keys and search query keywords in accordance with one embodiment of the present invention.

FIG. 11 shows an exemplary flow diagram of computer-implemented process 1100 for ranking webpage search results in accordance with a proximity of semantic sub-keys and search query keywords in accordance with one embodiment of the present invention. As shown in FIG. 11, step 1110 involves determining at least one proximity of semantic sub-keys (e.g., 345, 520, 620, etc.) to webpage search query keywords in each webpage of the filtered search results (e.g., 355). In one embodiment, the proximity may be determined by calculating the "distance" or other measure of proximity between two semantic sub-keys, between two keywords, between a semantic sub-key and a keyword, some combination thereof, etc. The measure of proximity may be determined based upon a sequential word ordering as discussed with respect to FIG. 12 in one embodiment.

Figure 12:
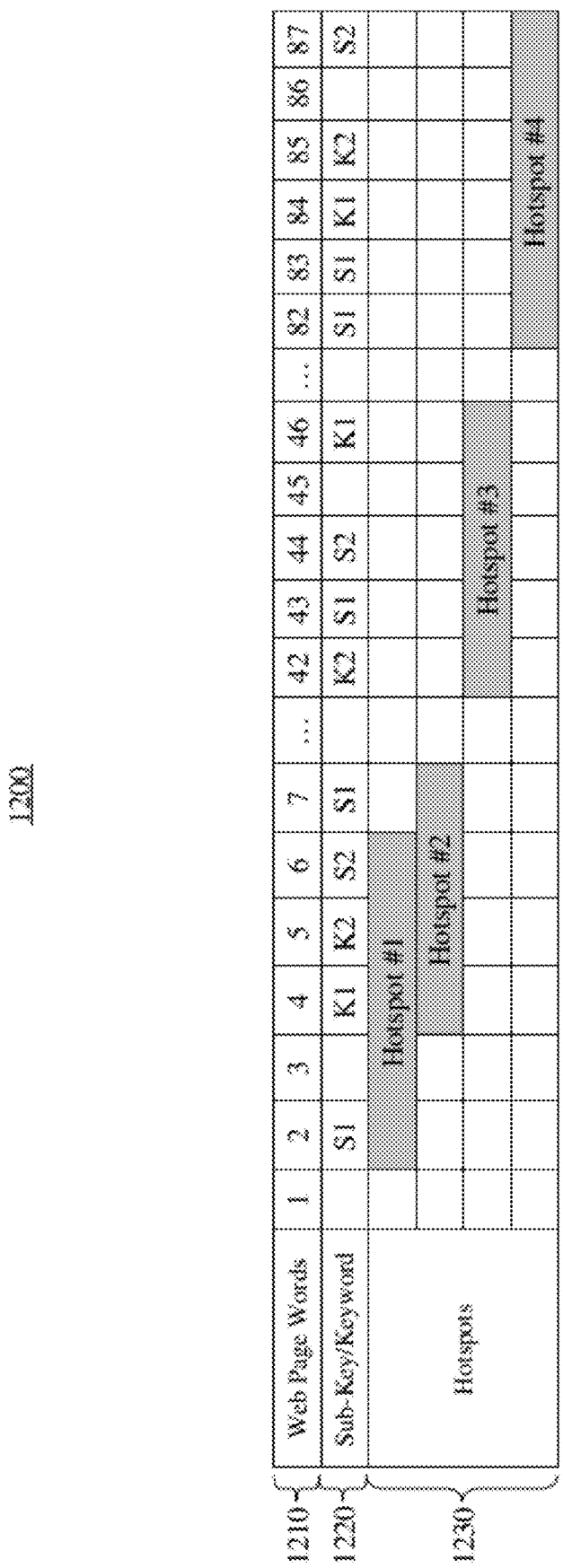
FIG. 12 shows an exemplary word sequential ordering of webpage content which may be used to determine proximity between two portions of the webpage in accordance with one embodiment of the present invention.

FIG. 12 shows exemplary word sequential ordering 1200 of webpage content which may be used to determine proximity between two portions of the webpage in accordance with one embodiment of the present invention. As shown in FIG. 12, row 1210 comprises a sequential ordering of the words of the webpage, row 1220 comprises semantic sub-keys (e.g., S1 and S2) and keywords (e.g., K1 and K2) associated with one or more respective words of the webpage, and rows 1230 comprise four "hotspots" representing a collection of localized semantic sub-keys and/or keywords for which a proximity is determined. In one embodiment, a hotspot may comprise all of the semantic sub-keys (e.g., S1 and S2) and all of the keywords (e.g., K1 and K2) found in the webpage. In other embodiments, a hotspot may comprise less than all of the semantic sub-keys and/or keywords found in the webpage. Additionally, in one embodiment, multiple overlapping hotspots may be assigned a single proximity (e.g., equal to largest proximity of each individual overlapping hotspot, equal to smallest proximity of each individual overlapping hotspot, etc.).

The proximity for a given hotspot may be calculated by the number of word which the hotspot spans. For example, hotspot 1 may comprise a proximity of 5 (e.g., since it spans from word 2 to word 6), hotspot 2 may comprise a proximity of 4 (e.g., since it spans from word 4 to word 7), hotspot 3 may comprise a proximity of 5 (e.g., since it spans from word 42 to word 46), and hotspot 4 may comprise a proximity of 6 (e.g., since it spans from word 82 to word 87). In one embodiment, a single proximity (e.g., the highest proximity, the lowest proximity, an average proximity, etc.) may be assigned to each webpage in step 1110.

As shown in FIG. 11, step 1120 involves adjusting the at least one proximity of each webpage based upon the respective size of each webpage. For example, the proximity for each webpage of the search results may be scaled (e.g., divided) by a factor associated with its respective webpage size (e.g., number of words, number of lines, frame size, etc.) in one embodiment. Additionally, in one embodiment, a single proximity (e.g., the highest scaled proximity, the lowest scaled proximity, an average scaled proximity, etc.) may be assigned to each webpage in step 1120 (e.g., if a single proximity was not selected for each webpage in step 1110).

Step 1130 involves ranking the webpages of the filtered search results based upon the at least one respective proximity of each webpage. For example, if webpage X has a proximity (e.g., non-scaled as determined in step 1110 and/or scaled as determined in step 1120) of 6, while webpage Y has a proximity of 4, then webpage Y may be ranked ahead of webpage X in one embodiment. In this case, a lower proximity of webpage Y may indicate that webpage Y is more relevant to the search query (e.g., 310) than webpage X in one embodiment, hence the higher ranking of webpage Y with respect to webpage X.

Turning back to FIG. 2, step 280 involves outputting the webpage search results. The search results output in step 280 may comprise filtered search results (e.g., accessed from filtering component 350 without ranking as depicted by arrow 352 of FIG. 3) or ranked search results (e.g., accessed from ranking component 360). Additionally, in one embodiment, the outputting performed in step 280 may comprise outputting graphical data (e.g., search result output for presentation 275 generated by graphical data generator 370) based upon the search results (e.g., 355 or 365). For example, the search results may be transformed (e.g., by graphical data generator 370) into a format (e.g., C, C++, Java, HTML, etc.) operable to be displayed by a computer system application (e.g., a web browser, etc.), where the displayed information may comprise a graphical user interface (e.g., 125a, 125b, 1300, etc.) in one embodiment.

As shown in FIG. 3, the search result output (e.g., 375) may be configured or controlled by input 377, where input 377 may comprise a user input, system-generated input, etc. In one embodiment, information associated with one or more webpages of the search results (e.g., 355, 365, etc.) may be hidden or not displayed in response to input 377. For example, input 377 may comprise a selection of at least one semantic key and/or at least one semantic sub-key, where information associated with a selected semantic key and/or semantic sub-key may be included in output 372 for display, while information associated with a non-selected semantic key and/or semantic sub-key may be excluded from output 372 (e.g., for effectively hiding or not displaying that information).

Figure 13:
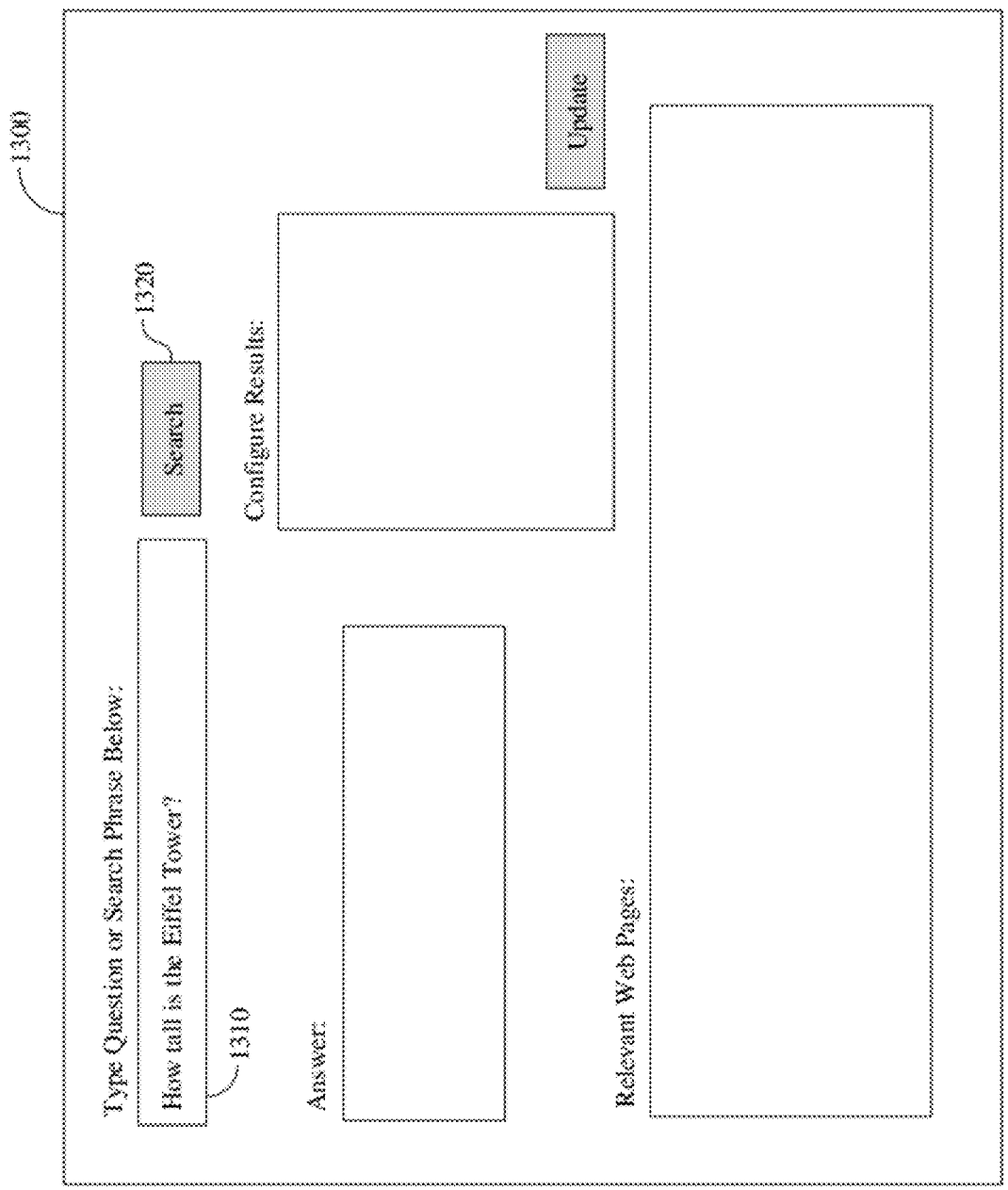
FIG. 13 shows an exemplary on-screen graphical user interface for performing webpage searches in accordance with one embodiment of the present invention.

FIG. 13 shows exemplary on-screen graphical user interface (GUI) 1300 for performing webpage searches in accordance with one embodiment of the present invention. As shown in FIG. 13, GUI 1300 may comprise region 1310 for entering search queries. For example, a user may enter the following search query (e.g., 310) as depicted in FIG. 13: "How tall is the Eiffel Tower?" The search query may comprise a question. Alternatively, the search query may comprise a series of keywords and/or phrases. Additionally, in one embodiment, the search query (e.g., 310) entered into region 1310 may comprise at least one operator (e.g., "and," "or," etc.) and/or other data for controlling the search performed by the search engine (e.g., 320).

GUI 1300 may also comprise graphical object 1320 for initiating a webpage search based upon the search query (e.g., 310) entered into region 1310. In response to interaction (e.g., moving a mouse pointer or cursor over graphical object 1320 and clicking a button on the mouse) with graphical object 1320, the webpage search may be conducted and results of the search may be displayed in other regions of GUI 1300 (e.g., as depicted in FIG. 14).

Figure 14:
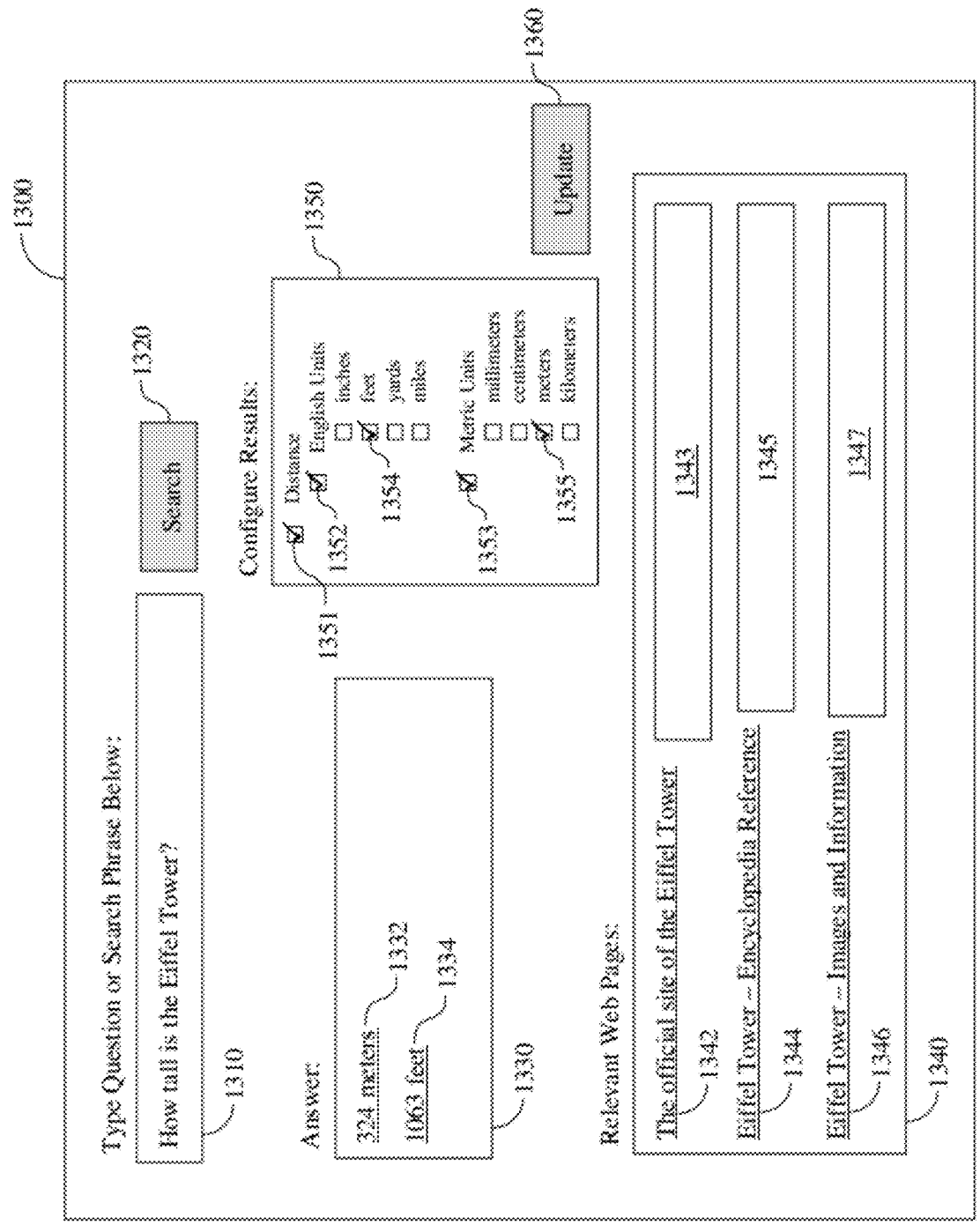
FIG. 14 shows an exemplary on-screen graphical user interface for performing webpage searches with search results displayed in accordance with one embodiment of the present invention.

FIG. 14 shows exemplary on-screen GUI 1300 for performing webpage searches with search results displayed in accordance with one embodiment of the present invention. As shown in FIG. 14, region 1330 may display a portion of search result output 375 comprising one or more answers (e.g., 1332 and 1334) to a question entered in region 1310. The answer may comprise a first portion which comprises a numerical value (e.g., 324, 1063, etc.) extracted from one or more of the webpages of the search results (e.g., 355, 365, etc.). Additionally, the answer may comprise a second portion (e.g., the units "meters" and "feet") which may correspond to the first portion. The second portion may also be associated with a semantic sub-key (e.g., 345, 520, 620, etc.). Further, in one embodiment, the first portion may be derived from a webpage of the search results (e.g., 355, 365, etc.) associated with the semantic sub-key (e.g., which is also associated with the second portion).

In one embodiment, where the focus (e.g., 335) of a search query (e.g., 310) relates to a number (e.g., relating to distance, height, etc.), then it may be determined that the answer (e.g., displayed in region 1330) may comprise a number (e.g., forming the first portion of the answer). As such, one or more numbers (e.g., 324, 1063, etc.) may be extracted from the search results (e.g., 355, 365, etc.) and paired with an appropriate modifier (e.g., related to a semantic sub-key used to filter and/or generate the search results). The number may be located in close proximity to the modifier or the semantic sub-key corresponding thereto (e.g., determined by a sequential word ordering as discussed with respect to FIG. 12). For example, if the number "1063" is commonly found in the search results (e.g., related to the Eiffel Tower) within a few words of the word "feet," then the number "1063" may be selected to be paired with the modifier "feet" for display in region 1330. Additionally, where multiple numbers are found in the search results near a modifier or a semantic sub-key corresponding thereto, then the more frequently occurring number may be selected to be paired with the modifier and displayed in region 1330.

As a further example, the search query (e.g., 310) entered in region 1310 may comprise the following question: "Which countries border the United States?" The focus (e.g., 335) of the search query (e.g., 310) may be determined to be the word "country," and thus, the semantic sub-keys (e.g., 345, 520, 620, etc.) for the search may comprise a list of countries (e.g., as depicted in FIG. 5). In one embodiment, the semantic sub-keys (e.g., 345, 520, 620, etc.) associated with the webpages from the search results (e.g., 355, 365, etc.) with the highest rankings may be selected for display within region 1330 of GUI 1300. For example, a large majority of the highest ranked webpages may comprise the semantic sub-keys "Canada" and "Mexico," and thus, the words "Canada" and "Mexico" may be selected as answers to the question presented in the search query (e.g., 310) and consequently be displayed in region 1330.

Each of the answers displayed in region 1330 may be hyperlinked in one embodiment. As such, upon interacting with one of the answers displayed in region 1330, one or more webpages related to an activated answer may be displayed (e.g., to provide additional information related to the search query and/or the specific answer which was interacted with). Further, in one embodiment, the webpages brought up in response to interaction with an answer displayed in region 1330 may comprise at least one highlighted semantic sub-key and/or at least one highlighted keyword. As such, embodiments enable relevant information in the webpages to be more quickly located.

As shown in FIG. 13, region 1340 may comprise a listing of webpages (e.g., 1342-1346) generated from search result output 375. The webpages may comprise filtered search results (e.g., 355) and/or ranked search results (e.g., 365). In this manner, the listing of webpages in region 1340 may be ordered in accordance with the ranked search results (e.g., 365 output by ranking component 360). Additionally, one or more of the webpages may be hyperlinked in one embodiment. As such, upon interacting with one of the webpages displayed in region 1340, one or more additional webpages (e.g., related to the activated webpage listed in region 1340) may be displayed (e.g., to provide additional information related to the search query and/or the webpage which was interacted with).

Region 1340 may also comprise additional information 1343-1347, each related to a respective webpage listed in region 1340. Additional information 1343-1347 may comprise one or more words, phrases, passages, etc. of each respective webpage. Additionally, additional information 1343-1347 may comprise at least one highlighted semantic sub-key and/or at least one highlighted keyword. As such, embodiments enable relevant information in the webpages (e.g., listed in region 1340) to be more quickly located.

As shown in FIG. 14, GUI 1300 may also comprise region 1350 for displaying semantic keys and/or semantic sub-keys (e.g., used to generate search results displayed in region 1330 and/or region 1340). In one embodiment, at least one interactive graphical object (e.g., 1351-1355) may be displayed in region 1350, where each interactive graphical object may correspond to a semantic key and/or a semantic sub-key. The interactive graphical objects (e.g., 1351-1355) may be used to select or de-select a semantic key and/or a semantic sub-key. In one embodiment, selection of a semantic key and/or semantic sub-key may cause search results associated with the selected semantic key and/or semantic sub-key to be displayed in region 1330 and/or region 1340. Additionally, de-selection of a semantic key and/or semantic sub-key may cause search results associated with the selected semantic key and/or semantic sub-key to be hidden or not displayed (e.g., in region 1330 and/or region 1340). In this manner, in one embodiment, selection of interactive graphical object 1354 (e.g., associated with the semantic sub-key labeled "feet") and interactive graphical object 1355 (e.g., associated with the semantic sub-key labeled "meters") may cause the answers related to the respective semantic sub-keys to be displayed in region 1330. Additionally, selection of interactive graphical object 1354 and interactive graphical object 1355 may cause one or more webpages related to the related to the respective semantic sub-keys to be displayed in region 1340.

Interactive graphical objects (e.g., 1351-1355) displayed in region 1350 of GUI 1300 may be used to input or otherwise communicate input 377 (e.g., to a graphical data generator). In this manner, the interactive graphical objects may be used to alter the display of the search results (e.g., 375) without initiating a new webpage search in one embodiment.

Alternatively, the interactive graphical objects may also be used to initiate a new webpage search in one embodiment. For example, de-selection of a graphical object associated with a given semantic sub-key may cause the output of semantic sub-keys 345 (e.g., by semantic key processor 340) without the given semantic sub-key, which may in turn cause the semantic sub-key search results (e.g., 324) to be output (e.g., by search engine 320) without search results associated with the given semantic sub-key, and which in turn may affect the search results accessed and/or output by other components (e.g., filtering component 350, ranking component 360, graphical data generator 370, etc.). Accordingly, altering the active semantic sub-keys (e.g., by selecting or deselecting at least one semantic sub-key) displayed in region 1350 may alter the display of search results (e.g., 375) by generating a new webpage search (e.g., performed by search engine 320).

Interaction with an interactive graphical object associated with a superior or parent node may select or de-select all child nodes in one embodiment. For example, interaction with interactive graphical object 1351 may select or deselect all other semantic sub-keys displayed below interactive graphical object 1351 (e.g., 1352-1355). Additionally, interaction with interactive graphical object 1352 may select or de-select all other semantic sub-keys displayed below interactive graphical object 1352 and above interactive graphical object 1353 (e.g., 1354).

GUI 1300 may also comprise graphical object 1360 for updating the display of search results (e.g., 375) displayed in region 1330 and/or 1340. For example, in response to activating or deactivating a semantic sub-key displayed in region 1350, interaction with graphical object 1360 may update the display of search results (e.g., 375) displayed in region 1330 and/or 1340 without initiating a new webpage search (e.g., communicating input 377 with the new semantic sub-key configuration for altering search result output 375) in one embodiment. Alternatively, in response to activating or deactivating a semantic sub-key displayed in region 1350, interaction with graphical object 1360 may update the display of search results (e.g., 375) displayed in region 1330 and/or 1340 by initiating a new webpage search (e.g., based upon the new semantic sub-key configuration indicated by interactive graphical objects 1351-1355 of region 1350) in one embodiment. Further, it should be appreciated that the display of search results in GUI 1300 may be updated (e.g., with or without initiation of a new search) automatically (e.g., without interaction with graphical object 1360) in response to interaction with one or more interactive graphical objects (e.g., 1351-1355) displayed in region 1350 of GUI 1300.

Figure 15:
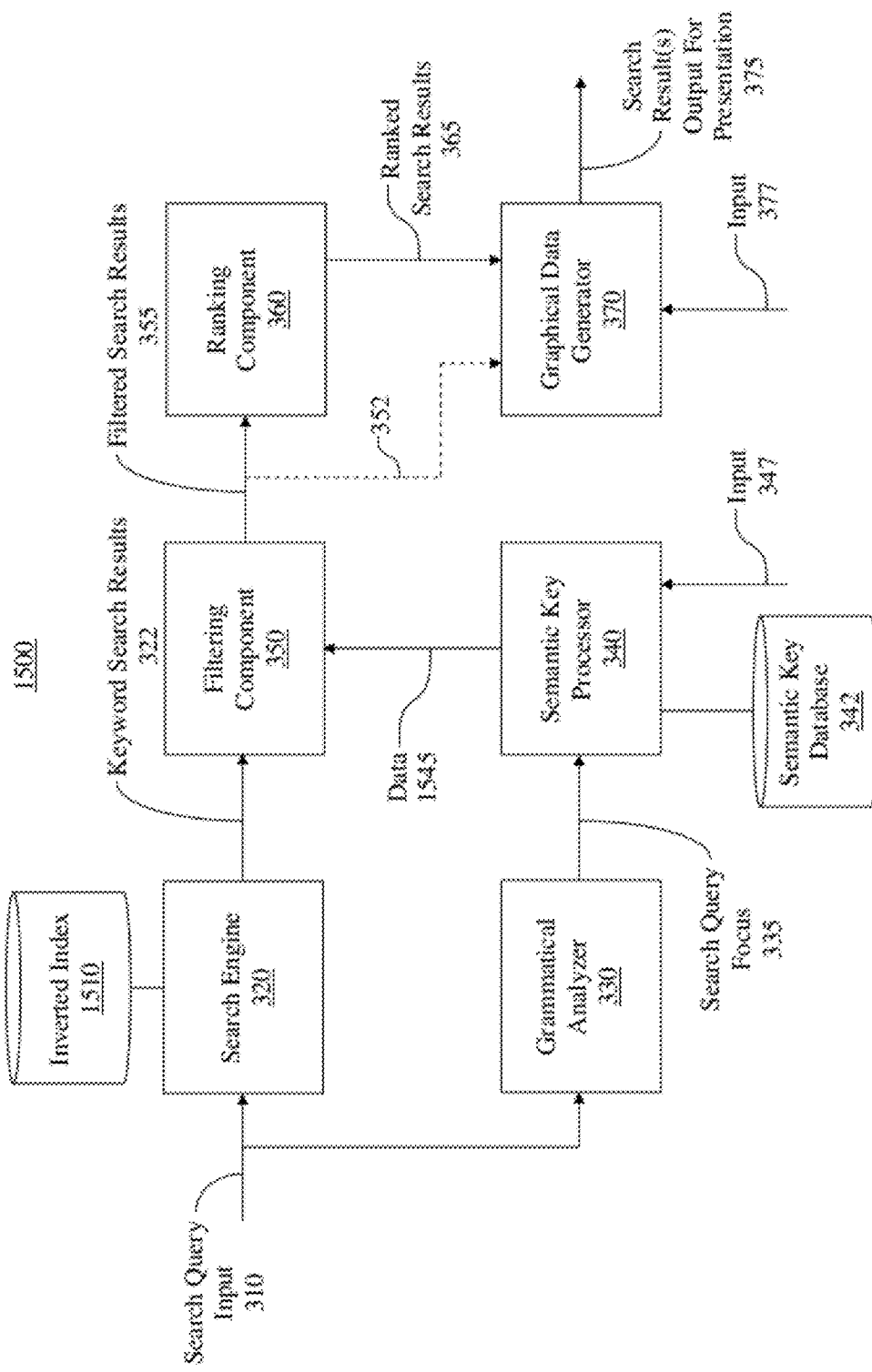
FIG. 15 shows an exemplary data flow diagram of the performance of a search in accordance with one embodiment of the present invention.

FIG. 15 shows exemplary data flow diagram 1500 of the performance of a search in accordance with one embodiment of the present invention. As shown in FIG. 15, a search may be performed by search engine 320 based on search query input 310. Search engine 320 may perform the search by indexing inverted index 1510 (e.g., using the search query input 310) to generate keyword search results 322. Inverted index 1510 may be a data structure including a plurality of words (e.g., semantic keys or a portion thereof, semantic sub-keys or a portion thereof, words which are not semantic keys, words which are not semantic sub-keys, etc.) and at least one respective document (or document identifier) corresponding to each word (e.g., as shown in FIG. 18).

Grammatical analyzer 330 may generate search query focus 335 based on search query input (e.g., as described above with respect to FIG. 2, FIG. 3, etc.). Semantic key processor 340 may output data 1545 (e.g., at least one document identifier, at least one complete document, at least one portion of at least one document, other information associated with at least one document, some combination thereof, etc.) based on search query focus 335 and/or input 347. For example, semantic key processor 340 may determine a semantic key associated with search query focus 335, where the semantic key may be used to index semantic key database 342 to return data 1545 associated with the semantic key and/or at least one semantic sub-key associated with the semantic key.

Filtering component 350 may use data 1545 to filter keyword search results 322 and generate filtered keyword search results 355. For example, search results may be removed from keyword search results 322 which are not associated with data 1545. As another example, search results may be removed from keyword search results 322 which do not include at least a portion of data 1545. And as a further example, search results may be removed from keyword search results 322 which do not include the semantic key (e.g., associated with search query focus 335) and/or at least one semantic sub-key associated with the semantic key.

The filtered search results may then be ranked by ranking component 360 to generate ranked search results 365 (e.g., as discussed above with respect to FIG. 2, FIG. 3, FIG. 7A, FIG. 7B, FIG. 8A, FIG. 8B, etc.). The ranking may be performed using data 1545 in one embodiment. And in one embodiment, the ranking may be performed using the semantic key (e.g., associated with search query focus 335) and/or at least one semantic sub-key associated with the semantic key.

Graphical data generator 370 may output at least one search result (e.g., 375) for presentation (e.g., as discussed above with respect to FIG. 2, FIG. 3, etc.). Graphical data generator may generate graphical data based on ranked search results (e.g., 365 output by ranking component 360) and/or filtered search results (e.g., 355 output by filtering component 350 as indicated by dashed arrow 352). And in one embodiment, the at least one search result may be output for presentation (e.g., 375) based on input 377.

Figure 16:
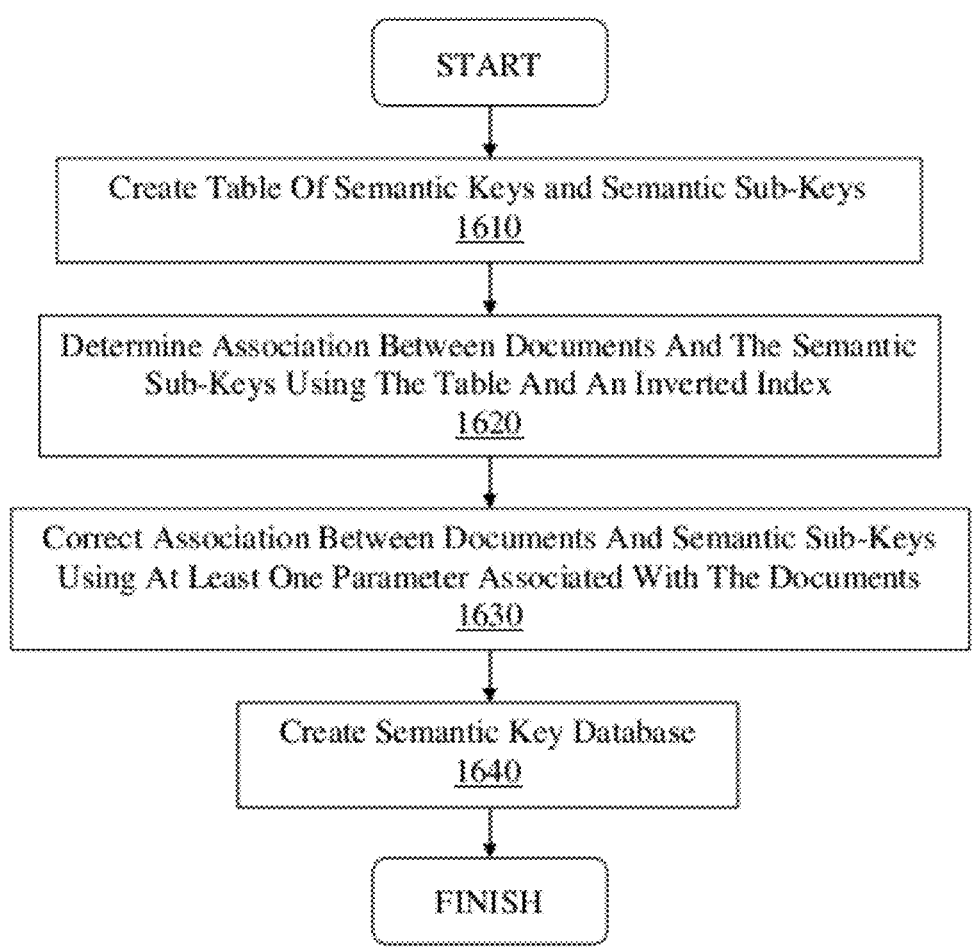
FIG. 16 shows an exemplary flow diagram of a computer-implemented process for creating a semantic key database in accordance with one embodiment of the present invention.

FIG. 16 shows an exemplary flow diagram of computer-implemented process 1600 for creating a semantic key database (e.g., 342) in accordance with one embodiment of the present invention. As shown in FIG. 16, step 1610 involves creating a table of semantic keys and semantic sub-keys. For example, as shown in FIG. 17, table 1700 may include at least one semantic key (e.g., "fruit," "computer brand," at least one other semantic key, etc.) and at least one respective semantic sub-key corresponding to each semantic key (e.g., "apple" and "cherry" corresponding to the semantic key "fruit," "Apple," "Dell" and "Toshiba" corresponding to the semantic key "computer brand," at least one other semantic sub-key, etc.).

Step 1620 may involve determining the association between documents (e.g., at least one webpage, at least one electronic document or file, advertising content, etc.) and the semantic sub-keys using the table (e.g., created and/or accessed in step 1610, 1700, etc.) and an inverted index (e.g., 1510). In one embodiment, as shown in FIG. 18, inverted index 1510 may include a plurality of words (e.g., "apple," "cherry," "Dell," "Toshiba," etc.) which are each located at a respective location (e.g., shown in the rightmost column of index 1510) with a respective document (e.g., shown in the middle column of index 1510). The words of index 1510 may or may not be semantic keys, semantic sub-keys, etc. As such, step 1620 may involve determining or accessing (e.g., from index 1510) at least one respective document (e.g., $D_1$, $D_2$, $D_3$ and $D_{10}$) and/or at least one respective document location (e.g., $L_A$, $L_E$, $L_F$ and $L_B$) that is associated with each semantic sub-key (e.g., "apple") and/or semantic key (e.g., "fruit," "computer brand," etc.) found in the table (e.g., table 1700).

As shown in FIG. 16, step 1630 involves correcting the association between the documents (and/or document locations) and the semantic sub-keys using at least one parameter associated with the documents. For example, where a semantic sub-key (e.g., "apple") is associated with more than one semantic key (e.g., "fruit" and "computer brand") based on the data of index 1510, step 1630 may involve determining which semantic key each document and document location is associated with using at least one parameter associated with the document.

In one embodiment, the parameter may be a relationship (e.g., syntactic relationship such as subject-verb, verb-object, in the same sentence, in the same clause, in the same phrase, etc.) between a semantic sub-key and at least one word or phrase of the document. For example, where a document (e.g., $D_1$) includes the semantic sub-key "apple" used in the sentence "the apple tastes good," the word "tastes" (e.g., in a subject-verb relationship with the semantic sub-key "apple") may be used to determine in step 1630 that the semantic sub-key "apple" (and therefore the document $D_1$ and/or the location in the document $L_A$) is associated with the semantic key "fruit" and not the semantic key "computer brand" (e.g., as shown in semantic key database 342 in FIG. 19).

In one embodiment, the parameter may be a proximity or distance (e.g., a number of words, number of lines, number of paragraphs, etc.) between a semantic sub-key and at least one word or phrase of the document. For example, if the semantic sub-key (e.g., "apple") and the word (e.g., "tastes" in the above example) are within a predetermined proximity or distance (e.g., a predetermined number of words, predetermined number of lines, predetermined number of paragraphs, etc.), then it may be determined in step 1630 that the semantic sub-key "apple" (and therefore the document $D_1$ and/or the location in the document $L_A$) is associated with the semantic key "fruit" (e.g., as shown in semantic key database 342 in FIG. 19).

In one embodiment, the parameter may be a quantity of words (e.g., a number of instances of a word) associated with a semantic sub-key in the document. For example, if a quantity of words (e.g., a number of instances of the word "tastes" in the above example) meets or exceeds a predetermined threshold, then it may be determined in step 1630 that the semantic sub-key "apple" (and therefore the document $D_1$ and/or the location in the document $L_A$) is associated with the semantic key "fruit" (e.g., as shown in semantic key database 342 in FIG. 19).

In one embodiment, the parameter may be a theme found in the document. In one embodiment, the theme (e.g., a major theme, complementary theme, minor theme, etc.) may be determined in accordance with U.S. patent application Ser. No. 12/884,395, filed on Sep. 17, 2010, entitled "Method and System for Scoring Texts," which is incorporated herein by reference in its entirety and for all purposes. For example, where a theme of a document (e.g., $D_2$) is determined to be "computer programming" or the like, it may be determined in step 1630 that that the semantic sub-key "apple" (and therefore the document $D_2$ and/or the location in the document $L_E$) is associated with the semantic key "computer brand" (e.g., as shown in semantic key database 342 in FIG. 19).

As shown in FIG. 16, step 1640 involves creating a semantic key database (e.g., 342 as shown in FIG. 19). The semantic key database may be created using information from the table (e.g., created in step 1610) and the association between the documents and the semantic sub-keys (e.g., determined in step 1620, corrected and/or further determined in step 1630, etc.) in one embodiment.

Although FIG. 15 shows data flow diagram 1500 with a specific number of components, it should be appreciated that data flow diagram 1500 may include a different number of components in other embodiments. Although FIG. 15 shows data flow diagram 1500 with a specific arrangement of components, it should be appreciated that data flow diagram 1500 may include a different arrangement of components in other embodiments.

Although FIG. 16 shows process 1600 with a specific number of steps, it should be appreciated that process 1600 may have a different number of steps in other embodiments. Although FIG. 16 shows process 1600 with a specific ordering of steps, it should be appreciated that process 1600 may have a different ordering of steps in other embodiments.

Although FIG. 17 depicts table 1700 with a certain amount or type of data, it should be appreciated that table 1700 may have a different amount or type of data in other embodiments. Additionally, although FIG. 17 depicts table 1700 with a certain arrangement of data, it should be appreciated that table 1700 may have a different arrangement of data in other embodiments.

Although FIG. 18 depicts inverted index 1510 with a certain amount or type of data, it should be appreciated that inverted index 1510 may have a different amount or type of data in other embodiments. Additionally, although FIG. 18 depicts inverted index 1510 with a certain arrangement of data, it should be appreciated that inverted index 1510 may have a different arrangement of data in other embodiments.

Although FIG. 19 depicts semantic key database 342 with a certain amount or type of data, it should be appreciated that semantic key database 342 may have a different amount or type of data in other embodiments. Additionally, although FIG. 19 depicts semantic key database 342 with a certain arrangement of data, it should be appreciated that semantic key database 342 may have a different arrangement of data in other embodiments.

Figure 20:
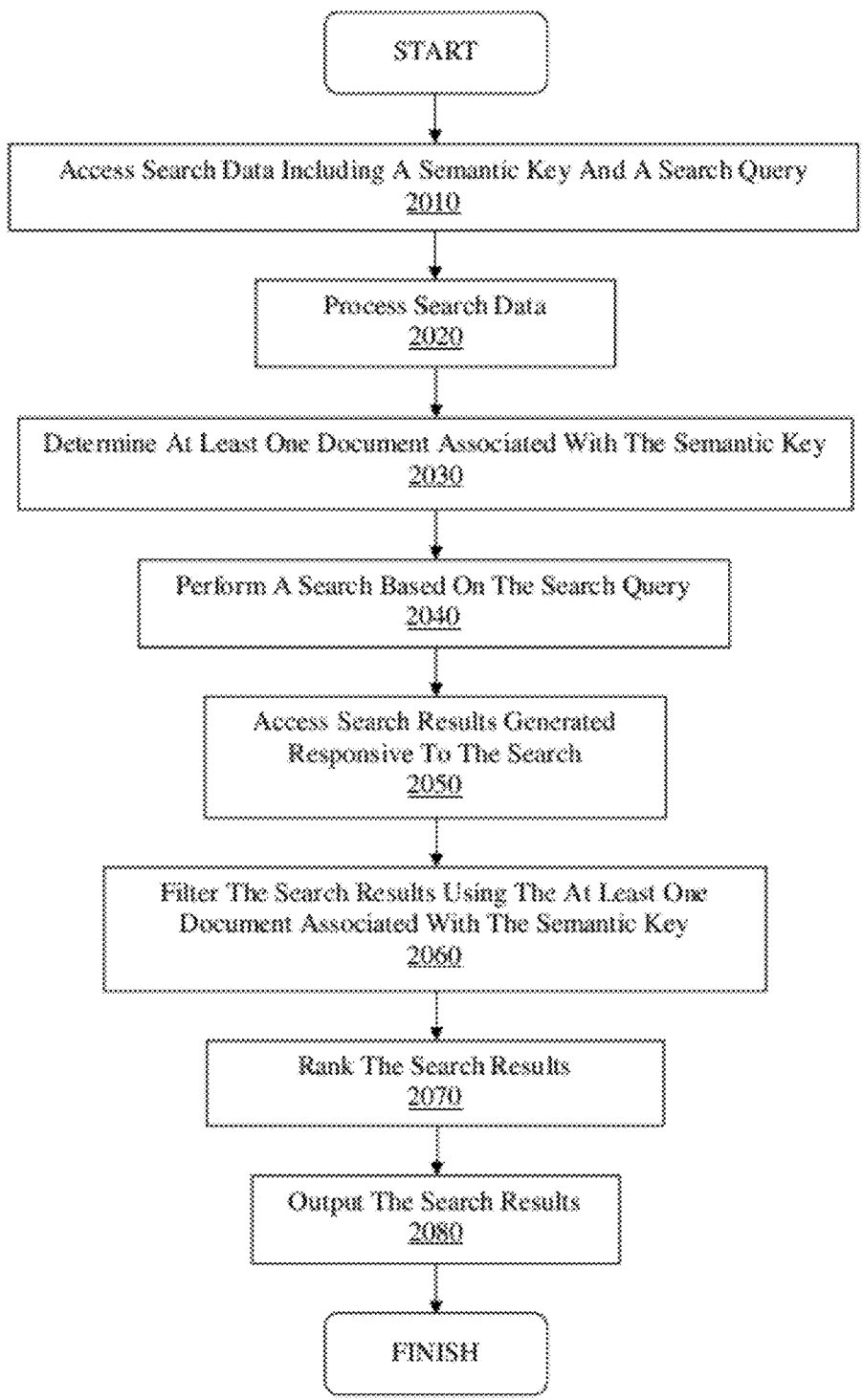
FIG. 20 shows an exemplary flow diagram of a computer-implemented process for performing a search in accordance with one embodiment of the present invention.

FIG. 20 shows an exemplary flow diagram of computer-implemented process 2000 for performing a search in accordance with one embodiment of the present invention. As the steps of process 2000 are described herein, reference will be made to exemplary data flow diagram 2200 of FIG. 22 to provide examples and help clarify the discussion.

As shown in FIG. 20, step 2010 involves accessing search data (e.g., 2210) including a semantic key and a search query. The search data may be input by a user via a user interface. For example, a user may enter search data in region 2110 (e.g., including a form field such as a text entry box, drop-down list box, etc.) of on-screen graphical user interface 2100 of FIG. 21, where the search data includes a semantic key (e.g., the word "color") and a search query (e.g., the word "Ferrari"). It should be appreciated that the semantic key may include any number of words or characters, and it should also be appreciated that the search query may include any number of words or characters. The semantic key and search query may be separated by at least one symbol (e.g., a colon, hyphen, operator, etc.) in one embodiment. And in one embodiment, the search data may be accessed in step 2010 by search data processor 2230.

Step 2020 involves processing the search data (e.g., using search data processor 2230). In one embodiment, the processing in step 2020 may involve splitting the semantic key (e.g., 2234) and the search query (e.g., 2232), extracting the semantic key (e.g., 2234) from the search data, extracting the search query (e.g., 2232) from the search data, etc. In one embodiment, the processing in step 2020 may involve modifying the search query (e.g., 2232) to further include at least one semantic sub-key associated with the semantic key (e.g., 2234) (e.g., in accordance with process 2300 of FIG. 23). And in one embodiment, the processing in step 2020 may involve modifying the search query (e.g., 2232) to further include the semantic key (e.g., 2234) or a portion thereof (e.g., in accordance with process 2500 of FIG. 25).

Figure 23:
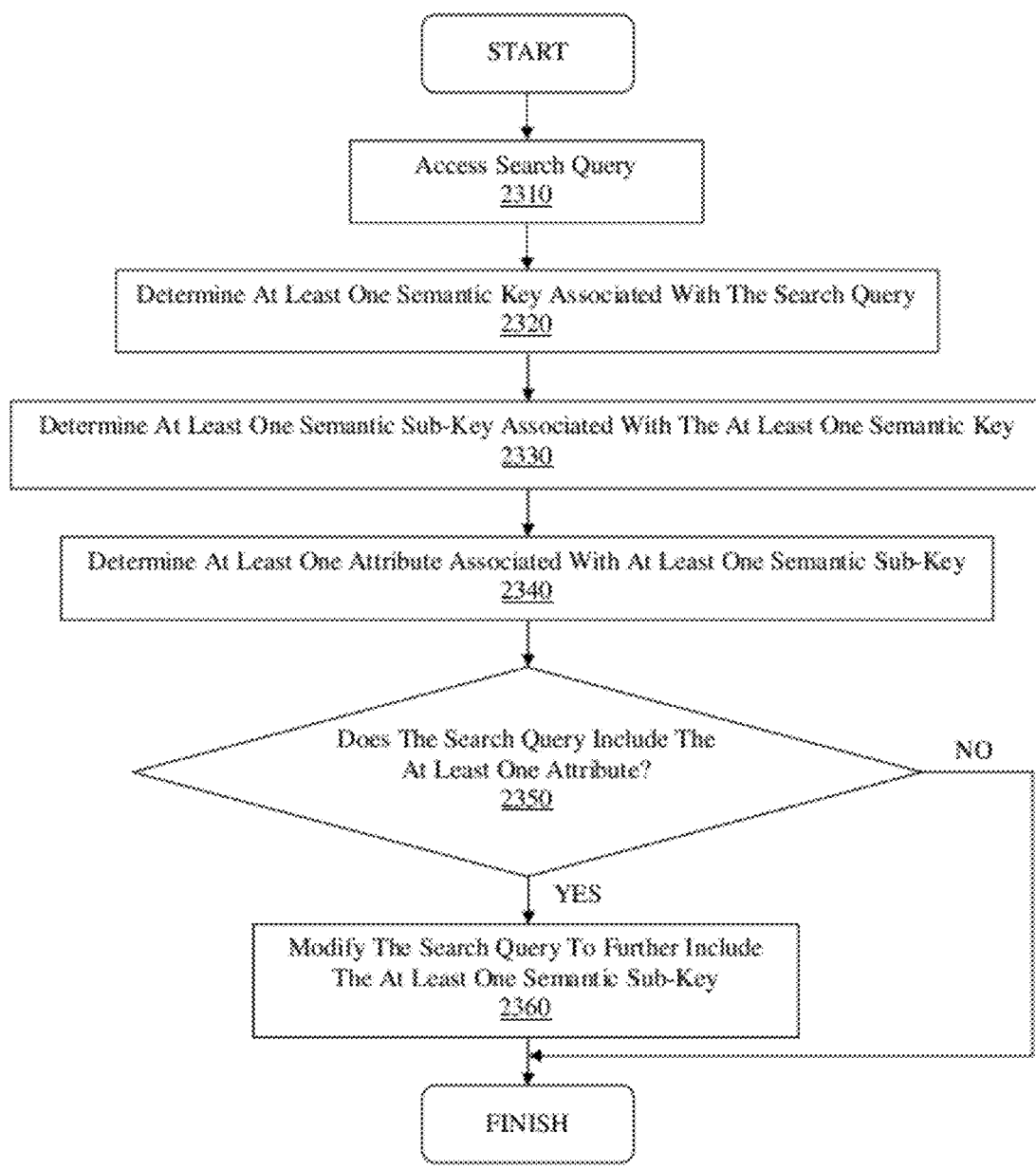
FIG. 23 shows an exemplary flow diagram of a computer-implemented process for modifying a search query to further include at least one semantic sub-key in accordance with one embodiment of the present invention.

FIG. 23 shows an exemplary flow diagram of computer-implemented process 2300 for modifying a search query to further include at least one semantic sub-key in accordance with one embodiment of the present invention. As shown in FIG. 23, step 2310 involves accessing a search query (e.g., 2232 from search data 2210, search query input 310, etc.). In one embodiment, where the search query is accessed from search data (e.g., 2210), the search query (e.g., 2232) may be extracted from the search data or otherwise generated by a search data processor (e.g., 2230).

Step 2320 involves determining at least one semantic key associated with the search query (e.g., accessed in step 2310). In one embodiment, the at least one semantic key may be determined (e.g., using search data processor 2230) from search data (e.g., 2210) in step 2320. In one embodiment, the at least one semantic key may be determined (e.g., using grammatical analyzer 330 and/or semantic key processor 340) in step 2320 based on a focus of a search query (e.g., 335), where the search query focus (e.g., 335) may be used to index a semantic key database (e.g., 342) to access the at least one semantic key.

As shown in FIG. 23, step 2330 involves determining at least one semantic sub-key associated with the at least one semantic key (e.g., determined in step 2320). In one embodiment, the at least one semantic sub-key may be determined (e.g., using semantic key processor 340) by indexing a semantic key database (e.g., 342) using the semantic key to access the at least one semantic sub-key.

Step 2340 involves determining at least one attribute associated with at least one semantic sub-key (e.g., determined in step 2330). In one embodiment, the at least one attribute may be determined (e.g., using semantic key processor 340) by indexing a semantic key database (e.g., 342) using the semantic sub-key to access the at least one attribute. For example, where the semantic key (e.g., determined in step 2320) includes the words "United States State Flower" and the semantic sub-key (e.g., determined in step 2330) includes the word "rose," semantic key database 342 may be indexed in step 2340 using the semantic sub-key "rose" to determine the attribute "New York" (e.g., as shown in semantic key database 342 of FIG. 24).

As shown in FIG. 23, step 2350 involves determining whether the search query (e.g., accessed in step 2310) includes the at least one attribute (e.g., determined in step 2340). If it is determined in step 2350 that the search query does not include the at least one attribute, then process 2300 may conclude. Alternatively, if it is determined in step 2350 that the search query includes the at least one attribute, then step 2360 may be performed.

Step 2360 involves modifying the search query (e.g., accessed in step 2310) to further include the at least one semantic sub-key (e.g., determined in step 2330). For example, where the search query is determined to include the at least one attribute "New York," the search query may be modified in step 2360 to further include the semantic sub-key "rose." In one embodiment, modification of the search query may be transparent to and/or hidden from a user (e.g., not displayed in a graphical user interface such as user interface 2100, another graphical user interface used to perform or initiate a search, etc.). In this manner, embodiments of the present invention may enable more relevant search results to be returned (e.g., as a result of the search preformed in step 2040 of process 2000) by modifying a search query to include at least one semantic sub-key (e.g., associated with a semantic key such as semantic key 2234, determined based on search query focus 335, etc.) if the search query includes at least one attribute (e.g., associated with the semantic sub-key).

Although FIG. 23 shows process 2300 with a specific number of steps, it should be appreciated that process 2300 may have a different number of steps in other embodiments. Although FIG. 23 shows process 2300 with a specific ordering of steps, it should be appreciated that process 2300 may have a different ordering of steps in other embodiments.

Although FIG. 24 depicts semantic key database 342 with a certain amount or type of data, it should be appreciated that semantic key database 342 may have a different amount or type of data in other embodiments. Additionally, although FIG. 24 depicts semantic key database 342 with a certain arrangement of data, it should be appreciated that semantic key database 342 may have a different arrangement of data in other embodiments.

Figure 25:
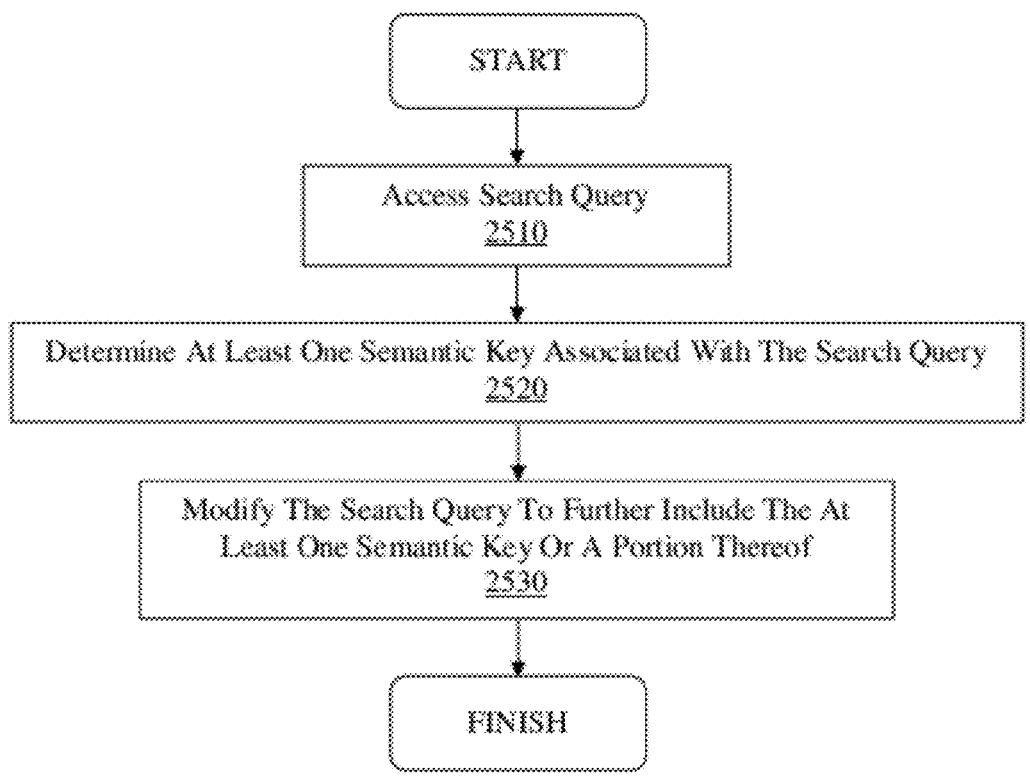
FIG. 25 shows an exemplary flow diagram of a computer-implemented process for modifying a search query to further include a semantic key or a portion thereof in accordance with one embodiment of the present invention.

FIG. 25 shows an exemplary flow diagram of computer-implemented process 2500 for modifying a search query to further include a semantic key or a portion thereof in accordance with one embodiment of the present invention. As shown in FIG. 25, step 2510 involves accessing a search query (e.g., 2232 from search data 2210, search query input 310, etc.). In one embodiment, where the search query is accessed from search data (e.g., 2210), the search query (e.g., 2232) may be extracted from the search data or otherwise generated by a search data processor (e.g., 2230).

Step 2520 involves determining at least one semantic key associated with the search query (e.g., accessed in step 2510). In one embodiment, the at least one semantic key may be determined (e.g., using search data processor 2230) from search data (e.g., 2210) in step 2520. In one embodiment, the at least one semantic key may be determined (e.g., using grammatical analyzer 330 and/or semantic key processor 340) in step 2520 based on a focus of a search query (e.g., 335), where the search query focus (e.g., 335) may be used to index a semantic key database (e.g., 342) to access the at least one semantic key.

As shown in FIG. 25, step 2530 involves modifying the search query (e.g., accessed in step 2510) to further include the at least one semantic key (e.g., determined in step 2520) or a portion thereof. For example, where the search query includes the word "2008" (as accessed in step 2510) and the semantic key associated with the search query is determined to be "Nobel laureate chemistry" (e.g., in step 2520), the search query may be modified in step 2530 to further include the words "nobel" (e.g., a portion of the semantic key "Nobel laureate chemistry"). As another example, where the search query includes the word "2008" (as accessed in step 2510) and the semantic key associated with the search query is determined to be "Nobel laureate chemistry" (e.g., in step 2520), the search query may be modified in step 2530 to further include the words "Nobel laureate chemistry" (e.g., the entire semantic key "Nobel laureate chemistry"). In this manner, embodiments of the present invention may enable more relevant search results to be returned (e.g., as a result of the search preformed in step 2040 of process 2000) by modifying a search query to include at least one semantic key (e.g., determined based on one or more words of the search query) or a portion thereof.

Although FIG. 25 shows process 2500 with a specific number of steps, it should be appreciated that process 2500 may have a different number of steps in other embodiments. Although FIG. 25 shows process 2500 with a specific ordering of steps, it should be appreciated that process 2500 may have a different ordering of steps in other embodiments.

Turning back to FIG. 20, step 2030 involves determining at least one document (e.g., a webpage, electronic document or file, advertising content, etc.) associated with the semantic key (e.g., accessed in step 2010 and/or step 2020). The at least one document may be determined in step 2030 by indexing semantic key database 342 using the semantic key to access or otherwise determine one or more documents associated with the semantic key and/or a semantic sub-key associated with the semantic key. For example, semantic key database 342 may be indexed using the semantic key "fruit" to access or otherwise determine one or more documents (e.g., $D_1$, $D_{10}$, $D_4$, $D_5$, etc. as shown in FIG. 19) associated with the semantic key. As another example, semantic key database 342 may be indexed using a semantic sub-key (e.g., "apple") associated with the semantic key (e.g., "fruit") to access or otherwise determine one or more documents (e.g., $D_1$, $D_{10}$, etc. as shown in FIG. 19) associated with the semantic sub-key and/or semantic key. In one embodiment, step 2030 may involve generating and/or outputting data (e.g., 2245) which includes at least one document identifier, at least one complete document, at least one portion of at least one document, other information associated with at least one document, some combination thereof, etc.

Step 2040 involves performing a search based on the search query (e.g., 2232, accessed in step 2010 and/or step 2020, etc.). The search may be a keyword search (e.g., based upon one or more words or keywords of the search query). Search engine 320 may perform the search in step 2040 based on search query 2232 and generate keyword search results 322 based thereon (e.g., by indexing inverted index 1510 using search query 2232 to access and/or generate keyword search results 322). The search results (e.g., 322) may include at least one webpage, at least one electronic document or file, advertising content, some combination thereof, etc.

Figure 22:
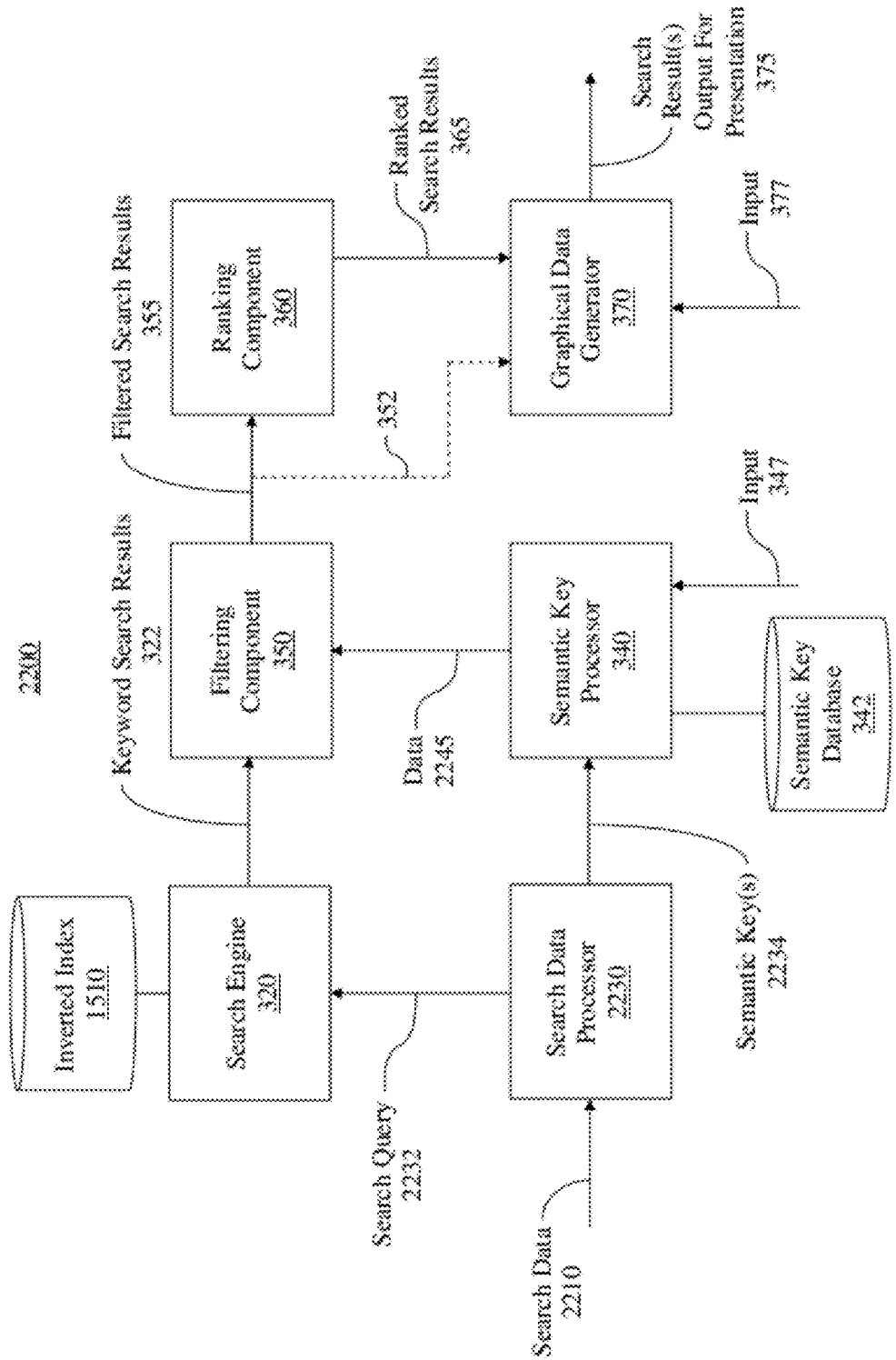
FIG. 22 shows an exemplary data flow diagram of the performance of a search using a search data processor in accordance with one embodiment of the present invention.

As shown in FIG. 20, step 2050 involves accessing search results (e.g., 322) generated responsive to the search (e.g., performed in step 2040). The search results may be accessed by a component capable of filtering the search results (e.g., filtering component 350 shown in FIG. 22), a component capable of ranking the search results (e.g., ranking component 360 as shown in FIG. 22), some combination thereof, etc.

Step 2060 involves filtering the search results (e.g., accessed in step 2050) using the at least one document associated with the semantic key (e.g., determined in step 2030). For example, filtering component 350 may use data 2245 (e.g., including at least one document identifier of at least one document associated with the semantic key, at least one complete document associated with the semantic key, at least one portion of at least one document associated with the semantic key, other information associated with at least one document associated with the semantic key, some combination thereof, etc.) to filter keyword search results 322 and generate filtered keyword search results 355.

In one embodiment, filtering may be performed in step 2060 by removing search results from keyword search results 322 which are not associated with data 2245. As another example, filtering may be performed in step 2060 by removing search results from keyword search results 322 which do not include at least a portion of data 2245. And as a further example, filtering may be performed in step 2060 by removing search results from keyword search results 322 which do not include the semantic key (e.g., 2232, determined in step 2010 and/or step 2020, etc.) and/or at least one semantic sub-key associated with the semantic key.

As shown in FIG. 20, step 2070 involves ranking the search results (e.g., the search results accessed in step 2050, the filtered search results generated in step 2060, etc.). For example, ranking component 360 may rank the search results to generate ranked search results 365 (e.g., as discussed above with respect to FIG. 2, FIG. 3, FIG. 7A, FIG. 7B, FIG. 8A, FIG. 8B, etc.). In one embodiment, step 2070 may be performed similarly to and/or analogously to step 270 of process 200.

In one embodiment, the ranking may be performed in step 2070 based on or otherwise using data 2245. For example, search results may be ranked in step 2070 based on a frequency of at least one semantic key (e.g., in at least one document associated with data 2245), based on a frequency of at least one semantic sub-key (e.g., in at least one document associated with data 2245), based on a frequency of at least one keyword of the search query (e.g., in at least one document associated with data 2245), based on a proximity or distance (e.g., measured in words, lines, paragraphs, etc.) between at least one semantic key and at least one keyword of the search query (e.g., in at least one document associated with data 2245), based on a proximity or distance (e.g., measured in words, lines, paragraphs, etc.) between at least one semantic sub-key and at least one keyword of the search query (e.g., in at least one document associated with data 2245), etc.

And in one embodiment, the ranking may be performed in step 2070 using the semantic key (e.g., 2232, determined in step 2010 and/or step 2020, etc.) and/or at least one semantic sub-key associated with the semantic key. For example, search results may be ranked in step 2070 based on a frequency of the semantic key (e.g., in at least one document associated with data 2245), based on a frequency of at least one semantic sub-key (e.g., in at least one document associated with data 2245), based on a proximity or distance (e.g., measured in words, lines, paragraphs, etc.) between the semantic key and at least one keyword of the search query (e.g., in at least one document associated with data 2245), based on a proximity or distance (e.g., measured in words, lines, paragraphs, etc.) between at least one semantic sub-key and at least one keyword of the search query (e.g., in at least one document associated with data 2245), etc.

As shown in FIG. 20, step 2080 involves outputting the search results (e.g., the search results accessed in step 2050, the filtered search results generated in step 2060, the ranked search results generated in step 2070, etc.). For example, graphical data generator 370 may output at least one search result (e.g., 375) for presentation (e.g., as discussed above with respect to FIG. 2, FIG. 3, etc.). In one embodiment, the at least one search result (e.g., 375) may be output in step 2080 for presentation based on input 377. And in one embodiment, step 2080 may be performed similarly to and/or analogously to step 280 of process 200.

In one embodiment, process 2000 may be used to search for and/or output advertising content. For example, where the search results accessed in step 2050 include advertising content (e.g., at least one advertisement), step 2080 may involve outputting the search results (e.g., including advertising content). The search results (e.g., including advertising content) may be output in step 2080 to be presented contemporaneously with webpage search results (e.g., using an on-screen graphical user interface such as user interface 2100, user interface 2700, etc.). In one embodiment, the webpage search results and the search results including advertising content may be generated or accessed based on the same search query, the same at least one semantic key, the same at least one semantic sub-key, some combination thereof, etc. In this manner, embodiments of the present invention enable adverting content to be returned (e.g., responsive to a search performed using a search query, at least one semantic key, at least one semantic sub-key, some combination thereof, etc.) and/or displayed contemporaneously with webpage search results, where the advertising content (e.g., associated with at least one semantic key, at least one semantic sub-key, some combination thereof, etc.) may be more relevant to the search query and/or the webpage search results.

Although FIG. 20 shows process 2000 with a specific number of steps, it should be appreciated that process 2000 may have a different number of steps in other embodiments. Although FIG. 20 shows process 2000 with a specific ordering of steps, it should be appreciated that process 2000 may have a different ordering of steps in other embodiments.

Figure 21:
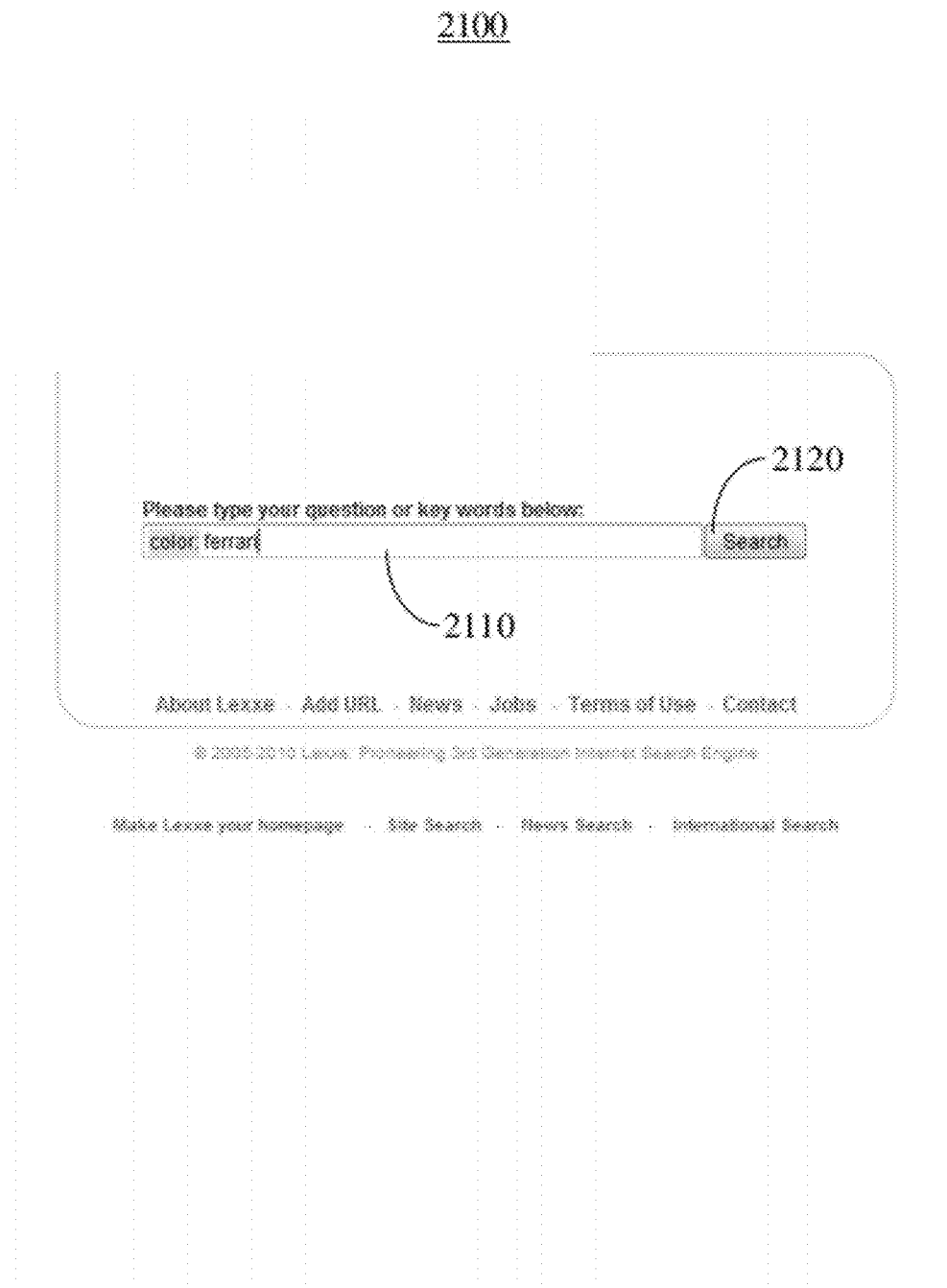
FIG. 21 shows an exemplary user interface for performing a search in accordance with one embodiment of the present invention.

Although FIG. 21 depicts user interface 2100 with a certain number and arrangement of elements, it should be appreciated that user interface 2100 may have a different number and/or arrangement of elements in other embodiments. Additionally, although FIG. 21 depicts elements of user interface 2100 with a certain size and shape, it should be appreciated that elements of user interface 2100 may be a different size and/or shape in other embodiments.

Although FIG. 22 shows data flow diagram 2200 with a specific number of components, it should be appreciated that data flow diagram 2200 may include a different number of components in other embodiments. Although FIG. 22 shows data flow diagram 2200 with a specific arrangement of components, it should be appreciated that data flow diagram 2200 may include a different arrangement of components in other embodiments.

Figure 26A:
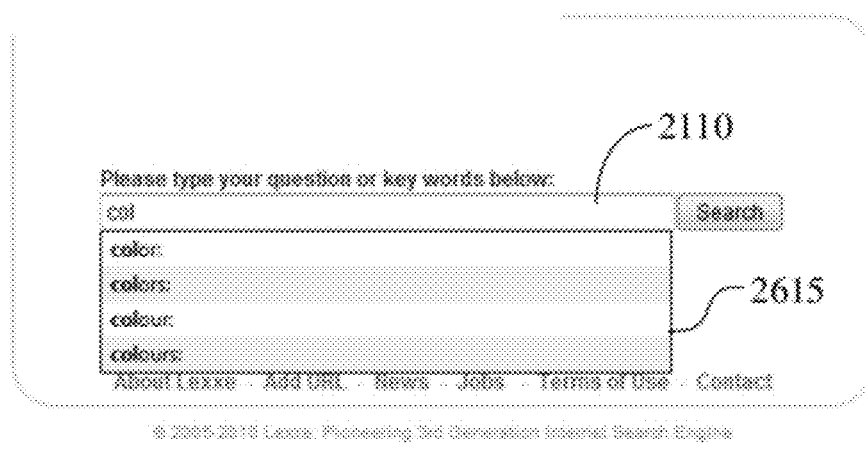
FIG. 26A shows a first view of an exemplary on-screen graphical user interface depicting an automated completion or suggestion of a semantic keyword in accordance with one embodiment of the present invention.
Figure 26B:
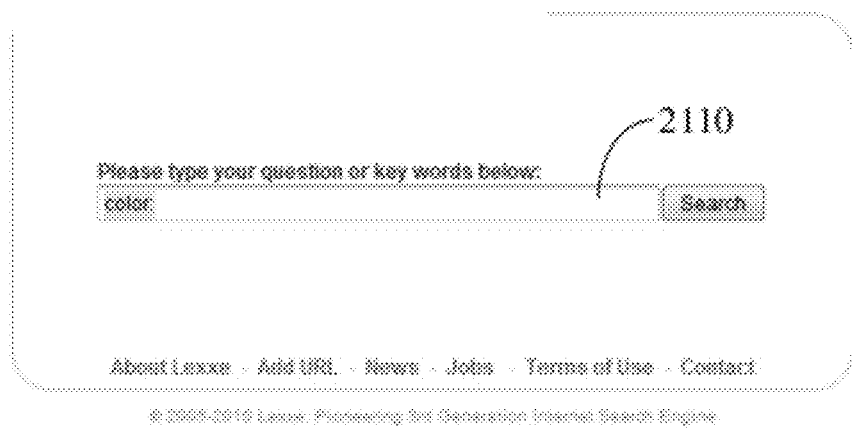
FIG. 26B shows a second view of an exemplary on-screen graphical user interface depicting an automated completion or suggestion of a semantic keyword in accordance with one embodiment of the present invention.

FIGS. 26A and 26B show exemplary on-screen graphical user interface 2100 depicting an automated completion or suggestion of a semantic keyword in accordance with one embodiment of the present invention. As shown in FIG. 26A, responsive to the entry of the letters "col" (e.g., by a user using region 2110 of user interface 2100), region 2615 may be automatically displayed. Region 2615 may include at least one semantic key (e.g., "color," "colors," "colour" and "colours") associated with the entry (e.g., the letters "col") in region 2110. In one embodiment, region 2615 may be a drop-down list box or other form element enabling a user to select a semantic key.

In one embodiment, responsive to the selection of a semantic key using region 2615, the selected semantic key may be automatically displayed in region 2110. For example, as shown in FIG. 26B, the semantic key "color" may be automatically displayed in region 2110 responsive to a selection of the semantic key "color" from region 2615. Additionally, responsive to a selection of a semantic key using region 2615, region 2615 may be hidden or not displayed (e.g., as shown in FIG. 26B).

Accordingly, embodiments enable more efficient selection and entry of semantic keys and/or search data (e.g., including at least one semantic key and data forming a search query) for use in searching. Additionally, embodiments enable users to determine and/or select semantic keys without prior knowledge of the semantic keys. For example, where a user is not aware that the word "color" is a semantic key, region 2615 may display the semantic key "color" (and/or one or more other semantic keys related thereto) responsive to entry of one or more letters in region 2110 (e.g., the letter "c," the letters "co," etc.). As such, region 2615 may be used to inform a user of one or more possible semantic keys for selection.

Although FIGS. 26A and 26B depict user interface 2100 with a certain number and arrangement of elements, it should be appreciated that user interface 2100 may have a different number and/or arrangement of elements in other embodiments. Additionally, although FIGS. 26A and 26B depict elements of user interface 2100 with a certain size and shape, it should be appreciated that elements of user interface 2100 may be a different size and/or shape in other embodiments.

Figure 27:
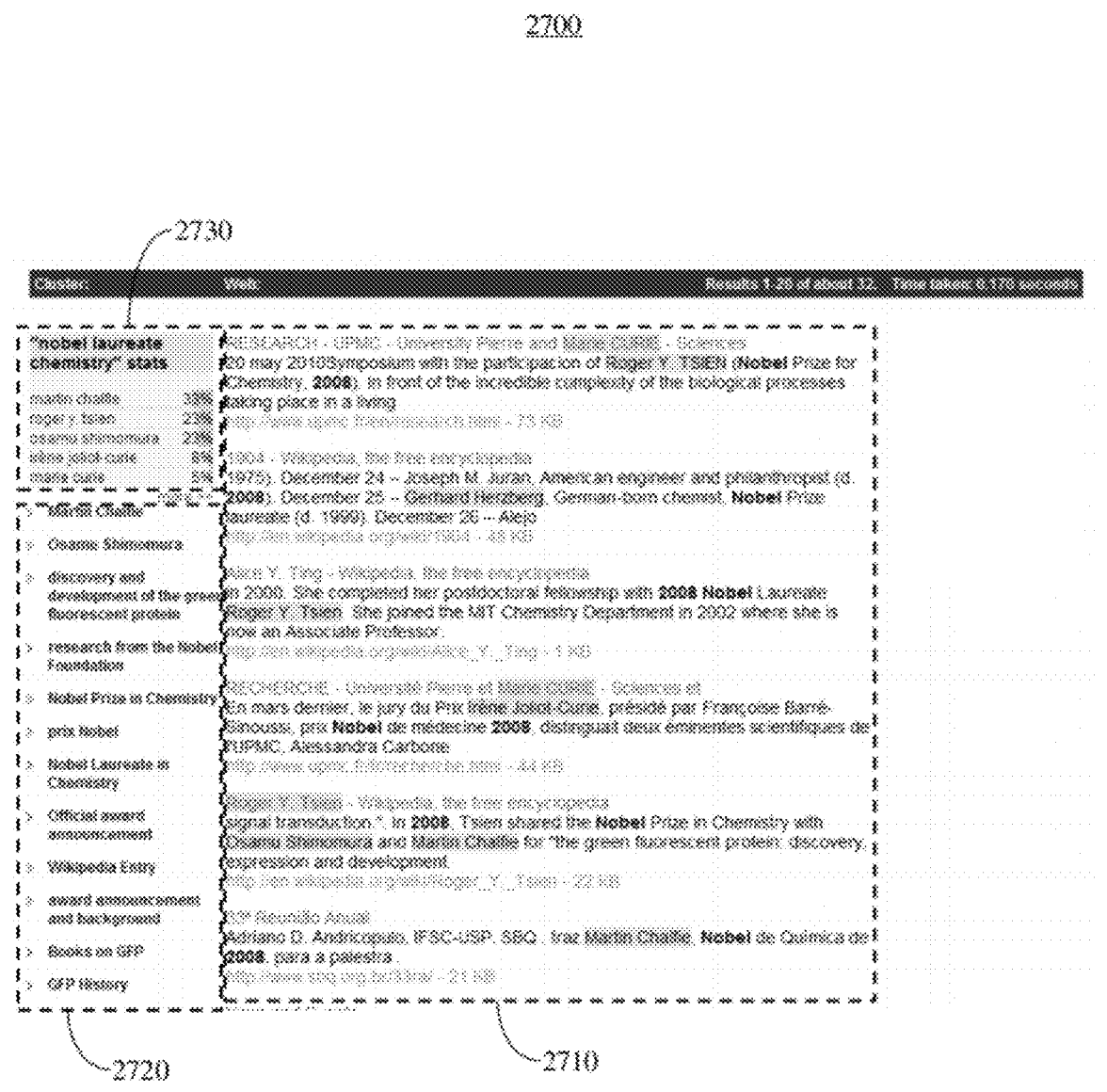

FIG. 27 shows exemplary on-screen graphical user interface 2700 for presenting search results in accordance with one embodiment of the present invention. As shown in FIG. 27, region 2710 includes at least one search result (e.g., 375). Region 2710 may also include respective information (e.g., a document identifier, title, URL, etc.) associated with each search result. And in one embodiment, region 2710 may include at least one search result generated responsive to a search performed based on search data (e.g., 2210, including at least one semantic key and a search query, etc.).

Region 2720 may include at least one semantic sub-key associated with a semantic key (e.g., 2234, determined based on search query focus 335, etc.). In one embodiment, a new search may be performed responsive to an interaction with a semantic sub-key displayed in region 2720. The new search may be performed based on a modified search query, where the modified search query may further include the semantic sub-key (e.g., selected from region 2720). The search results generated as a result of the new search may be displayed in region 2710 in one embodiment. And in one embodiment, the modification of the search query may be transparent to and/or hidden from a user (e.g., not displayed in a graphical user interface such as user interface 2100, another graphical user interface used to perform or initiate a search, etc.).

As shown in FIG. 27, region 2730 may include at least one statistical parameter associated with the at least one search result displayed in region 2710. For example, region 2730 may include a list of items (e.g., at least one word, at least one phrase, at least one semantic key, at least one semantic sub-key, some combination thereof, etc.) found in the at least one search result displayed in region 2710. Region 2730 may also include a respective number or value corresponding to each item in the list. In this manner, region 2730 may be used to provide information about the at least one search result (e.g., displayed in region 2710).

In one embodiment, the number or value may be a number of instances of a corresponding item (e.g., at least one word, at least one phrase, at least one semantic key, at least one semantic sub-key, some combination thereof, etc.) in the search results (e.g., displayed in region 2710). In one embodiment, the number or value may be a ratio or proportion associated with a corresponding item. For example, the number or value may be determined by dividing a number of instances of a corresponding item in the search results by a number of instances of a plurality of items (e.g., including the corresponding item, including all items displayed in region 2730, including all semantic sub-keys associated with at least one semantic key, etc.) in the search results. In one embodiment, the number or value may be associated with a frequency of a corresponding item in the search results. And in one embodiment, the number or value may be associated with other numerical information associated with a corresponding item (e.g., where the numerical information may be determined from one or more of the search results displayed in region 2710). For example, where an item displayed in region 2730 includes the semantic key "Mandarin," the numerical information may include a number of people who speak Mandarin.

In one embodiment, a new search may be performed responsive to an interaction with a word or phrase displayed in region 2730. The new search may be performed based on a modified search query, where the modified search query may further include the word or phrase (e.g., selected from region 2730). The search results generated as a result of the new search may be displayed in region 2710 in one embodiment. And in one embodiment, the modification of the search query may be transparent to and/or hidden from a user (e.g., not displayed in a graphical user interface such as user interface 2100, another graphical user interface used to perform or initiate a search, etc.).

In one embodiment, portions of the at least one search result (e.g., displayed in region 2710) corresponding to words or phrases found in region 2730 may be highlighted or otherwise indicated to a user (e.g., using a border surrounding the portion, etc.). In this manner, users can easily and efficiently find terms in the at least one search result displayed in region 2710.

In one embodiment, a new search may be performed responsive to an interaction with a portion of at least one search result (e.g., corresponding to a word or phrase displayed in region 2730) displayed in region 2710. The new search may be performed based on a modified search query, where the modified search query may further include the portion of at least one search result (e.g., selected from region 2710). The search results generated as a result of the new search may be displayed in region 2710 in one embodiment. And in one embodiment, the modification of the search query may be transparent to and/or hidden from a user (e.g., not displayed in a graphical user interface such as user interface 2100, another graphical user interface used to perform or initiate a search, etc.).

Although FIG. 27 depicts user interface 2700 with a certain number and arrangement of elements, it should be appreciated that user interface 2700 may have a different number and/or arrangement of elements in other embodiments. Additionally, although FIG. 27 depicts elements of user interface 2700 with a certain size and shape, it should be appreciated that elements of user interface 2700 may be a different size and/or shape in other embodiments.

Figure 28:
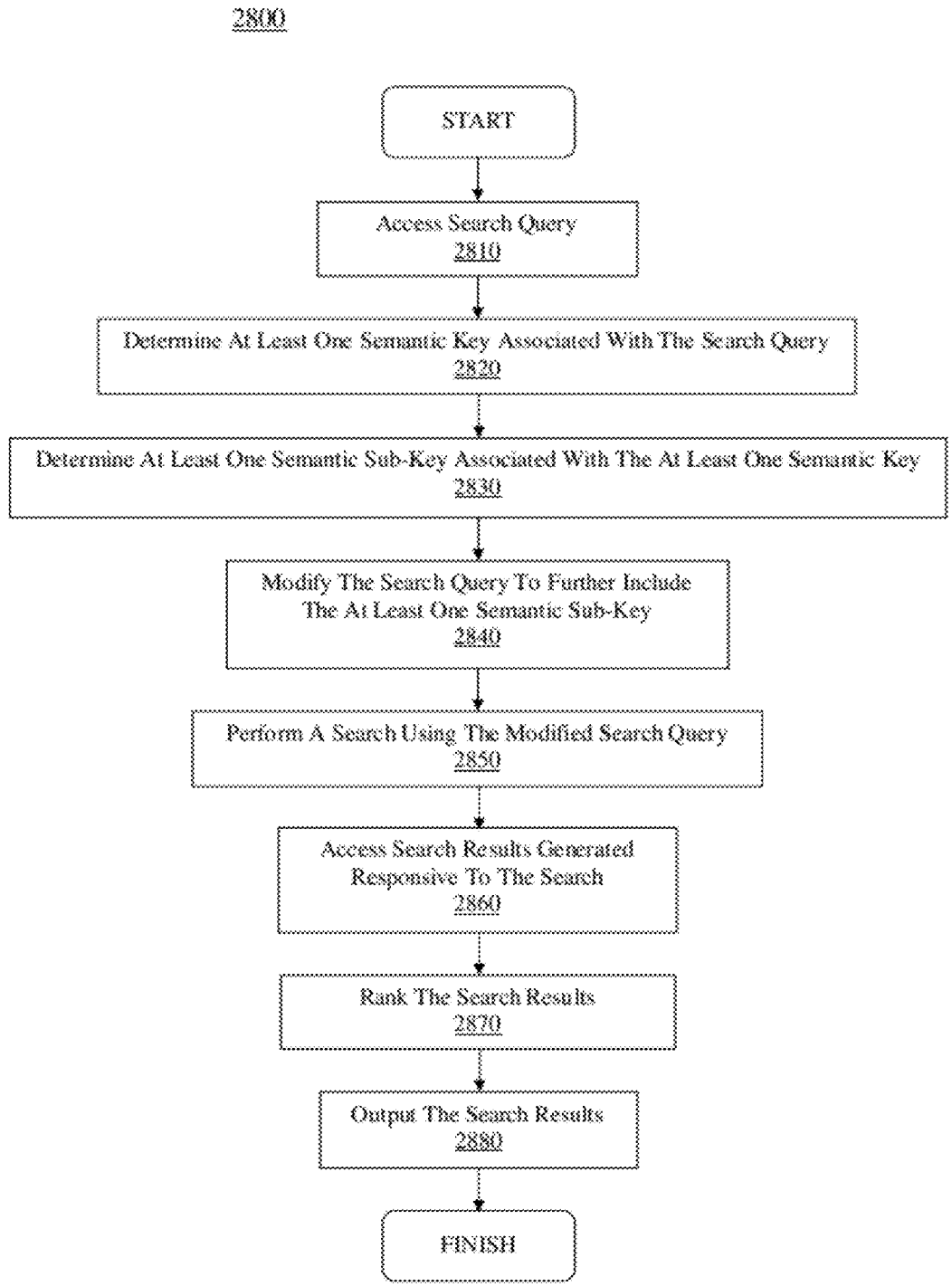
FIG. 28 shows an exemplary flow diagram of a computer-implemented process for performing a search based on an altered search query in accordance with one embodiment of the present invention.

FIG. 28 shows an exemplary flow diagram of computer-implemented process 2800 for performing a search based on an altered search query in accordance with one embodiment of the present invention. As the steps of process 2800 are described herein, reference will be made to exemplary data flow diagram 2900 of FIG. 29 to provide examples and help clarify the discussion.

As shown in FIG. 28, step 2810 involves accessing a search query (e.g., from search data 2210, search query input 310, etc.). In one embodiment, where the search query is accessed from search data (e.g., 2210), the search query may be extracted from the search data or otherwise generated by a search data processor (e.g., 2230).

Step 2820 involves determining at least one semantic key associated with the search query (e.g., accessed in step 2810). In one embodiment, the at least one semantic key may be determined (e.g., using search data processor 2230) from search data (e.g., 2210) in step 2820. In one embodiment, the at least one semantic key may be determined (e.g., using grammatical analyzer 330 and/or semantic key processor 340) in step 2820 based on a focus of a search query (e.g., 335), where the search query focus (e.g., 335) may be used to index a semantic key database (e.g., 342) to access the at least one semantic key.

Figure 29:
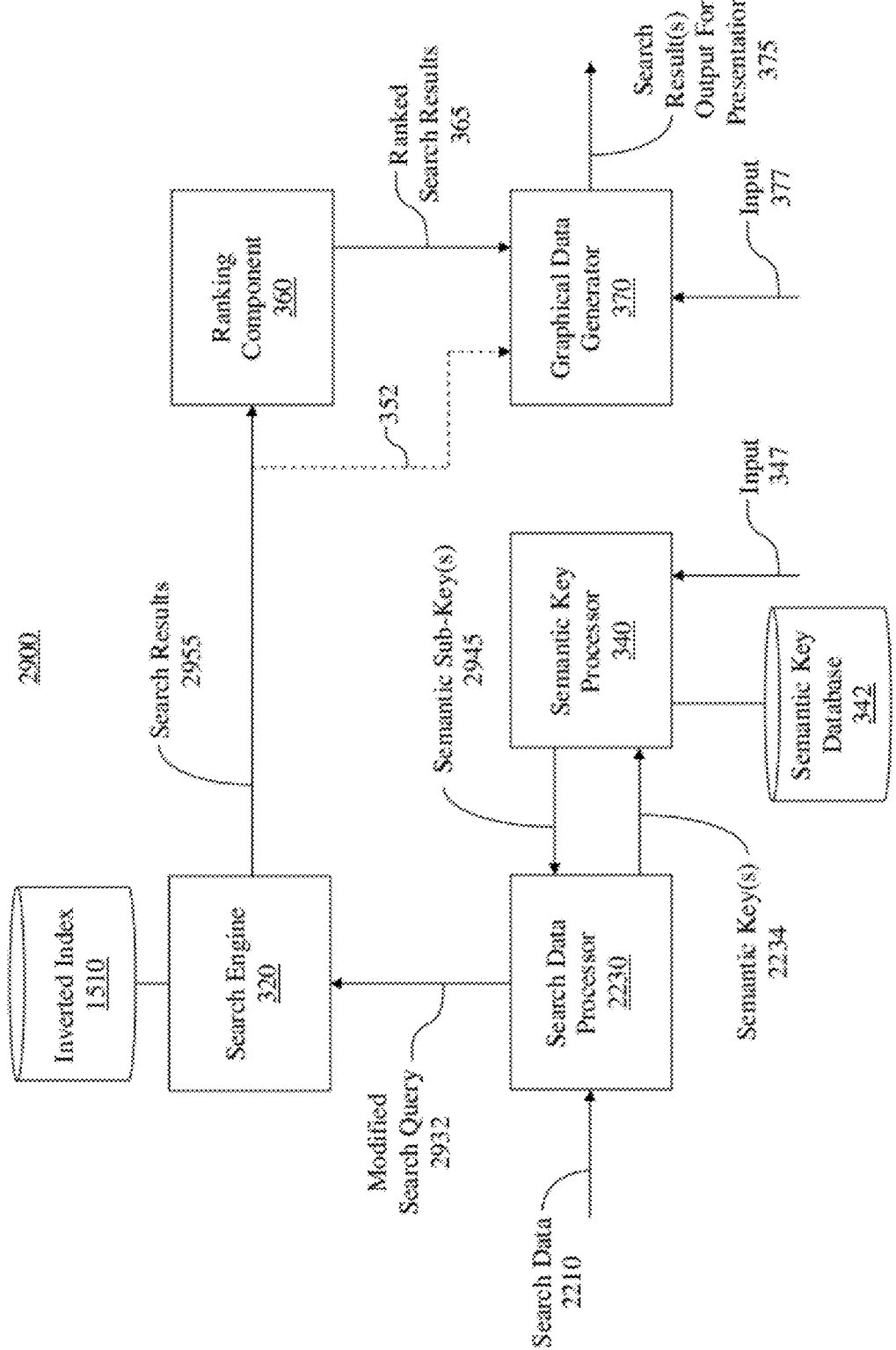
FIG. 29 shows an exemplary data flow diagram of the performance of a search using a modified search query in accordance with one embodiment of the present invention.

As shown in FIG. 28, step 2830 involves determining at least one semantic sub-key (e.g., 2945 as shown in FIG. 29) associated with the at least one semantic key (e.g., determined in step 2820). In one embodiment, the at least one semantic sub-key may be determined (e.g., using semantic key processor 340) by indexing a semantic key database (e.g., 342) using the semantic key to access the at least one semantic sub-key (e.g., 2945 as shown in FIG. 29).

Step 2840 involves modifying the search query to further include the at least one semantic sub-key (e.g., 2945). In one embodiment, the search query (e.g., accessed in step 2810) may be modified to further include the at least one semantic sub-key (e.g., 2945) by search data processor 2230, where search data processor 2230 may output the modified search query as modified search query 2932 (e.g., as shown in FIG. 29).

Step 2850 involves performing a search based on the modified search query (e.g., 2932, generated in step 2840, etc.). The search may be a keyword search (e.g., based upon one or more words or keywords of the modified search query). Search engine 320 may perform the search in step 2850 based on the modified search query and generate search results 2955 based thereon (e.g., by indexing inverted index 1510 using modified search query 2932 to access and/or generate search results 2955). The search results (e.g., 2955) may include at least one webpage, at least one electronic document or file, advertising content, some combination thereof, etc. In one embodiment, the search results generated in step 2850 (e.g., search results 2955) may be the same or similar to the filtered search results (e.g., 355) output by filtering component 350 (e.g., as shown in FIG. 22).

As shown in FIG. 20, step 2860 involves accessing search results (e.g., 2955) generated responsive to the search (e.g., performed in step 2850). The search results may be accessed by a component capable of ranking the search results (e.g., ranking component 360 as shown in FIG. 22) in one embodiment.

Step 2870 involves ranking the search results (e.g., 2955, the search results accessed in step 2860, etc.). For example, ranking component 360 may rank the search results (e.g., 2955) to generate ranked search results 365 (e.g., as discussed above with respect to FIG. 2, FIG. 3, FIG. 7A, FIG. 7B, FIG. 8A, FIG. 8B, etc.). In one embodiment, step 2870 may be performed similarly to and/or analogously to step 270 of process 200.

In one embodiment, the ranking may be performed in step 2870 based on or data associated with search data (e.g., 2210) or a portion thereof (e.g., a search query, at least one semantic key 2234, etc.). For example, search results may be ranked in step 2870 based on a frequency of at least one semantic key (e.g., 2234, determined in step 2820, etc.), based on a frequency of at least one semantic sub-key (e.g., associated with at least one semantic key 2234, determined in step 2830, etc.), based on a frequency of at least one keyword of the search query (e.g., accessed in step 2810), based on a proximity or distance (e.g., measured in words, lines, paragraphs, etc.) between at least one semantic key (e.g., 2234, determined in step 2820, etc.) and at least one keyword of the search query (e.g., accessed in step 2810), based on a proximity or distance (e.g., measured in words, lines, paragraphs, etc.) between at least one semantic sub-key (e.g., associated with at least one semantic key 2234, determined in step 2830, etc.) and at least one keyword of the search query (e.g., accessed in step 2810), etc.

As shown in FIG. 28, step 2880 involves outputting the search results (e.g., the search results accessed in step 2860, the ranked search results generated in step 2870, etc.). For example, graphical data generator 370 may output at least one search result (e.g., 375) for presentation (e.g., as discussed above with respect to FIG. 2, FIG. 3, etc.). In one embodiment, the at least one search result (e.g., 375) may be output in step 2880 for presentation based on input 377. And in one embodiment, step 2880 may be performed similarly to and/or analogously to step 280 of process 200.

In one embodiment, process 2800 may be used to search for and/or output advertising content. For example, where the search results accessed in step 2860 include advertising content (e.g., at least one advertisement), step 2880 may involve outputting the search results (e.g., including advertising content). The search results (e.g., including advertising content) may be output in step 2880 to be presented contemporaneously with webpage search results (e.g., using an on-screen graphical user interface such as user interface 2100, user interface 2700, etc.). In one embodiment, the webpage search results and the search results including advertising content may be generated or accessed based on the same search query (e.g., a search query modified to include at least one semantic sub-key associated with at least one semantic key), the same at least one semantic key, the same at least one semantic sub-key, some combination thereof, etc. For example, webpage search results and the search results including advertising content may be generated or accessed based on modified search query 2932 which includes one or more semantic sub-keys 2945 (e.g., "Coke," "Pepsi," "Fanta," "Dr. Pepper," etc.) associated with one or more semantic keys 2234 (e.g., "soft drink"). In this manner, embodiments of the present invention enable adverting content to be returned (e.g., responsive to a search performed using a search query, at least one semantic key, at least one semantic sub-key, some combination thereof, etc.) and/or displayed contemporaneously with webpage search results, where the advertising content (e.g., associated with at least one semantic key, at least one semantic sub-key, some combination thereof, etc.) may be more relevant to the search query and/or the webpage search results.

Although FIG. 28 shows process 2800 with a specific number of steps, it should be appreciated that process 2800 may have a different number of steps in other embodiments. Although FIG. 28 shows process 2800 with a specific ordering of steps, it should be appreciated that process 2800 may have a different ordering of steps in other embodiments.

Although FIG. 29 shows process 2900 with a specific number of steps, it should be appreciated that process 2900 may have a different number of steps in other embodiments. Although FIG. 29 shows process 2900 with a specific ordering of steps, it should be appreciated that process 2900 may have a different ordering of steps in other embodiments.

Automatic Generation of a Search Query

Figure 30:
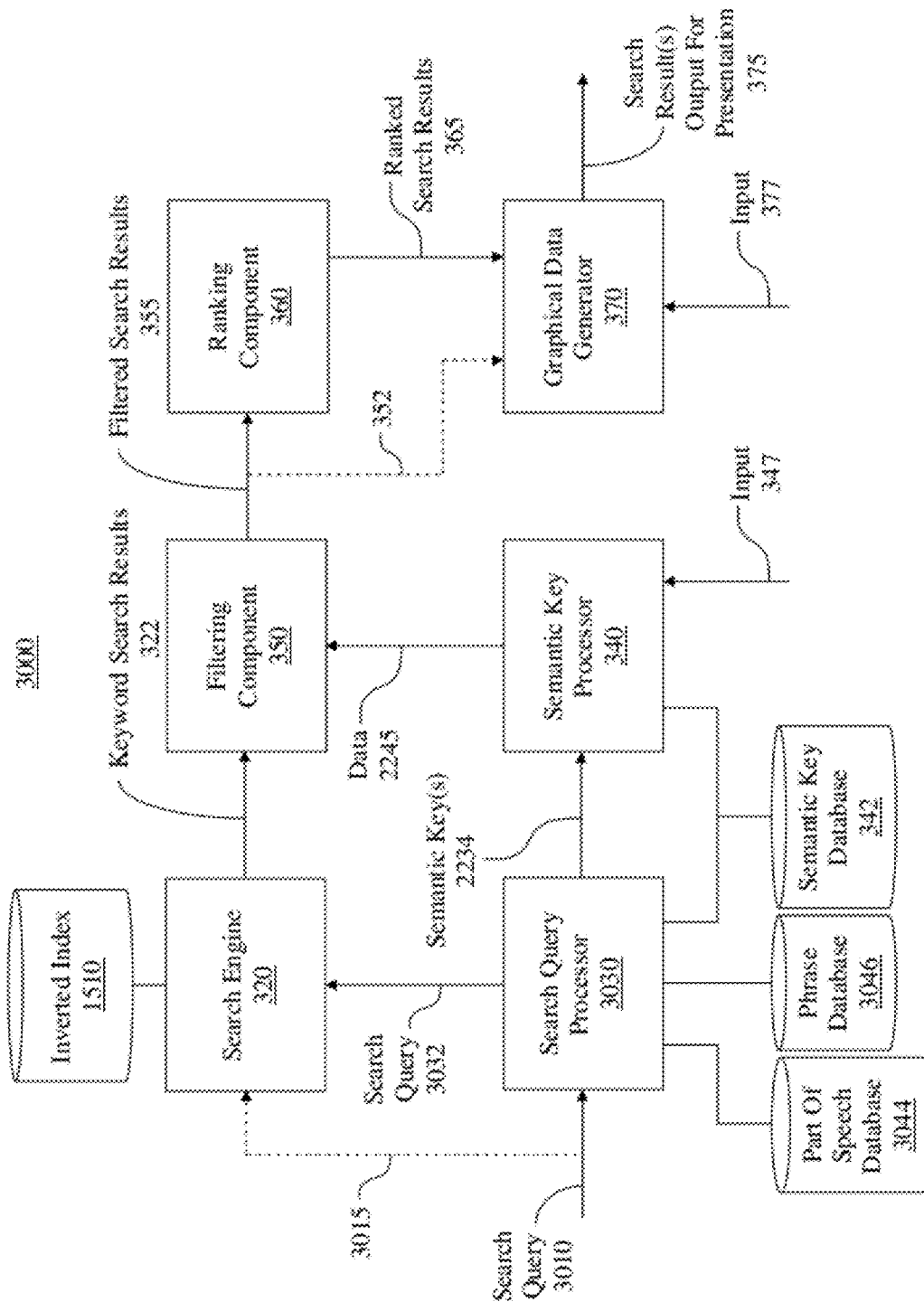
FIG. 30 shows an exemplary data flow diagram of the performance of a search based on an automatically-generated search query in accordance with one embodiment of the present invention.

FIG. 30 shows exemplary data flow diagram 3000 of the performance of a search based on an automatically-generated search query in accordance with one embodiment of the present invention. As shown in FIG. 30, search query processor 3030 may access a first search query (e.g., 3010) and determine that a first portion of the first search query (e.g., 3010) includes at least one semantic key (e.g., 2234). Responsive to determining that the first portion of the first search query (e.g., 3010) includes at least one semantic key (e.g., 2234), search query processor 3030 may automatically generate a second search query (e.g., 3032) based on the first search query (e.g., 3010). The second search query (e.g., 3032) may be generated (e.g., by search query processor 3030) by modifying the first search query (e.g., 3010) or by creating a new search query based on the first search query (e.g., 3010). The second search query (e.g., 3032) may be free of the first portion of the first search query (e.g., 3010) and/or may be different from the first search query (e.g., 3010). A first search may be performed (e.g., by search engine 320) based on the second search query (e.g., 3032), where search results generated responsive to the first search (e.g., keyword search results 322, filtered search results 355, ranked search results 365, search results output for presentation 375, etc.) may include one or more instances of at least one semantic sub-key associated with the at least one semantic key (e.g., 2234).

In one embodiment, filtering may be performed (e.g., by filtering component 350) using data 2245 (e.g., including at least one document identifier of at least one document associated with the at least one semantic key, at least one complete document associated with the at least one semantic key, at least one portion of at least one document associated with the at least one semantic key, other information associated with at least one document associated with the at least one semantic key, some combination thereof, etc.) from semantic key processor 340 such that each document of the search results includes at least one respective instance of the at least one semantic sub-key associated with the at least one semantic key (e.g., 2234). Accordingly, by utilizing search query processor 3030 to automatically recognize at least one semantic key in the first search query (e.g., 3010), more relevant search results may be returned (e.g., using search query 3032) while relieving the user of manually entering the semantic key separately from the search query (e.g., including at least one keyword) and/or demarcating the semantic key and the search query (e.g., including at least one keyword).

In one embodiment, search query processor 3030 may determine that the first portion of the first search query (e.g., 3010) includes at least one semantic key (e.g., 2234) by indexing semantic key database 342 (e.g., as shown in FIG. 30) using the first portion to access or retrieve the at least one semantic key (e.g., 2234). And in other embodiments, search query processor 3030 may alternatively determine that the first portion includes at least one semantic key.

Search query 3010 may be input by a user in one embodiment. Search query 3010 may be free of symbols (e.g., colons, hyphens, operators, etc.) and/or without any demarcation of the first portion (e.g., including the at least one semantic key) and other portions (e.g., including one or more keywords). As such, in one embodiment, search query 3010 may be input by a user as a normal keyword search query, and the automatic recognition of the at least one semantic key and the automatic generation of the second search query (e.g., 3032) may be performed transparently to the user.

In one embodiment, the first search query (e.g., 3010) may be accessed (e.g., by search engine 320 as indicated by dashed arrow 3015) and a second search may be performed (e.g., by search engine 320) based on the first search query (e.g., 3010). Search results generated responsive to the first search (e.g., based on search query 3032) and the second search (e.g., based on search query 3010) may be analyzed (e.g., using one or more components such as ranking component 360, filtering component 350, semantic key processor 340, search query processor 3030, etc.) to automatically determine which search results to output for presentation (e.g., to a user via a graphical user interface). The analysis may involve determining the most relevant set of search results by scoring the sets of search results based on one or more parameters, where the most relevant set of search results may be output (e.g., by graphical data generator 370 as search results output for presentation 375). Input 377 may be used to select the set of search results output by graphical data generator 370, where input 377 may be a system-generated input (e.g., from ranking component 360, filtering component 350, semantic key processor 340, search query processor 3030, etc.) in one embodiment. The analysis may involve determining a ratio of a quantity associated with the search results of the first search to a quantity associated with the search results of the second search, where the search results of the first search may be output if the ratio exceeds a predetermined threshold. In this manner, a set of search results for output may be automatically selected from multiple sets of search results, thereby allowing more relevant search results to be output in some cases.

In one embodiment, a user may be presented with an option to switch between the sets of search results. For example, a graphical user interface (e.g., used to present search results output from presentation 375 such as GUI 1300, GUI 2700, etc.) may include an element allowing a user to selectively display search results of the first search and/or search results of the second search. In this case, input 377 (e.g., as shown in FIG. 30) may be a user input generated responsive to an interaction with a graphical user interface. As such, a user may selectively display the first search results and/or second search results to quickly determine which set of search results is preferable and/or most relevant, whether the automatically-selected set of search results is preferable and/or most relevant, etc.

The second search query (e.g., 3032) may be generated by search query processor 3030 responsive to determining that a second portion of the first search query (e.g., separate from the first portion including the semantic key) is associated with a predetermined part of speech (e.g., a relative pronoun, an interrogative pronoun, a preposition, a verb, etc.) in one embodiment. In this case, the second search query (e.g., 3032) may be generated such that it is free of the first portion and the second portion (e.g., that were included in or part of the first search query). As such, automatic recognition of a predetermined part of speech in the first search query (e.g., 3010) may provide one or more advantages (e.g., more efficient generation of the second search query by automatically demarcating the semantic key and at least one keyword in the first search query, more relevant search results may be provided by excluding the second portion of the first search query, confirmation of the decision to output search results generated based on the second search query, etc.).

In one embodiment, search query processor 3030 may determine that the second portion of the first search query (e.g., 3010) is associated with a predetermined part of speech by indexing part of speech database 3044 (e.g., as shown in FIG. 30) using the second portion to access or retrieve one or more of the predetermined parts of speech. And in other embodiments, search query processor 3030 may alternatively determine that the second portion includes a predetermined part of speech.

Search query processor 3030 may determine whether a first portion of the first search query (e.g., including the semantic key) and a second portion of the first search query (e.g., including one or more words separate from the semantic key) are associated with a phrase. If it is determined that the first and second portions are not associated with a phrase, then the second search query (e.g., 3032 that excludes the semantic key) may be generated. Alternatively, if it is determined that the first and second portions are associated with a phrase, then the second search query (e.g., 3032) may not be generated. In this case, search results generated based on the first search query (e.g., 3010) may be provided. Accordingly, the first and second portions of the search query may be advantageously used to more efficiently provide search results.

In one embodiment, search query processor 3030 may determine whether the first and second portions of the first search query (e.g., 3010) are associated with a phrase by indexing phrase database 3046 (e.g., as shown in FIG. 30) using the first and second portions. If one or more phrases are returned responsive to the indexing, then search query processor 3030 may determine that the first and second portions are associated with the one or more phrases. Alternatively, if no phrases are returned responsive to the indexing, then search query processor 3030 may determine that the first and second portions are not associated with a phrase. And in other embodiments, search query processor 3030 may alternatively determine whether the first and second portions are associated with a phrase.

Figure 31:
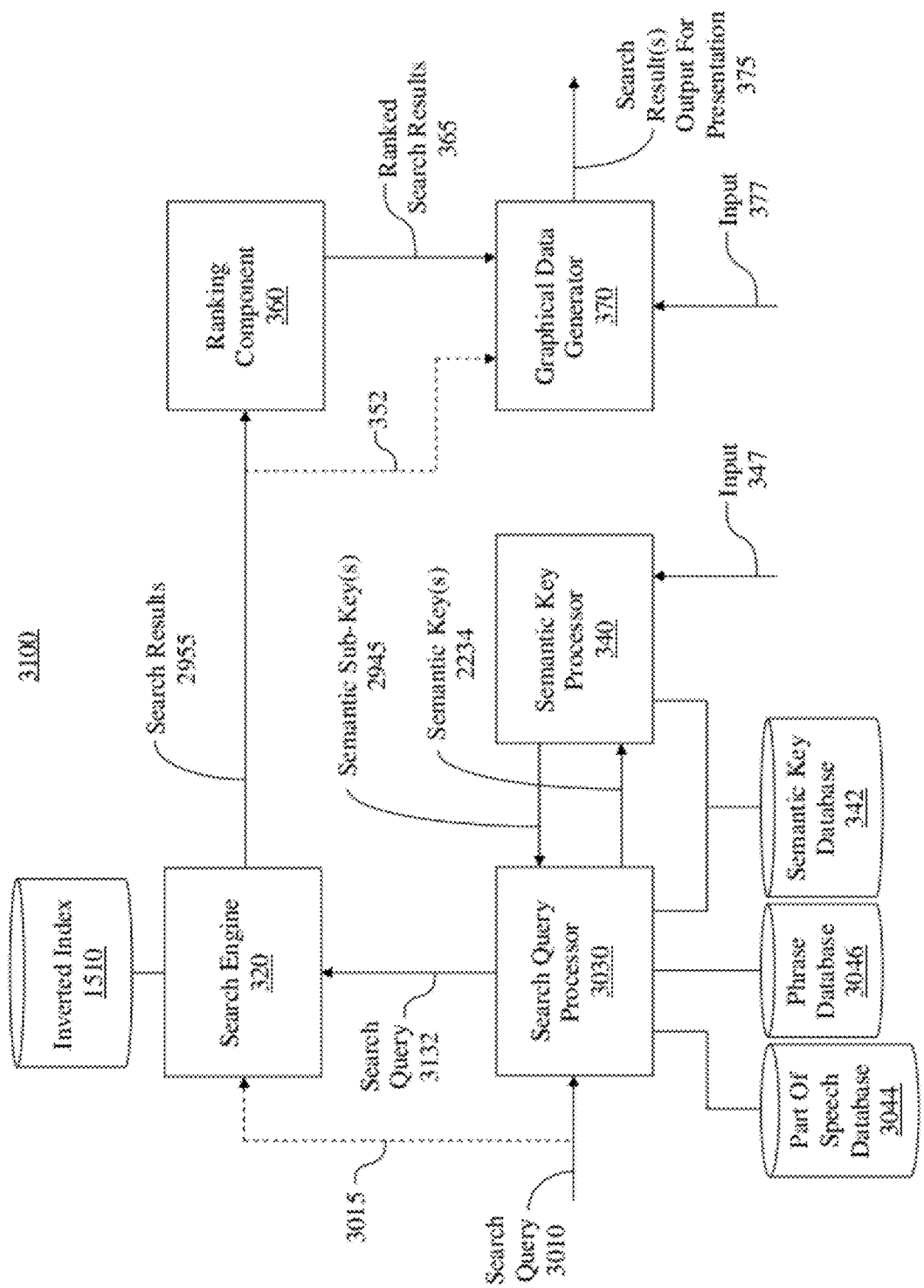
FIG. 31 shows an exemplary data flow diagram of the performance of a search based on an automatically-generated search query including at least one semantic sub-key in accordance with one embodiment of the present invention.

FIG. 31 shows exemplary data flow diagram 3100 of the performance of a search based on an automatically-generated search query including at least one semantic sub-key in accordance with one embodiment of the present invention. As shown in FIG. 31, search query processor 3030 may access a first search query (e.g., 3010) and determine that a first portion of the first search query (e.g., 3010) includes at least one semantic key (e.g., 2234). Responsive to determining that the first portion of the first search query (e.g., 3010) includes at least one semantic key (e.g., 2234), search query processor 3030 may automatically generate a second search query (e.g., 3132) based on the first search query (e.g., 3010). The second search query (e.g., 3132) may include at least one semantic sub-key 2945 (e.g., received by semantic key processor 340) associated with at least one semantic key 2234 (e.g., provided to semantic key processor 340). The second search query (e.g., 3132) may be free of the first portion of the first search query (e.g., 3010) and/or may be different from the first search query (e.g., 3010) in one embodiment. Additionally, the second search query (e.g., 3132) may be generated (e.g., by search query processor 3030) by modifying the first search query (e.g., 3010) or by creating a new search query based on the first search query (e.g., 3010).

A first search may be performed (e.g., by search engine 320) based on the second search query (e.g., 3132), where search results generated responsive to the first search (e.g., search results 2955, ranked search results 365, search results output for presentation 375, etc.) may include one or more instances of the at least one semantic sub-key (e.g., 2945) associated with the at least one semantic key (e.g., 2234). In one embodiment, each document of the search results may include at least one respective instance of the at least one semantic sub-key (e.g., 2945) associated with the at least one semantic key (e.g., 2234). Accordingly, by utilizing search query processor 3030 to automatically recognize at least one semantic key in the first search query (e.g., 3010), more relevant search results may be returned (e.g., using search query 3132) while relieving the user of manually entering the semantic key separately from the search query (e.g., including at least one keyword) and/or demarcating the semantic key and the search query (e.g., including at least one keyword).

In one embodiment, search query processor 3030 may determine that the first portion of the first search query (e.g., 3010) includes at least one semantic key (e.g., 2234) by indexing semantic key database 342 (e.g., as shown in FIG. 31) using the first portion to access or retrieve the at least one semantic key (e.g., 2234). And in other embodiments, search query processor 3030 may alternatively determine that the first portion includes at least one semantic key.

Search query 3010 may be input by a user in one embodiment. Search query 3010 may be free of symbols (e.g., colons, hyphens, operators, etc.) and/or without any demarcation of the first portion (e.g., including the at least one semantic key) and other portions (e.g., including one or more keywords). As such, in one embodiment, search query 3010 may be input by a user as a normal keyword search query, and the automatic recognition of the at least one semantic key and the automatic generation of the second search query (e.g., 3132) may be performed transparently to the user.

In one embodiment, the first search query (e.g., 3010) may be accessed (e.g., by search engine 320 as indicated by dashed arrow 3015) and a second search may be performed (e.g., by search engine 320) based on the first search query (e.g., 3010). Search results generated responsive to the first search (e.g., based on search query 3132) and the second search (e.g., based on search query 3010) may be analyzed (e.g., using one or more components such as ranking component 360, semantic key processor 340, search query processor 3030, etc.) to automatically determine which search results to output for presentation (e.g., to a user via a graphical user interface). The analysis may involve determining the most relevant set of search results by scoring the sets of search results based on one or more parameters, where the most relevant set of search results may be output (e.g., by graphical data generator 370 as search results output for presentation 375). Input 377 may be used to select the set of search results output by graphical data generator 370, where input 377 may be a system-generated input (e.g., from ranking component 360, semantic key processor 340, search query processor 3030, etc.) in one embodiment. The analysis may involve determining a ratio of a quantity associated with the search results of the first search to a quantity associated with the search results of the second search, where the search results of the first search may be output if the ratio exceeds a predetermined threshold. In this manner, a set of search results for output may be automatically selected from multiple sets of search results, thereby allowing more relevant search results to be output in some cases.

In one embodiment, a user may be presented with an option to switch between the sets of search results. For example, a graphical user interface (e.g., used to present search results output from presentation 375 such as GUI 1300, GUI 2700, etc.) may include an element allowing a user to selectively display search results of the first search and/or search results of the second search. In this case, input 377 (e.g., as shown in FIG. 31) may be a user input generated responsive to an interaction with a graphical user interface. As such, a user may selectively display the first search results and/or second search results to quickly determine which set of search results is preferable and/or most relevant, whether the automatically-selected set of search results is preferable and/or most relevant, etc.

The second search query (e.g., 3132) may be generated by search query processor 3030 responsive to determining that a second portion of the first search query (e.g., separate from the first portion including the semantic key) is associated with a predetermined part of speech (e.g., a relative pronoun, an interrogative pronoun, a preposition, a verb, etc.) in one embodiment. In this case, the second search query (e.g., 3132) may be generated such that it is free of the first portion and the second portion (e.g., that were included in or part of the first search query). As such, automatic recognition of a predetermined part of speech in the first search query (e.g., 3010) may provide one or more advantages (e.g., more efficient generation of the second search query by automatically demarcating the semantic key and at least one keyword in the first search query, more relevant search results may be provided by excluding the second portion of the first search query, confirmation of the decision to output search results generated based on the second search query, etc.).

In one embodiment, search query processor 3030 may determine that the second portion of the first search query (e.g., 3010) is associated with a predetermined part of speech by indexing part of speech database 3044 (e.g., as shown in FIG. 31) using the second portion to access or retrieve one or more of the predetermined parts of speech. And in other embodiments, search query processor 3030 may alternatively determine that the second portion includes a predetermined part of speech.

Search query processor 3030 may determine whether a first portion of the first search query (e.g., including the semantic key) and a second portion of the first search query (e.g., including one or more words separate from the semantic key) are associated with a phrase. If it is determined that the first and second portions are not associated with a phrase, then the second search query (e.g., 3132 that excludes the semantic key) may be generated. Alternatively, if it is determined that the first and second portions are associated with a phrase, then the second search query (e.g., 3132) may not be generated. In this case, search results generated based on the first search query (e.g., 3010) may be provided. Accordingly, the first and second portions of the search query may be advantageously used to more efficiently provide search results.

In one embodiment, search query processor 3030 may determine whether the first and second portions of the first search query (e.g., 3010) are associated with a phrase by indexing phrase database 3046 (e.g., as shown in FIG. 31) using the first and second portions. If one or more phrases are returned responsive to the indexing, then search query processor 3030 may determine that the first and second portions are associated with the one or more phrases. Alternatively, if no phrases are returned responsive to the indexing, then search query processor 3030 may determine that the first and second portions are not associated with a phrase. And in other embodiments, search query processor 3030 may alternatively determine whether the first and second portions are associated with a phrase.

Figure 32A:
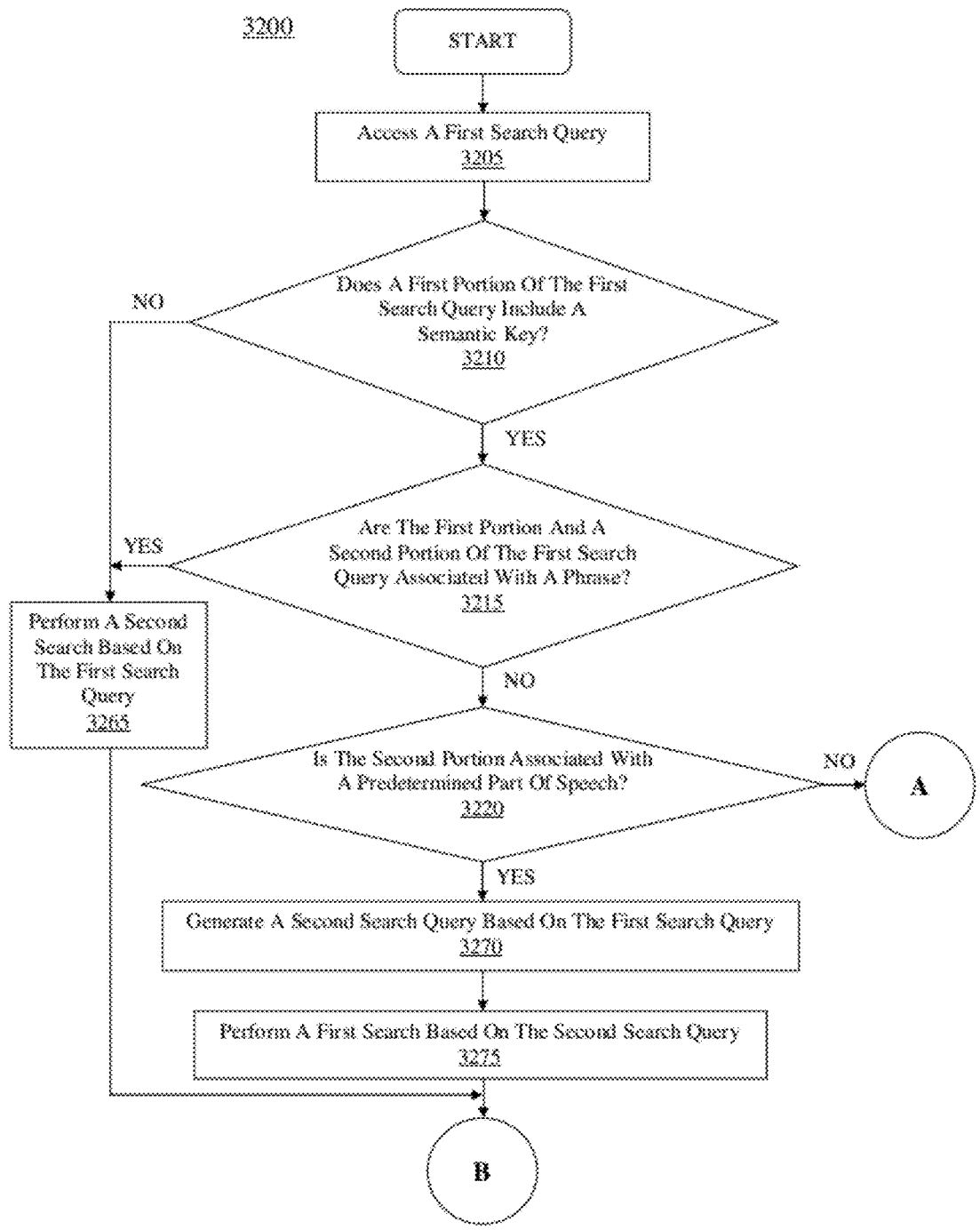
FIG. 32A shows a first portion of a flowchart of an exemplary computer-implemented process for automatic generation of a search query in accordance with one embodiment of the present invention.
Figure 32B:
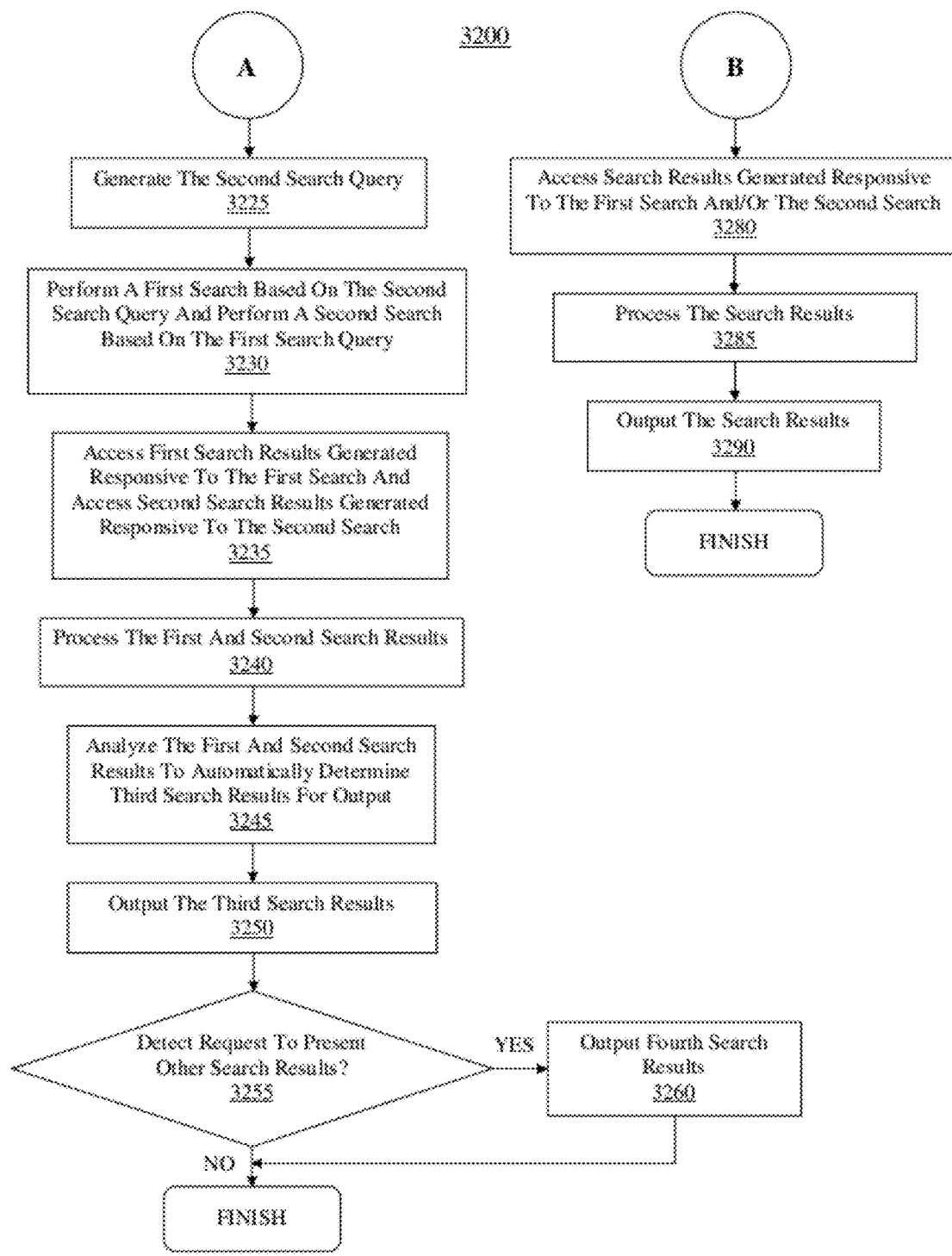
FIG. 32B shows a second portion of a flowchart of an exemplary computer-implemented process for automatic generation of a search query in accordance with one embodiment of the present invention.

FIGS. 32A and 32B show a flowchart of exemplary computer-implemented process 3200 for automatic generation of a search query in accordance with one embodiment of the present invention. As shown in FIG. 32A, step 3205 involves accessing a first search query. The first search query (e.g., 3010) may be accessed in step 3205 by a search query processor (e.g., 3030) in one embodiment.

Step 3210 involves determining whether a first portion of the first search query (e.g., 3010) includes a semantic key (e.g., 2234). Step 3210 may be performed by a search query processor (e.g., 3030) in one embodiment.

In one embodiment, step 3210 may involve determining whether a first portion of the first search query (e.g., 3010) includes at least one semantic key by indexing a semantic key database (e.g., 342) using the first portion to access or retrieve at least one semantic key. In this case, if at least one semantic key is returned, then it may be determined in step 3210 that the first portion includes a semantic key. Alternatively, if at least one semantic key is not returned, then it may be determined in step 3210 that the first portion does not include a semantic key.

In one embodiment, it may be determined in step 3210 that a first portion of the first search query includes a semantic key if the first portion exactly matches a semantic key (e.g., including one or more words). For example, if a search query includes the words "color Ferrari," then it may be determined in step 3210 that a first portion of the first search query (e.g., the word "color") includes the semantic key "color" since there is an exact match between the first portion and a semantic key.

In one embodiment, it may be determined in step 3210 that a first portion of the first search query includes a semantic key where the first portion includes at least one word or character between multiple words of the semantic key. For example, where a first portion of the first search query includes the words "French Nobel laureate for chemistry," it may be determined in step 3210 that the first portion of the first search query includes the semantic key "Nobel laureate chemistry."

If it is determined in step 3210 that a first portion of the first search query does not include a semantic key, then process 3200 may proceed to step 3265. Alternatively, if it is determined in step 3210 that a first portion of the first search query includes a semantic key, then process 3200 may proceed to step 3215.

As shown in FIG. 32A, step 3215 involves determining whether the first portion and a second portion of the first search query (e.g., 3010) are associated with a phrase. Step 3215 may be performed by a search query processor (e.g., 3030) in one embodiment.

In one embodiment, step 3215 may involve determining whether the first and second portions are associated with a phrase by indexing a phrase database (e.g., 3046) using the first and second portions to access or retrieve a phrase. In this case, if a phrase is returned, then it may be determined in step 3215 that the first and second portions are associated with a phrase. Alternatively, if a phrase is not returned, then it may be determined in step 3215 that the first and second portions are not associated with a phrase.

As an example, where a search query includes the words "united nations," it may be determined in step 3215 that a first portion (e.g., the word "nations") and a second portion (e.g., the word "united") are associated with the phrase "united nations." As such, the word "nations" that would otherwise be considered a semantic key, may be treated as a normal keyword (and not a semantic key) since it is part of the phrase "united nations."

As another example, where a search query includes the words "NATO member nations," it may be determined in step 3215 that a first portion (e.g., the word "nations") and a second portion (e.g., the words "NATO member") are not associated with a phrase (e.g., "NATO member nations" is not a phrase, "nations NATO member" is not a phrase, etc.). As such, the word "nations" may be considered a semantic key since it is determined to not be part of a phrase.

If it is determined in step 3215 that the first and second portions of the first search query (e.g., 3010) are associated with a phrase, then process 3200 may proceed to step 3265. Alternatively, if it is determined in step 3215 that the first and second portions of the first search query (e.g., 3010) are not associated with a phrase, then process 3200 may proceed to step 3220.

As shown in FIG. 32A, step 3220 involves determining whether the second portion of the first search query is associated with a predetermined part of speech. In one embodiment, the predetermined part of speech may be relative pronoun, an interrogative pronoun, a preposition, a verb, etc. Step 3220 may be performed by a search query processor (e.g., 3030) in one embodiment.

In one embodiment, step 3220 may involve determining whether the second portion of the first search query is associated with a predetermined part of speech by indexing a part of speech database (e.g., 3044) using the second portion to access or retrieve at least one word that is a predetermined part of speech. In this case, if at least one word that is a predetermined part of speech is returned, then it may be determined in step 3220 that the second portion of the first search query is associated with a predetermined part of speech. Alternatively, if at least one word that is a predetermined part of speech is not returned, then it may be determined in step 3220 that the second portion of the first search query is not associated with a predetermined part of speech.

As an example of a predetermined part of speech being a relative pronoun (e.g., that, which, what, who, whom, whose, whatever, whoever, whomever, etc.), a search query may include the words "US president who was born in California." In this case, the second portion of the search query (e.g., the word "who") may be determined in step 3220 to be associated with a predetermined part of speech (e.g., a relative pronoun).

As another example of a predetermined part of speech being a relative pronoun (e.g., that, which, what, who, whom, whose, whatever, whoever, whomever, etc.), a search query may include the words "young chess player that beat Kasparov." In this case, the second portion of the search query (e.g., the word "that") may be determined in step 3220 to be associated with a predetermined part of speech (e.g., a relative pronoun).

As an example of a predetermined part of speech being an interrogative pronoun (e.g., a pronoun used to ask a question such as who, whom, what, which, whose, etc.), a search query may include the words "which US president was born in California." In this case, the second portion of the search query (e.g., the word "which") may be determined in step 3220 to be associated with a predetermined part of speech (e.g., an interrogative pronoun).

As another example of a predetermined part of speech being an interrogative pronoun (e.g., a pronoun used to ask a question such as who, whom, what, which, whose, etc.), a search query may include the words "iPhone comes in what colors." In this case, the second portion of the search query (e.g., the word "what") may be determined in step 3220 to be associated with a predetermined part of speech (e.g., an interrogative pronoun).

As an example of a predetermined part of speech being a preposition (e.g., of, to, in, from, at, by, etc.), a search query may include the words "US president from California." In this case, the second portion of the search query (e.g., the word "from") may be determined in step 3220 to be associated with a predetermined part of speech (e.g., a preposition).

As another example of a predetermined part of speech being a preposition (e.g., of, to, in, from, at, by, etc.), a search query may include the words "colors of iPhone." In this case, the second portion of the search query (e.g., the word "of") may be determined in step 3220 to be associated with a predetermined part of speech (e.g., a preposition).

As an example of a predetermined part of speech being a verb, a search query may include the words "US president born in California." In this case, the second portion of the search query (e.g., the word "born") may be determined in step 3220 to be associated with a predetermined part of speech (e.g., a verb).

As another example of a predetermined part of speech being a verb, a search query may include the words "young chess player beat Kasparov." In this case, the second portion of the search query (e.g., the word "beat") may be determined in step 3220 to be associated with a predetermined part of speech (e.g., a verb).

As yet another example of a predetermined part of speech being a verb, a search query may include the words "Kasparov beat young chess player." In this case, the second portion of the search query (e.g., the word "beat") may be determined in step 3220 to be associated with a predetermined part of speech (e.g., a verb).

If it is determined in step 3220 that the second portion of the first search query (e.g., 3010) is associated with a predetermined part of speech, then process 3200 may proceed to step 3270. Alternatively, if it is determined in step 3220 that the second portion of the first search query (e.g., 3010) is not associated with a predetermined part of speech, then process 3200 may proceed to step 3225.

As shown in FIG. 32B, step 3225 involves generating the second search query (e.g., 3032, 3132, etc.). The second search query may be automatically generated in step 3225 by a search query processor (e.g., 3030) based on the first search query (e.g., 3010 accessed in step 3205). The second search query may be automatically generated in step 3225 responsive to determining that the first portion of the first search query includes at least one semantic key (e.g., in step 3210).

In one embodiment, step 3225 may involve generating the second search query such that it is free of the first portion of the first search query (e.g., including at least one semantic key determined or identified in step 3210) and/or such that it is different from the first search query. In one embodiment, step 3225 may involve generating the second search query such that it includes at least one semantic sub-key 2945 (e.g., received by semantic key processor 340 as shown in FIG. 31) associated with at least one semantic key 2234 (e.g., provided to semantic key processor 340 as shown in FIG. 31).

The second search query (e.g., 3132 as shown in FIG. 31) may be generated (e.g., by search query processor 3030) in step 3225 by modifying the first search query (e.g., 3010) in one embodiment. In one embodiment, modification of the search query may be performed in step 3225 in accordance with step 2360 of FIG. 23, process 2500 of FIG. 25, step 2840 of FIG. 28, some combination thereof, etc. And in one embodiment, the second search query (e.g., 3132 as shown in FIG. 31) may be generated (e.g., by search query processor 3030) in step 3225 by creating a new search query based on the first search query (e.g., 3010).

As shown in FIG. 32B, step 3230 involves performing a first search based on the second search query (e.g., 3032, 3132, generated in step 3225, etc.) and performing a second search based on the first search query (e.g., 3010, accessed in step 3205, etc.). The first and second searches may be performed in step 3230 by a search engine (e.g., 320) in one embodiment. And in one embodiment, the first search and/or the second search may be performed in step 3230 in accordance with step 240 of FIG. 2, step 710 of FIG. 7, step 2040 of FIG. 20, step 2850 of FIG. 28, some combination thereof, etc.

Step 3235 involves accessing first search results generated responsive to the first search and accessing second search results generated responsive to the second search. Each of the first and second search results may be associated with and/or include a respective set of documents (e.g., webpages, electronic documents, electronic files, advertising content, etc.). Each of the first and second search results may be raw or unprocessed (e.g., similar to keyword search results 322, search results 2955, etc.) in one embodiment. And in one embodiment, the first search results and/or the second search results may be processed (e.g., similar to filtered search results 355, ranked search results 365, search results output for presentation 375, etc.).

In one embodiment, each document associated with or included in the first search results (e.g., accessed in step 3235) may include at least one respective instance of at least one semantic sub-key (e.g., 2945) associated with the semantic key (e.g., determined to be included in the first portion of the first search query in step 3210). The first search results (e.g., output directly from search engine 320 as search results 2955) may be generated responsive to a first search performed (e.g., in step 3230) based on the second search query (e.g., 3132) that was generated (e.g., in step 3225) to include the at least one semantic sub-key (e.g., 2945), thereby allowing search query modification (e.g., which may be performed in step 3225) to be utilized in lieu of search result filtering (e.g., that may otherwise be performed in step 3240) in one embodiment. However, it should be appreciated that search query modification (e.g., which may be performed in step 3225) may be utilized in combination with search result filtering (e.g., which may be performed in step 3240) in one or more other embodiments.

As shown in FIG. 32B, step 3240 involves processing the first and second search results. The processing of step 2340 may involve ranking the search results (e.g., using ranking component 360, in accordance with step 270 of FIG. 2, in accordance with process 900 of FIG. 9, in accordance with process 1000 of FIG. 10, in accordance with process 1100 of FIG. 11, in accordance with step 2070 of FIG. 20, in accordance with step 2870 of FIG. 28, etc.) in one embodiment. And in one embodiment, the processing of step 2340 may involve filtering the search results (e.g., using filtering component 350, in accordance with step 260 of FIG. 2, in accordance with process 700 of FIG. 7, in accordance with process 800 of FIG. 8, in accordance with step 2060 of FIG. 20, etc.).

Step 3245 involves analyzing the first and second search results to automatically determine third search results for output. In one embodiment, the third search results may be automatically selected from a group consisting of the first search results (e.g., generated responsive to the first search performed in step 3230) and the second search results (e.g., generated responsive to the second search performed in step 3230). The first and second search results may be analyzed in step 3245 using one or more components such as ranking component 360, filtering component 350, semantic key processor 340, search query processor 3030, some combination thereof, etc.

In one embodiment, the analyzing performed in step 3245 may involve determining a ratio of a quantity associated with the first search results to a quantity associated with the second search results. For example, step 3245 may involve comparing the respective numbers of documents in or associated with the first and second search results to determine a ratio of the quantity of first search results (e.g., generated responsive to the first search performed based on the second search query) to the quantity of second search results (e.g., generated responsive to the second search performed based on the first search query). If the ratio meets or exceeds a predetermined threshold, then the first search results may be determined as the third search results for output in step 3245. Alternatively, if the ratio is less than or equal to the predetermined threshold, then the second search results may be determined as the third search results for output in step 3245.

The predetermined threshold may be 10:1 in one embodiment. And in other embodiments, the predetermined threshold may be another value (e.g., 2:1, 5:1, 20:1, etc.).

In one embodiment, the analyzing performed in step 3245 may involve selecting either the first or second search results as the third search results for output based on scoring of the first and second search results. For example, step 3245 may involve determining: a first score associated with the first search results; and a second score associated with the second search results. If the first score exceeds the second score, then the first search results may be selected for output in step 3245. Alternatively, if the second score exceeds the first score, then the second search results may be selected for output in step 3245.

In one embodiment, the first score may be determined in step 3245 based on a parameter selected from a group consisting of: a number of instances in the first search results of at least one semantic sub-key associated with the semantic key (e.g., 2234); a number of instances in the first search results of at least one keyword of the first search query; at least one proximity associated with a plurality of instances in the first search results of at least one semantic sub-key associated with the semantic key (e.g., 2234); and at least one proximity associated with a plurality of instances in the first search results of at least one keyword of the first search query. And in one embodiment, the second score may be determined in step 3245 based on a parameter selected from a group consisting of: a number of instances in the second search results of at least one semantic sub-key associated with the semantic key (e.g., 2234); a number of instances in the second search results of at least one keyword of the second search query; at least one proximity associated with a plurality of instances in the second search results of at least one semantic sub-key associated with the semantic key (e.g., 2234); and at least one proximity associated with a plurality of instances in the second search results of at least one keyword of the second search query.

In one embodiment, the first score and/or the second score may be determined in step 3245 in accordance with process 900 of FIG. 9, process 1000 of FIG. 10, process 1100 of FIG. 11, some combination thereof, etc. And in one embodiment, the first score and/or the second score may be determined in step 3245 in accordance with step 2070 of FIG. 20, step 2870 of FIG. 28, some combination thereof, etc.

As shown in FIG. 32B, step 3250 involves outputting the third search results. The third search results may be generated and output in step 3250 (e.g., by graphical data generator 370) for presentation (e.g., as search results output for presentation 375) in one embodiment. In one embodiment, the third search results may be generated and/or output in step 3250 responsive to a system-generated input (e.g., 377 accessed by graphical data generator 370). In one embodiment, the third search results may be generated and/or output in step 3250 responsive to a user input (e.g., 377 input via a graphical user interface and accessed by graphical data generator 370). And in one embodiment, step 3250 may be performed in accordance with step 280 of FIG. 2, step 430 of FIG. 4, step 2080 of FIG. 20, step 2880 of FIG. 28, some combination thereof, etc.

Step 3255 involves determining whether a request to present other search results is detected. In one embodiment, the request may be a user input (e.g., 377) generated responsive to a user interaction with a graphical user interface (e.g., used to present search results output from presentation 375 such as GUI 1300, GUI 2700, etc.). The request may be a request to switch between the display of the third search results (e.g., output in step 3250) and other search results in one embodiment. And in one embodiment, the request may be a system-generated input (e.g., 377) from one or more components (e.g., search query processor 3030, semantic key processor 340, search engine 320, filtering component 350, ranking component 360, some combination thereof, etc.).

If a request is not detected in step 3255, then process 3200 may terminate. Alternatively, if a request is detected in step 3255, then step 3260 may be performed.

As shown in FIG. 32B, step 3260 involves outputting fourth search results. The fourth search results may be different from the third search results (e.g., output in step 3250) in one embodiment. The fourth search results may be generated and output in step 3250 (e.g., by graphical data generator 370) for presentation (e.g., as search results output for presentation 375) in one embodiment. In one embodiment, the fourth search results may be generated and/or output in step 3260 responsive to a system-generated input (e.g., 377 accessed by graphical data generator 370). In one embodiment, the fourth search results may be generated and/or output in step 3260 responsive to a user input (e.g., 377 input via a graphical user interface and accessed by graphical data generator 370). And in one embodiment, step 3260 may be performed in accordance with step 280 of FIG. 2, step 430 of FIG. 4, step 2080 of FIG. 20, step 2880 of FIG. 28, some combination thereof, etc.

In one embodiment, the fourth search results may be or include the second search results (e.g., generated responsive to the second search performed in step 3230) where the third search results are or include the first search results (e.g., generated responsive to the first search performed in step 3230). Alternatively, the fourth search results may be or include the first search results (e.g., generated responsive to the first search performed in step 3230) where the third search results are or include the second search results (e.g., generated responsive to the second search performed in step 3230).

Accordingly, a user interface configured to generate the request (e.g., responsive to a user interaction with an element of the user interface) may allow a user may switch between the third search results (e.g., that are automatically determined in step 3245 and output in step 3250) and the fourth search results (e.g., that are output in step 3260). In this manner, a user may quickly determine which set of search results is preferable and/or most relevant, whether the automatically-selected set of search results (e.g., the third search results) is preferable and/or most relevant, etc.

Turning back to step 3210 of FIG. 32A, if it is determined that the first portion of the first search query (e.g., 3010) does not include a semantic key (e.g., 2234), then step 3265 may be performed. Similarly, if it is determined in step 3215 that the first and second portions of the first search query are associated with a phrase, then step 3265 may be performed.

Step 3265 involves performing a search based on the first search query (e.g., accessed in step 3205). The first search of step 3265 may be performed analogously to the first search of step 3230. After the first search is performed in step 3265, process 3200 may proceed to step 3280 of FIG. 32B.

Turning back to step 3220 of FIG. 32A, if it is determined that the second portion of the first search query is associated with a predetermined part of speech, then process 3200 may proceed to step 3270. Step 3270 involves generating a second search query based on the first search query (e.g., accessed in step 3205). The second search query may be automatically generated in step 3270 by a search query processor (e.g., 3030) responsive to determining that the second portion of the first search query is associated with a predetermined part of speech (e.g., in step 3220).

In one embodiment, step 3270 may involve generating the second search query such that it is free of the first portion of the first search query (e.g., including at least one semantic key determined or identified in step 3210) and/or such that it is different from the first search query. In one embodiment, step 3270 may involve generating the second search query such that it includes at least one semantic sub-key 2945 (e.g., received by semantic key processor 340 as shown in FIG. 31) associated with at least one semantic key 2234 (e.g., provided to semantic key processor 340 as shown in FIG. 31).

The second search query (e.g., 3132 of FIG. 31) may be generated (e.g., by search query processor 3030) in step 3270 by modifying the first search query (e.g., 3010) in one embodiment. In one embodiment, modification of the search query may be performed in step 3270 in accordance with step 2360 of FIG. 23, process 2500 of FIG. 25, step 2840 of FIG. 28, some combination thereof, etc. And in one embodiment, the second search query (e.g., 3132 of FIG. 31) may be generated (e.g., by search query processor 3030) in step 3270 by creating a new search query based on the first search query (e.g., 3010).

In one embodiment, step 3270 may involve generating the second search query (e.g., 3032, 3132, etc.) such that it is free of the second portion of the first search query (e.g., associated with the predetermined part of speech as determined or identified in step 3220). And in one embodiment, step 3270 may involve generating the second search query (e.g., 3032, 3132, etc.) such that it is free of the first portion of the first search query (e.g., including at least one semantic key determined or identified in step 3210) and the second portion of the first search query (e.g., associated with the predetermined part of speech as determined or identified in step 3220).

As an example involving a relative pronoun, where the first search query includes the words "US president who was born in California," step 3270 may involve removing the first portion (e.g., "US president") identified as a semantic key (e.g., in step 3210) and the second portion (e.g., including the relative pronoun "who" as determined in step 3220) to generate a second search query including the words "was born in California." The second search query may be further modified to include at least one semantic sub-key associated with the semantic key of the first portion (e.g., "US president") in one embodiment.

As another example involving a relative pronoun, where the first search query includes the words "young chess player that beat Kasparov," step 3270 may involve removing the first portion (e.g., "chess player") identified as a semantic key (e.g., in step 3210) and the second portion (e.g., including the relative pronoun "that" as determined in step 3220) to generate a second search query including the words "young beat Kasparov." The second search query may be further modified to include at least one semantic sub-key associated with the semantic key of the first portion (e.g., "chess player") in one embodiment. And in one embodiment, the second search query may be generated in step 3270 such that at least one word removed from or otherwise previously associated with the at least one semantic key of the first portion (e.g., the word "young" that modified the semantic key "chess player") is separated from the remaining portion or a third portion of the first search query (e.g., the words "beat Kasparov"). In this case, the second search query may be generated to include the words "young 'beat Kasparaov.'"

As an example involving an interrogative pronoun, where the first search query includes the words "which US president was born in California," step 3270 may involve removing the first portion (e.g., "US president") identified as a semantic key (e.g., in step 3210) and the second portion (e.g., including the interrogative pronoun "which" as determined in step 3220) to generate a second search query including the words "was born in California." The second search query may be further modified to include at least one semantic sub-key associated with the semantic key of the first portion (e.g., "US president") in one embodiment.

As another example involving an interrogative pronoun, where the first search query includes the words "iPhone comes in what colors," step 3270 may involve removing the first portion (e.g., "colors") identified as a semantic key (e.g., in step 3210) and the second portion (e.g., including the interrogative pronoun "what" as determined in step 3220) to generate a second search query including the words "iPhone comes in." The second search query may be further modified to include at least one semantic sub-key associated with the semantic key of the first portion (e.g., "colors") in one embodiment.

As an example involving a preposition, where the first search query includes the words "US president from California," step 3270 may involve removing the first portion (e.g., "US president") identified as a semantic key (e.g., in step 3210) and the second portion (e.g., including the preposition "from" as determined in step 3220) to generate a second search query including the words "California." Alternatively, only the first portion (e.g., "US president") identified as a semantic key (e.g., in step 3210) may be removed in step 3270 (e.g., thereby leaving the second portion including the preposition "from") to generate a second search query including the words "from California." The second search query may be further modified to include at least one semantic sub-key associated with the semantic key of the first portion (e.g., "US president") in one embodiment.

As another example involving a preposition, where the first search query includes the words "colors of iPhone," step 3270 may involve removing the first portion (e.g., "colors") identified as a semantic key (e.g., in step 3210) and the second portion (e.g., including the preposition "of" as determined in step 3220) to generate a second search query including the words "iPhone." The second search query may be further modified to include at least one semantic sub-key associated with the semantic key of the first portion (e.g., "colors") in one embodiment.

As an example involving a verb, where the first search query includes the words "US president born in California," step 3270 may involve removing the first portion (e.g., "US president") identified as a semantic key (e.g., in step 3210) to generate a second search query including the words "born in California." The second search query may be further modified to include at least one semantic sub-key associated with the semantic key of the first portion (e.g., "US president") in one embodiment.

As another example involving a verb, where the first search query includes the words "young chess player beat Kasparov," step 3270 may involve removing the first portion (e.g., "chess player") identified as a semantic key (e.g., in step 3210) to generate a second search query including the words "young beat Kasparov." The second search query may be further modified to include at least one semantic sub-key associated with the semantic key of the first portion (e.g., "chess player") in one embodiment.

As yet another example involving a verb, where the first search query includes the words "Kasparov beat young chess player," step 3270 may involve removing the first portion (e.g., "chess player") identified as a semantic key (e.g., in step 3210) to generate a second search query including the words "young 'Kasparov beat.'" In this case, where a third portion of the first search query (e.g., the word "young") is disposed between the first portion (e.g., the semantic key "chess player") and the second portion (e.g., the verb "beat"), the second search query may be generated in step 3270 such that the third portion (e.g., the word "young") may be separated from the remaining portion or fourth portion of the first search query (e.g., the word "Kasparov") and the second portion (e.g., the verb "beat"). The second search query may be further modified to include at least one semantic sub-key associated with the semantic key of the first portion (e.g., "chess player") in one embodiment.

As shown in FIG. 32A, step 3275 involves performing a first search based on the second search query (e.g., generated in step 3270). The first search may be performed in step 3275 by a search engine (e.g., 320) in one embodiment. And in one embodiment, the first search may be performed in step 3275 in accordance with step 240 of FIG. 2, step 710 of FIG. 7, step 2040 of FIG. 20, step 2850 of FIG. 28, some combination thereof, etc.

As shown in FIG. 32B, step 3280 involves accessing search results generated responsive to the first search (e.g., performed in step 3275) and/or the second search (e.g., performed in step 3265). Each of the search results accessed in step 3280 may be associated with and/or include a respective set of documents (e.g., webpages, electronic documents, electronic files, advertising content, etc.). Each of the search results accessed in step 3280 may be raw or unprocessed (e.g., similar to keyword search results 322, search results 2955, etc.) in one embodiment. And in one embodiment, the search results accessed in step 3280 may be processed (e.g., similar to filtered search results 355, ranked search results 365, search results output for presentation 375, etc.).

In one embodiment, each document associated with or included in the search results generated responsive to the first search (e.g., accessed in step 3280) may include at least one respective instance of at least one semantic sub-key (e.g., 2945) associated with the semantic key (e.g., determined to be included in the first portion of the first search query in step 3210). In this case, the second search query (e.g., 3132) used to perform the first search (e.g., in step 3275) may have been generated (e.g., in step 3270) to include the at least one semantic sub-key (e.g., 2945), thereby allowing search query modification (e.g., which may be performed in step 3270) to be utilized in lieu of search result filtering (e.g., that may otherwise be performed in step 3285) in one embodiment. However, it should be appreciated that search query modification (e.g., which may be performed in step 3270) may be utilized in combination with search result filtering (e.g., which may be performed in step 3285) in one or more other embodiments.

As shown in FIG. 32B, step 3285 involves processing the search results (e.g., accessed in step 3280). The processing of step 2385 may involve ranking the search results (e.g., using ranking component 360, in accordance with step 270 of FIG. 2, in accordance with process 900 of FIG. 9, in accordance with process 1000 of FIG. 10, in accordance with process 1100 of FIG. 11, in accordance with step 2070 of FIG. 20, in accordance with step 2870 of FIG. 28, etc.) in one embodiment. And in one embodiment, the processing of step 2385 may involve filtering the search results (e.g., using filtering component 350, in accordance with step 260 of FIG. 2, in accordance with process 700 of FIG. 7, in accordance with process 800 of FIG. 8, in accordance with step 2060 of FIG. 20, etc.).

Step 3290 involves outputting the search results (e.g., accessed in step 3280 and/or processed in step 3285). The search results may be generated and output in step 3290 (e.g., by graphical data generator 370) for presentation (e.g., as search results output for presentation 375) in one embodiment. In one embodiment, the search results may be generated and/or output in step 3290 responsive to a system-generated input (e.g., 377 accessed by graphical data generator 370). In one embodiment, the search results may be generated and/or output in step 3290 responsive to a user input (e.g., 377 input via a graphical user interface and accessed by graphical data generator 370). And in one embodiment, step 3290 may be performed in accordance with step 280 of FIG. 2, step 430 of FIG. 4, step 2080 of FIG. 20, step 2880 of FIG. 28, some combination thereof, etc.

In one embodiment, one or more steps of process 3200 may be performed in parallel. For example, steps 3215 and 3220 may be performed in parallel in one embodiment. And in other embodiments, other steps of process 3200 may be performed in parallel.

Although process 3200 is depicted in FIGS. 32A and 32B with a specific number and ordering of steps, it should be appreciated that process 3200 may include a different number and/or ordering of steps in other embodiments. For example, one or more searches performed in process 3200 (e.g., in steps 3230, 3265, 3275, etc.) may be optional, thereby providing for automated generation of a search query (e.g., 3032, 3132, etc.) without necessarily performing a search based thereon. As another example, a first set of steps (e.g., 3225 through 3260) and a second set of steps (e.g., 3270 through 3290) may be mutually exclusive in one embodiment, and therefore, only one set of the steps (e.g., either the first set or the second set) of process 3200 may be performed in one embodiment. As yet another example, all steps of process 3200 may be optional except for steps 3210 and 3225 in one embodiment. And as a further example, all steps of process 3200 may be optional except for steps 3210, 3225, and at least a portion of step 3230 (e.g., including at least the performance of the first search based on the second search query)

Although FIG. 30 shows data flow diagram 3000 with a specific number of components, it should be appreciated that data flow diagram 3000 may include a different number of components in other embodiments. Although FIG. 30 shows data flow diagram 3000 with a specific arrangement of components, it should be appreciated that data flow diagram 3000 may include a different arrangement of components in other embodiments.

Although FIG. 31 shows data flow diagram 3100 with a specific number of components, it should be appreciated that data flow diagram 3100 may include a different number of components in other embodiments. Although FIG. 31 shows data flow diagram 3100 with a specific arrangement of components, it should be appreciated that data flow diagram 3100 may include a different arrangement of components in other embodiments.

Ranking Data Utilizing Multiple Semantic Keys in a Search Query

Figure 33:
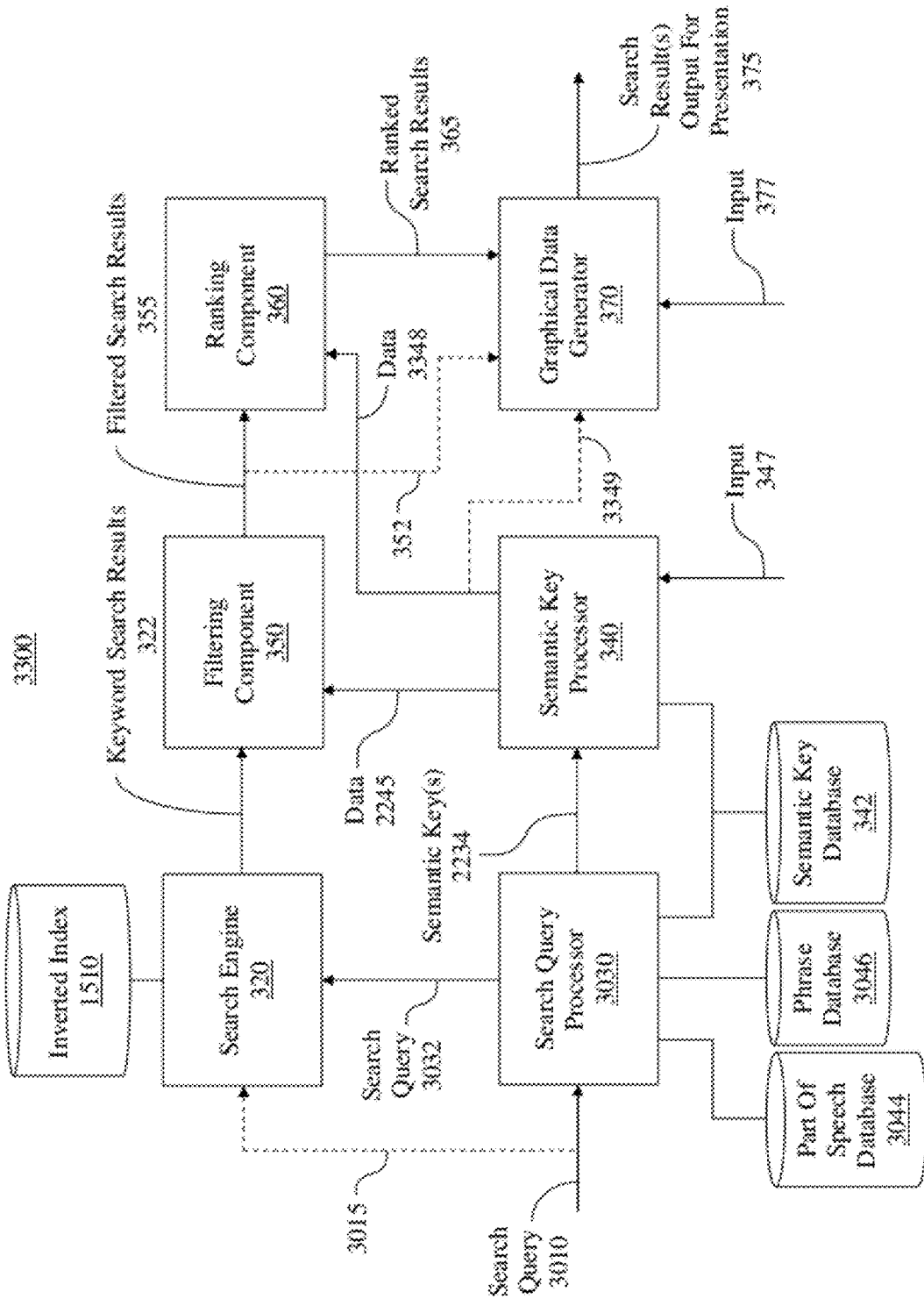
FIG. 33 shows an exemplary data flow diagram of a first ranking of data based on multiple semantic keys in a search query in accordance with one embodiment of the present invention.

FIG. 33 shows exemplary data flow diagram 3300 of a first ranking of data based on multiple semantic keys in a search query in accordance with one embodiment of the present invention. As shown in FIG. 33, search query processor 3030 may access a search query (e.g., 3010) and determine that the search query includes a plurality of semantic keys (e.g., 2234), where each semantic key of the plurality of semantic keys may be associated with a respective set of semantic sub-keys of a plurality of sets of semantic sub-keys. Semantic key processor 340 may determine at least one semantic sub-key included in each set of semantic sub-keys of the plurality of sets of semantic sub-keys.

The at least one semantic sub-key (e.g., included in each set of semantic sub-keys of the plurality of sets of semantic sub-keys) may be used to rank data. For example, the at least one semantic sub-key (e.g., included in each set of semantic sub-keys of the plurality of sets of semantic sub-keys) may be used to rank the plurality of semantic sub-keys. In this case, the at least one semantic sub-key may be ranked above at least one other semantic sub-key of the plurality of sets of semantic sub-keys. The ranking may be performed by semantic key processor 340 and/or by ranking component 360 (e.g., based on data 3348 from semantic key processor 340). In one embodiment, data associated with the ranked semantic sub-keys may be output (e.g., for presentation by graphical data generator as search results output for presentation 375), where the data associated with the ranked semantic sub-keys may be received by graphical data generator 370 as ranked search results 365 (e.g., from ranking component 360) and/or as data 3348 (e.g., from semantic key processor 340 as indicated in FIG. 33 by dashed arrow 3349).

As another example, the at least one semantic sub-key (e.g., included in each set of semantic sub-keys of the plurality of sets of semantic sub-keys) may be used (e.g., by ranking component 360) to rank a plurality of documents associated with search results (e.g., generated responsive to a search based on search query 3032 and/or subsequently filtered based on data 2245 by filtering component 350). In this case, at least one document associated with the at least one semantic sub-key (e.g., including at least one respective instance of the at least one semantic sub-key) may be ranked above at least one other document associated with at least one other semantic sub-key (e.g., included in less than all of the plurality of sets of semantic sub-keys), where the at least one document and the at least one other document are associated with search results (e.g., generated responsive to a search based on search query 3032 and/or subsequently filtered based on data 2245 by filtering component 350). The ranking may be performed by ranking component 360 based on data 3348 from semantic key processor 340, where data 3348 may be associated with a ranking or ordering (e.g., based on the at least one semantic sub-key) of a plurality of documents (e.g., including the documents themselves, a list of document identifiers, etc.) and/or a plurality of semantic sub-keys (e.g., including the semantic sub-keys themselves, a list of semantic sub-keys identifiers, etc.). In one embodiment, data associated with the ranked documents may be output (e.g., for presentation by graphical data generator as search results output for presentation 375).

Where data 3348 is associated with a ranking or ordering (e.g., based on the at least one semantic sub-key included in a plurality of sets of semantic sub-keys) of a plurality of documents (e.g., including the documents themselves, a list of document identifiers, etc.), ranking component 360 may organize, format, or otherwise process the search results (e.g., search results 322 and/or 355 including document identifiers, at least a respective portion of each document of the plurality of documents, some combination thereof, etc.) in accordance with data 3348. Where data 3348 is associated with a ranking or ordering (e.g., based on the at least one semantic sub-key included in a plurality of sets of semantic sub-keys) of a plurality of semantic sub-keys (e.g., including the semantic sub-keys themselves, a list of semantic sub-keys identifiers, etc.), ranking component 360 may perform one or more operations to process the search results (e.g., search results 322 and/or 355 including document identifiers, at least a respective portion of each document of the plurality of documents, some combination thereof, etc.). For example, ranking component 360 may perform a first ranking of the search results to order any document including at least one instance of the at least one semantic sub-key (e.g., indicated by data 3348 and/or included in each set of semantic sub-keys of the plurality of sets of semantic sub-keys) above any other document that does not include at least one instance of the at least one semantic sub-key. As another example, a second ranking may be performed (e.g., separately from or in combination with the first ranking) by ranking component 360 to rank the documents based on the number of respective instances of any of the semantic sub-keys (e.g., the at least one semantic sub-key or any other semantic sub-key of the plurality of sets of semantic sub-keys). As such, in one embodiment, the first ranking may be used to group the documents (e.g., into a first group including one or more documents that include at least one respective instance of the at least one semantic sub-key and a second group including any remaining documents that do not include at least one respective instance of the at least one semantic sub-key) while the second ranking may be used to rank the documents (e.g., based on the number of respective instances of any of the semantic sub-keys) within each of the groups.

Accordingly, ranking of data may be improved by utilizing semantic sub-keys associated with multiple semantic keys included in the search query. Where the ranking involves a ranking of documents associated with search results, the documents may be more accurately and/or precisely ranked to order the more relevant search results (e.g., including at least one respective instance of at least one semantic sub-key that is associated with multiple semantic keys included in the search query used to generate the search results) above the less relevant search results. Where the ranking involves a ranking of semantic sub-keys associated with search results, the semantic sub-keys may be more accurately and/or precisely ranked to order the more relevant semantic sub-keys (e.g., associated with multiple semantic keys included in the search query used to generate the search results) above the less relevant semantic sub-keys.

Figure 34:
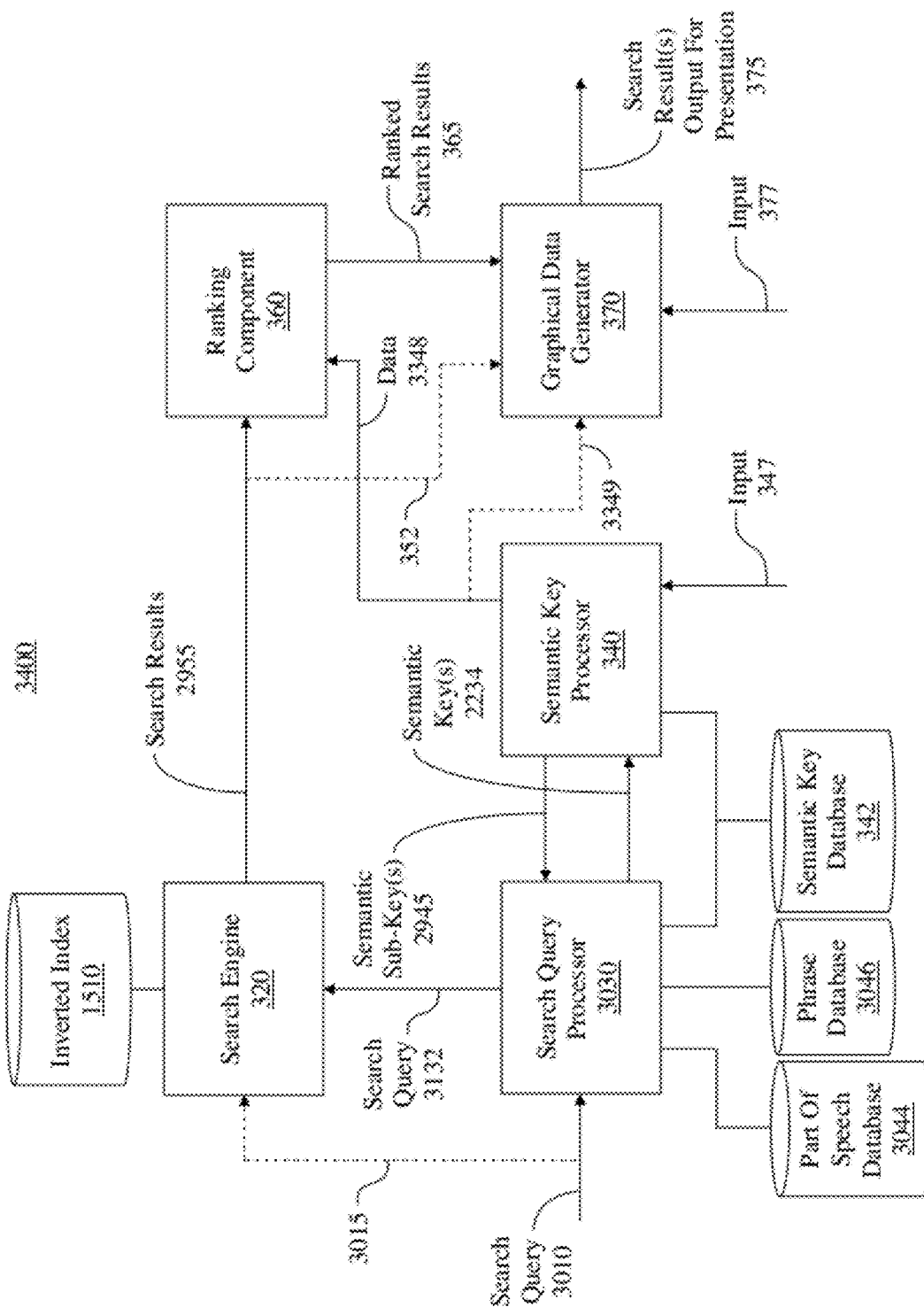
FIG. 34 shows an exemplary data flow diagram of a second ranking of data based on multiple semantic keys in a search query in accordance with one embodiment of the present invention.

FIG. 34 shows exemplary data flow diagram 3400 of a second ranking of data based on multiple semantic keys in a search query in accordance with one embodiment of the present invention. As shown in FIG. 34, search query processor 3030 may access a search query (e.g., 3010) and determine that the search query includes a plurality of semantic keys (e.g., 2234), where each semantic key of the plurality of semantic keys may be associated with a respective set of semantic sub-keys of a plurality of sets of semantic sub-keys (e.g. 2945). Semantic key processor 340 may determine at least one semantic sub-key included in each set of semantic sub-keys of the plurality of sets of semantic sub-keys.

The at least one semantic sub-key (e.g., included in each set of semantic sub-keys of the plurality of sets of semantic sub-keys) may be used to rank data. For example, the at least one semantic sub-key (e.g., included in each set of semantic sub-keys of the plurality of sets of semantic sub-keys) may be used to rank the plurality of semantic sub-keys. In this case, the at least one semantic sub-key may be ranked above at least one other semantic sub-key of the plurality of sets of semantic sub-keys. The ranking may be performed by semantic key processor 340 and/or by ranking component 360 (e.g., based on data 3348 from semantic key processor 340). In one embodiment, data associated with the ranked semantic sub-keys may be output (e.g., for presentation by graphical data generator as search results output for presentation 375), where the data associated with the ranked semantic sub-keys may be received by graphical data generator 370 as ranked search results 365 (e.g., from ranking component 360) and/or as data 3348 (e.g., from semantic key processor 340 as indicated in FIG. 34 by dashed arrow 3349).

As another example, the at least one semantic sub-key (e.g., included in each set of semantic sub-keys of the plurality of sets of semantic sub-keys) may be used (e.g., by ranking component 360) to rank a plurality of documents associated with search results (e.g., generated responsive to a search based on search query 3132 that includes the at least one semantic sub-key and/or at least one other semantic sub-key). In this case, at least one document associated with the at least one semantic sub-key (e.g., including at least one respective instance of the at least one semantic sub-key) may be ranked above at least one other document associated with at least one other semantic sub-key (e.g., included in less than all of the plurality of sets of semantic sub-keys), where the at least one document and the at least one other document are associated with search results (e.g., generated responsive to a search based on search query 3132). The ranking may be performed by ranking component 360 based on data 3348 from semantic key processor 340, where data 3348 may be associated with a ranking or ordering (e.g., based on the at least one semantic sub-key) of a plurality of documents (e.g., including the documents themselves, a list of document identifiers, etc.) and/or a plurality of semantic sub-keys (e.g., including the semantic sub-keys themselves, a list of semantic sub-keys identifiers, etc.). In one embodiment, data associated with the ranked documents may be output (e.g., for presentation by graphical data generator as search results output for presentation 375).

Where data 3348 is associated with a ranking or ordering (e.g., based on the at least one semantic sub-key included in a plurality of sets of semantic sub-keys) of a plurality of documents (e.g., including the documents themselves, a list of document identifiers, etc.), ranking component 360 may organize, format, or otherwise process the search results (e.g., search results 2955 including document identifiers, at least a respective portion of each document of the plurality of documents, some combination thereof, etc.) in accordance with data 3348. Where data 3348 is associated with a ranking or ordering (e.g., based on the at least one semantic sub-key included in a plurality of sets of semantic sub-keys) of a plurality of semantic sub-keys (e.g., including the semantic sub-keys themselves, a list of semantic sub-keys identifiers, etc.), ranking component 360 may perform one or more operations to process the search results (e.g., search results 2955 including document identifiers, at least a respective portion of each document of the plurality of documents, some combination thereof, etc.). For example, ranking component 360 may perform a first ranking of the search results to order any document including at least one instance of the at least one semantic sub-key (e.g., indicated by data 3348 and/or included in each set of semantic sub-keys of the plurality of sets of semantic sub-keys) above any other document that does not include at least one instance of the at least one semantic sub-key. As another example, a second ranking may be performed (e.g., separately from or in combination with the first ranking) by ranking component 360 to rank the documents based on the number of respective instances of any of the semantic sub-keys (e.g., the at least one semantic sub-key or any other semantic sub-key of the plurality of sets of semantic sub-keys). As such, in one embodiment, the first ranking may be used to group the documents (e.g., into a first group including one or more documents that include at least one respective instance of the at least one semantic sub-key and a second group including any remaining documents that do not include at least one respective instance of the at least one semantic sub-key) while the second ranking may be used to rank the documents (e.g., based on the number of respective instances of any of the semantic sub-keys) within each of the groups.

Accordingly, ranking of data may be improved by utilizing semantic sub-keys associated with multiple semantic keys included in the search query. Where the ranking involves a ranking of documents associated with search results, the documents may be more accurately and/or precisely ranked to order the more relevant search results (e.g., including at least one respective instance of at least one semantic sub-key that is associated with multiple semantic keys included in the search query used to generate the search results) above the less relevant search results. Where the ranking involves a ranking of semantic sub-keys associated with search results, the semantic sub-keys may be more accurately and/or precisely ranked to order the more relevant semantic sub-keys (e.g., associated with multiple semantic keys included in the search query used to generate the search results) above the less relevant semantic sub-keys.

Figure 35:
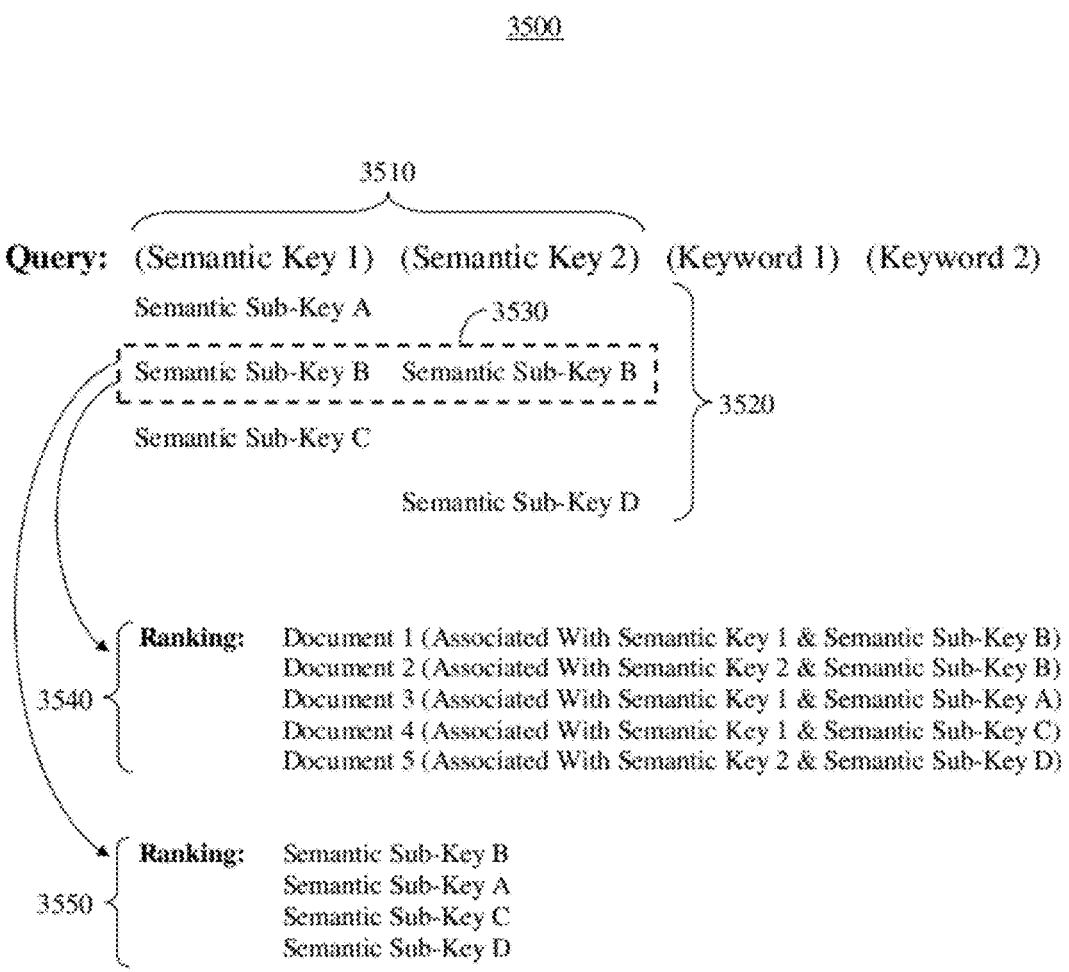
FIG. 35 shows an exemplary diagram depicting a ranking of data in accordance with one embodiment of the present invention.

FIG. 35 shows exemplary diagram 3500 depicting a ranking of data in accordance with one embodiment of the present invention. As shown in FIG. 35, a query may be accessed that includes a plurality of semantic keys (e.g., 3510). Each of the semantic keys may be associated with a respective set of semantic sub-keys of a plurality of sets of semantic sub-keys (e.g., 3520). For example, Semantic Key 1 may be associated with a first set of semantic sub-keys (e.g., including Semantic Sub-Key A, Semantic Sub-Key B, and Semantic Sub-Key C), whereas Semantic Key 2 may be associated with a second set of semantic sub-keys (e.g., including Semantic Sub-Key B and Semantic Sub-Key D). It may be determined that Semantic Sub-Key B is included in each of the sets of semantic sub-keys associated with the multiple semantic keys 3510 (e.g., as indicated by dashed box 3530). This information may then be used to rank data associated with a plurality of documents (e.g., 3540) and/or data associated with a plurality of semantic sub-keys (e.g., 3550).

As shown in FIG. 35, data associated with a plurality of documents (e.g., 3540) may include at least one document associated with Semantic Sub-Key B (e.g., Document 1 and Document 2) ranked above at least one other document that is not associated with Semantic Sub-Key B and/or is associated with at least one other semantic sub-key (e.g., Document 3, Document 4, and Document 5). Each document (e.g., Document 1, Document 2, Document 3, etc.) of data 3540 may be or represent a complete document, a portion of a document, an identifier or other data associated with a document, etc. Additionally, in one embodiment, the documents of data 3540 may be further ranked based on a respective quantity of instances of one or more semantic sub-keys (e.g., of plurality of sets of semantic sub-keys 3520). For example, Document 1 may include a greater number of instances of the one or more semantic sub-keys than Document 2. As another example, Document 3 may include a greater number of instances of the one or more semantic sub-keys than Document 4, and Document 4 may include a greater number of instances of the one or more semantic sub-keys than Document 5.

Data associated with a plurality of semantic sub-keys (e.g., 3550) may include Semantic Sub-Key B ranked above at least one other semantic sub-key (e.g., Semantic Sub-Key A, Semantic Sub-Key C, and Semantic Sub-Key D). Each semantic sub-key (e.g., Semantic Sub-Key A, Semantic Sub-Key B, etc.) of data 3550 may be or represent a respective semantic sub-key itself and/or an identifier associated with a respective semantic sub-key.

As an example, a search query may be accessed that includes the words "Nobel Peace Prize winner US president." It may be determined that the search query includes two semantic keys: "Nobel Peace Prize winner" and "US president." It may then be determined that each set of semantic sub-keys associated with the semantic keys "Nobel Peace Prize winner" and "US president" include the following semantic sub-keys in common: "Theodore Roosevelt;" Woodrow Wilson;" "Jimmy Carter;" and "Barack Obama." As such, the shared semantic sub-keys (e.g., "Theodore Roosevelt," Woodrow Wilson," "Jimmy Carter," and "Barack Obama") may be ranked above other semantic sub-keys in one embodiment. And in one embodiment, documents including at least one instance of at least one of the shared semantic sub-keys (e.g., "Theodore Roosevelt," Woodrow Wilson," "Jimmy Carter," and "Barack Obama") may be ranked above at least one other document that does not include at least one instance of at least one of the shared semantic sub-keys. Thus, more relevant search results (e.g., associated with documents and/or semantic sub-keys) may be determined and/or returned.

Although FIG. 35 depicts a specific number of semantic sub-keys and keywords in the query, it should be appreciated that a query may include any number of semantic sub-keys and/or keywords in other embodiments. For example, the query may include no keywords in one embodiment. As another example, the query may include at least one semantic key that is not associated with any semantic sub-keys which are also associated with at least one other semantic key included in the query. Additionally, although FIG. 35 depicts a specific number of semantic sub-keys in each set of semantic sub-keys, it should be appreciated that any number of semantic sub-keys may be associated with a semantic key in other embodiments. Further, although FIG. 35 depicts only one semantic sub-key shared by sets of semantic sub-keys 3520, it should be appreciated that more than one semantic sub-key may be shared by sets of semantic sub-keys 3520 in other embodiments.

Although FIG. 33 shows data flow diagram 3300 with a specific number of components, it should be appreciated that data flow diagram 3300 may include a different number of components in other embodiments. Although FIG. 33 shows data flow diagram 3300 with a specific arrangement of components, it should be appreciated that data flow diagram 3300 may include a different arrangement of components in other embodiments.

Although FIG. 34 shows data flow diagram 3400 with a specific number of components, it should be appreciated that data flow diagram 3400 may include a different number of components in other embodiments. Although FIG. 34 shows data flow diagram 3400 with a specific arrangement of components, it should be appreciated that data flow diagram 3400 may include a different arrangement of components in other embodiments.

Figure 36:
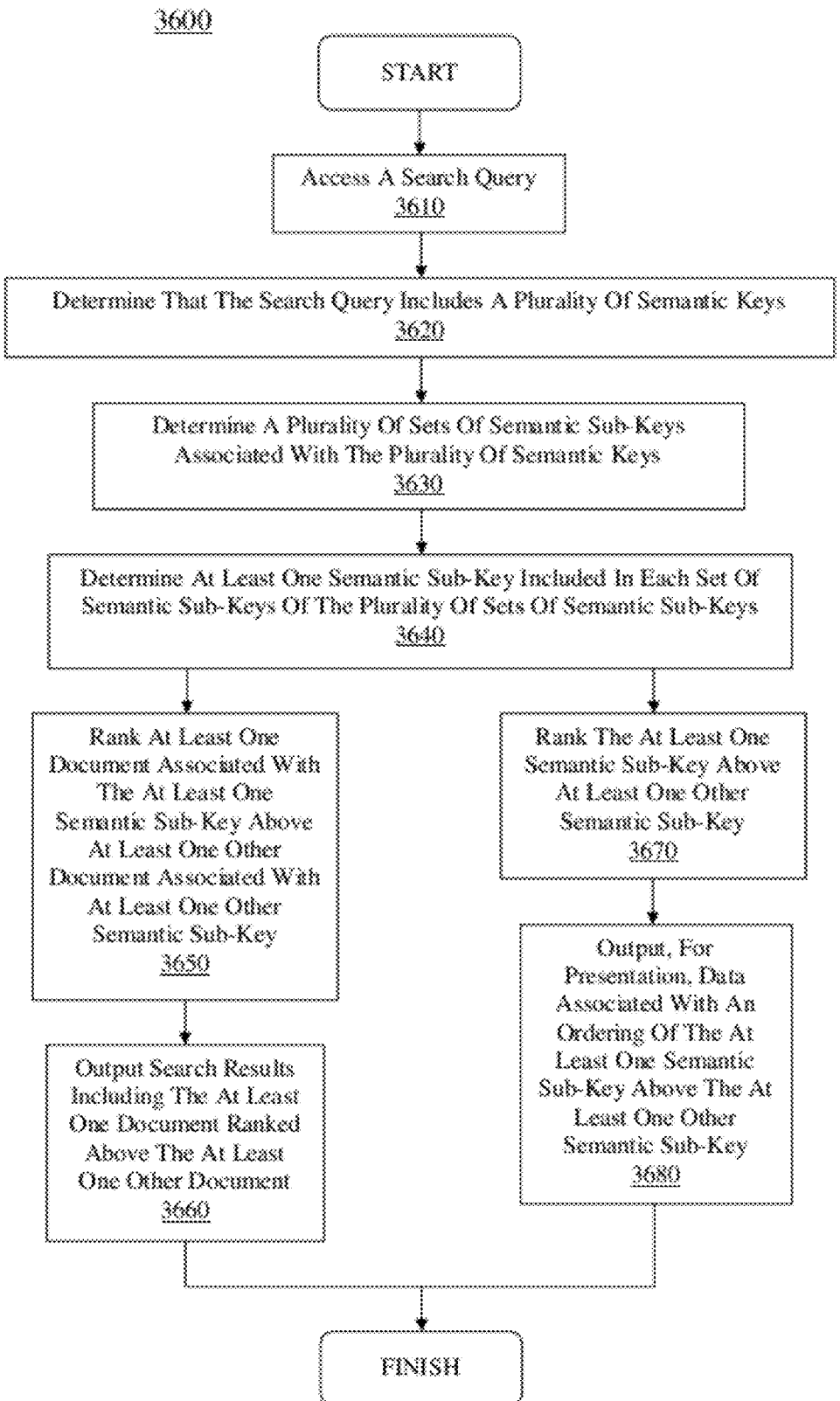
FIG. 36 shows a flowchart of an computer-implemented process for ranking data in accordance with one embodiment of the present invention.

FIG. 36 shows a flowchart of computer-implemented process 3600 for ranking data in accordance with one embodiment of the present invention. As shown in FIG. 36, step 3610 involves accessing a search query. The search query (e.g., 3010) may be accessed in step 3610 by a search query processor (e.g., 3030) in one embodiment.

Step 3620 involves determining that the search query (e.g., 3010) includes a plurality of semantic keys (e.g., 2234, 3510, etc.). For example, it may be determined in step 3620 that the query depicted in FIG. 35 includes two semantic keys (e.g., Semantic Key 1 and Semantic Key 2). In one embodiment, at least one semantic key of the plurality of semantic keys (e.g., determined in step 3620) may include a plurality of words.

Step 3620 may be performed by a search query processor (e.g., 3030) in one embodiment. In one embodiment, step 3620 may involve determining that the search query (e.g., 3010) includes a plurality of semantic keys by indexing or otherwise using a semantic key database (e.g., 342). For example, a semantic key database (e.g., 342) may be indexed using at least a portion of the search query to access or retrieve at least one semantic key of the plurality of semantic keys.

As shown in FIG. 36, step 3630 involves determining a plurality of sets of semantic sub-keys associated with the plurality of semantic keys. For example, step 3630 may involve determining a first set of semantic sub-keys (e.g., Semantic Sub-Key A, Semantic Sub-Key B, and Semantic Sub-Key C of FIG. 35) associated with a first semantic key (e.g., Semantic Key 1 of FIG. 35). Step 3630 may also involve determining a second set of semantic sub-keys (e.g., Semantic Sub-Key B and Semantic Sub-Key D of FIG. 35) associated with a second semantic key (e.g., Semantic Key 2 of FIG. 35).

Step 3630 may be performed by a semantic key processor (e.g., 340) in one embodiment. And in one embodiment, step 3630 may involve determining a plurality of sets of semantic sub-keys associated with the plurality of semantic keys by indexing a semantic key database (e.g., 342) using the plurality of semantic keys to access or retrieve the plurality of sets of semantic sub-keys.

As shown in FIG. 36, step 3640 involves determining at least one semantic sub-key included in each set of semantic sub-keys of the plurality of sets of semantic sub-keys (e.g., determined in step 3630). For example, with reference to FIG. 35, it may be determined that Semantic Sub-Key B is included in each set of semantic sub-keys of the plurality of sets of semantic sub-keys (e.g., as indicated by dashed box 3530). In one embodiment, step 3640 may be performed by a semantic key processor (e.g., 340) and/or at least one other component (e.g., ranking component 360).

In one embodiment, step 3640 may involve comparing the plurality of sets of semantic sub-keys to determine the at least one semantic sub-key included in each set of semantic sub-keys. For example, with reference to FIG. 35, a first set of semantic sub-keys (e.g., associated with Semantic Key 1) may be compared to a second set of semantic sub-keys (e.g., associated with Semantic Key 2) to determine at least one semantic sub-key (e.g., Semantic Sub-Key B as indicated by dashed box 3530) included in each of the first and second sets of semantic sub-keys. Responsive to performing step 3640, process 3600 may proceed to step 3650 and/or to step 3670.

As shown in FIG. 36, step 3650 involves ranking at least one document associated with the at least one semantic sub-key (e.g., determined in step 3640) above at least one other document associated with at least one other semantic sub-key (e.g., of the plurality of sets of semantic sub-keys). For example, with reference to FIG. 35, step 3650 may involve ranking Documents 1 and 2 (e.g., given their association with Semantic Sub-Key B that is included in each set of semantic sub-keys of the plurality of sets of semantic sub-keys) above at least one other document that is not associated with Semantic Sub-Key B and/or is associated with at least one other semantic sub-key (e.g., Document 3, Document 4, and Document 5). As another example, where Documents 1 and 2 include at least one instance of the at least one semantic sub-key (e.g., determined in step 3640), step 3650 may involve ranking Documents 1 and 2 above the other documents (e.g., Document 3, Document 4, and Document 5) that may not include at least one instance of the at least one semantic sub-key and/or may include at least one instance of at least one other semantic sub-key.

Step 3650 may be performed by a ranking component (e.g., 360) in one embodiment. And in one embodiment, the at least one other semantic sub-key (e.g., Semantic Sub-Key A, Semantic Sub-Key C, Semantic Sub-Key D, etc.) may be included in less than all of the plurality of sets of semantic sub-keys.

The at least one document and the at least one other document may be associated with search results (e.g., 322, 355, 2955, etc.) generated responsive to a search performed based on the search query (e.g., 3032, 3132, accessed in step 3610, etc.). In one embodiment, each document of the at least one document and the at least one other document may be selected from a group consisting of a webpage, an electronic document, an electronic file, and advertising content.

As shown in FIG. 36, step 3660 involves outputting search results including the at least one document ranked above the at least one other document. The search results may be generated and output in step 3660 (e.g., by graphical data generator 370) for presentation (e.g., as search results output for presentation 375) in one embodiment. In one embodiment, the search results may be generated and/or output in step 3660 responsive to a system-generated input (e.g., 377 accessed by graphical data generator 370). In one embodiment, the search results may be generated and/or output in step 3660 responsive to a user input (e.g., 377 input via a graphical user interface and accessed by graphical data generator 370). And in one embodiment, step 3660 may be performed in accordance with step 280 of FIG. 2, step 430 of FIG. 4, step 2080 of FIG. 20, step 2880 of FIG. 28, some combination thereof, etc.

Step 3670 involves ranking the at least one semantic sub-key (e.g., determined in step 3640) above at least one other semantic sub-key (e.g., of the plurality of sets of semantic sub-keys). For example, with reference to FIG. 35, step 3670 may involve ranking or ordering Semantic Sub-Key B (e.g., given that it was determined to be included in each set of semantic sub-keys of the plurality of sets of semantic sub-keys in step 3640) above at least one other semantic sub-key (e.g., Semantic Sub-Key A, Semantic Sub-Key C, and Semantic Sub-Key D). In one embodiment, step 3670 may be performed by a ranking component (e.g., 360) in one embodiment.

As shown in FIG. 36, step 3680 involves outputting, for presentation, data associated with an ordering (or ranking) of the at least one semantic sub-key above the at least one other semantic sub-key. The data may be generated and output in step 3680 for presentation by a graphical data generator (e.g., 370 as search results output for presentation 375) in one embodiment. In one embodiment, the data may be generated and/or output in step 3680 responsive to a system-generated input (e.g., 377 accessed by graphical data generator 370). In one embodiment, the data may be generated and/or output in step 3680 responsive to a user input (e.g., 377 input via a graphical user interface and accessed by graphical data generator 370). And in one embodiment, step 3680 may be performed in accordance with step 280 of FIG. 2, step 430 of FIG. 4, step 2080 of FIG. 20, step 2880 of FIG. 28, some combination thereof, etc.

In one embodiment, one or more steps of process 3600 may be performed in parallel. For example, step 3650 may be performed in parallel with step 3670 and/or step 3680 in one embodiment. As another example, step 3660 may be performed in parallel with step 3670 and/or step 3680 in one embodiment. As yet another example, step 3670 may be performed in parallel with step 3650 and/or step 3660 in one embodiment. And as a further example, step 3680 may be performed in parallel with step 3650 and/or step 3660 in one embodiment. And in other embodiments, other steps of process 3600 may be performed in parallel.

Although process 3600 is depicted in FIG. 36 with a specific number of steps, it should be appreciated that process 3600 may include a different number of steps in other embodiments. Although process 3600 is depicted in FIG. 36 with a specific ordering of steps, it should be appreciated that process 3600 may include a different ordering of steps in other embodiments.

Ordering of Semantic Sub-Keys

Figure 37:
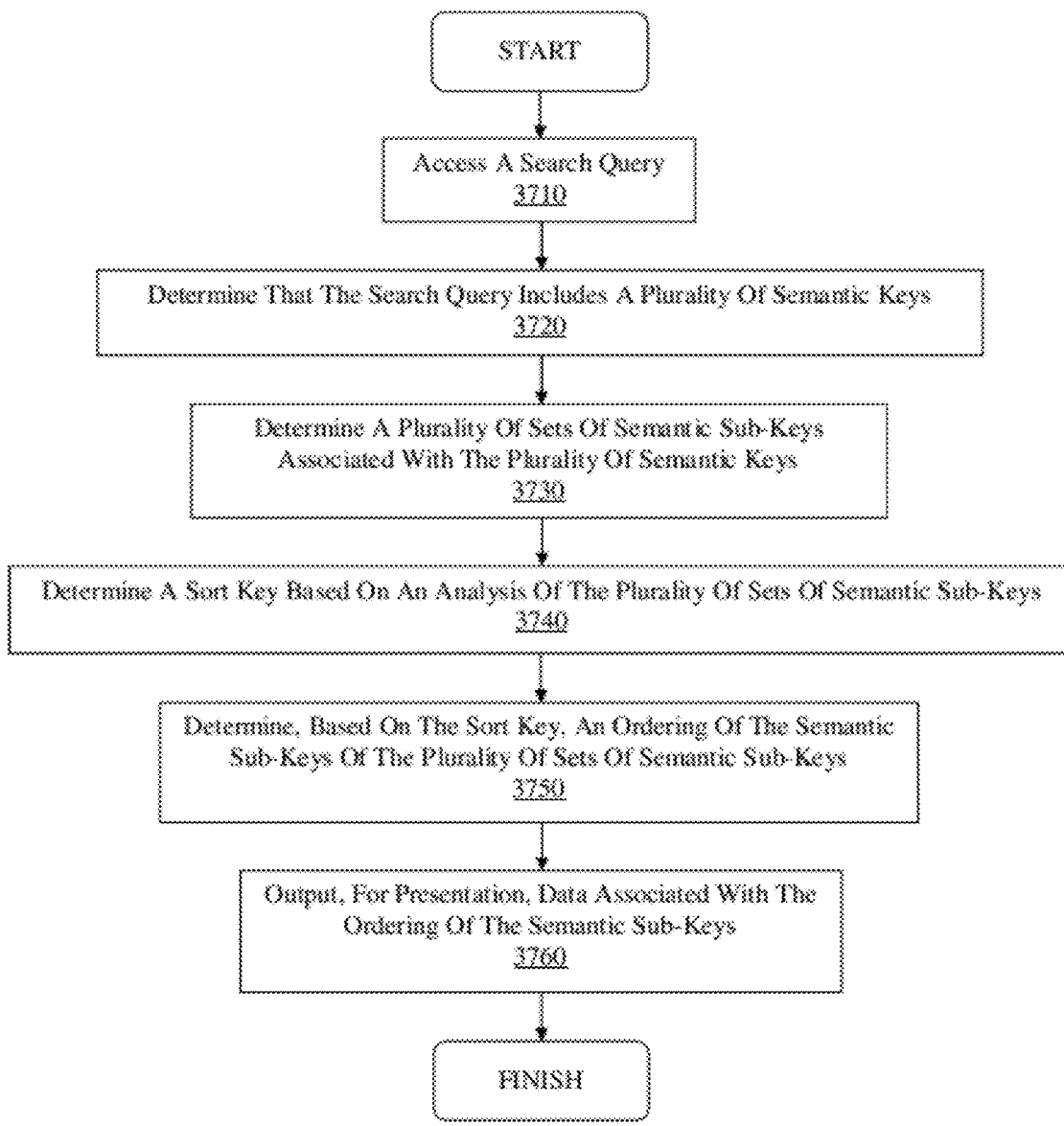
FIG. 37 shows a flowchart of an computer-implemented process for determining an ordering in accordance with one embodiment of the present invention.

FIG. 37 shows a flowchart of computer-implemented process 3700 for determining an ordering in accordance with one embodiment of the present invention. As shown in FIG. 37, step 3710 involves accessing a search query. The search query (e.g., 3010) may be accessed in step 3710 by a search query processor (e.g., 3030) in one embodiment.

Step 3720 involves determining that the search query (e.g., 3010) includes a plurality of semantic keys (e.g., 2234, etc.). For example, where the search query accessed in step 3710 includes the words "fruit price," step 3720 may involve determining that that the search query includes two semantic keys: "fruit" and "price." In one embodiment, at least one semantic key of the plurality of semantic keys (e.g., determined in step 3720) may include a plurality of words.

Step 3720 may be performed by a search query processor (e.g., 3030) in one embodiment. In one embodiment, step 3720 may involve determining that the search query (e.g., 3010) includes a plurality of semantic keys by indexing or otherwise using a semantic key database (e.g., 342). For example, a semantic key database (e.g., 342) may be indexed using at least a portion of the search query to access or retrieve at least one semantic key of the plurality of semantic keys.

As shown in FIG. 37, step 3730 involves determining a plurality of sets of semantic sub-keys associated with the plurality of semantic keys. Step 3730 may be performed by a semantic key processor (e.g., 340) in one embodiment. In one embodiment, step 3730 may involve determining a plurality of sets of semantic sub-keys associated with the plurality of semantic keys by indexing a semantic key database (e.g., 342) using the plurality of semantic keys to access or retrieve the plurality of sets of semantic sub-keys. And in one embodiment, step 3730 may involve generating and/or accessing data structure 3800 of FIG. 38.

FIG. 38 shows exemplary data structure 3800 including a plurality of sets of semantic sub-keys associated with semantic keys in accordance with one embodiment of the present invention. In one embodiment, data structure 3800 may be stored in and/or accessed from a memory of or coupled to semantic key processor 340.

As shown in FIG. 38, the left column of data structure 3800 may include a first set of semantic sub-keys (e.g., associated with the semantic key "fruit" of the search query accessed in step 3710). The right column of data structure 3800 may include a second set of semantic sub-keys (e.g., associated with the semantic key "price" of the search query accessed in step 3710).

In one embodiment, each row of data structure 3800 may include related semantic sub-keys from the plurality of sets of semantic sub-keys. For example, the semantic sub-key "apples" (e.g., in the first row of Semantic Sub-Key Set 1) may be related to the semantic sub-key "$2.99" (e.g., in the first row of Semantic Sub-Key Set 2). As another example, the semantic sub-key "oranges" (e.g., in the third row of Semantic Sub-Key Set 1) may be related to the semantic sub-key "$0.99" (e.g., in the third row of Semantic Sub-Key Set 2).

In one embodiment, semantic sub-keys may be determined to be related if at least one respective instance of each of the semantic sub-keys occurs in the same document. In one embodiment, semantic sub-keys may be determined to be related if at least one respective instance of each of the semantic sub-keys occurs in the same portion of a document. And in one embodiment, semantic sub-keys may be determined to be related if at least one respective instance of each of the semantic sub-keys occurs within a predetermined proximity of one another (e.g., within a predetermined number of words, a predetermined number of lines, a predetermined number of paragraphs, etc.) in a document.

Although FIG. 38 depicts data structure 3800 with a certain amount and type of data, it should be appreciated that data structure 3800 may include a different amount and/or type of data in other embodiments. Additionally, although FIG. 38 depicts data structure 3800 with a certain arrangement of data, it should be appreciated that data structure 3800 may include a different arrangement of data in other embodiments.

Turning back to FIG. 37, step 3730 may involve determining a first set of semantic sub-keys (e.g., Semantic Sub-Key Set 1 as depicted in FIG. 38) associated with a first semantic key (e.g., the semantic key "fruit" of the search query accessed in step 3710). Step 3730 may also involve determining a second set of semantic sub-keys (e.g., Semantic Sub-Key Set 2 as depicted in FIG. 38) associated with a second semantic key (e.g., the semantic key "price" of the search query accessed in step 3710).

As shown in FIG. 37, step 3740 involves determining a sort key based on an analysis of the plurality of sets of semantic sub-keys. In one embodiment, step 3740 may involve selecting a set of semantic sub-keys with the fewest members as the sort key in one embodiment. For example, since Semantic Sub-Key Set 1 of FIG. 38 includes 4 different members while Semantic Sub-Key Set 2 includes 6 different members, Semantic Sub-Key Set 1 may be selected as the sort key in step 3740 since it has fewer members than Semantic Sub-Key Set 2.

In one embodiment, step 3740 may involve selecting a set of semantic sub-keys including only words as the sort key. For example, since Semantic Sub-Key Set 1 of FIG. 38 includes only words while Semantic Sub-Key Set 2 includes no words (only numbers and symbols), Semantic Sub-Key Set 1 may be selected as the sort key in step 3740.

Step 3740 may involve selecting a set of semantic sub-keys including only numbers or symbols as the sort key in one embodiment. For example, since Semantic Sub-Key Set 2 of FIG. 38 includes only numbers or symbols while Semantic Sub-Key Set 2 includes no numbers or symbols (only words), Semantic Sub-Key Set 2 may be selected as the sort key in step 3740.

In one embodiment, step 3740 may involve selecting data associated with at least one of the plurality of sets of semantic sub-keys as the sort key. For example, step 3740 may involve selecting statistical parameters associated with the plurality of sets of semantic sub-keys as the sort key. In one embodiment, the statistical parameters may be associated with a quantity or percentage of search results including at least one respective instance of one or more semantic sub-keys (e.g., of data structure 3800). And in one embodiment, the statistical parameters may be associated with or displayed in a region (e.g., 2730) of a graphical user interface (e.g., GUI 2700).

As shown in FIG. 37, step 3750 involves determining, based on the sort key, an ordering of semantic sub-keys of the plurality of sets of semantic sub-keys. In one embodiment, the ordering determined in step 3750 may involve an alphabetical ordering (e.g., ascending or descending) of sort key data (e.g., a set of semantic sub-keys selected as the sort key, statistical parameters selected as the sort key, other data selected as the sort key, etc.), a numerical ordering (e.g., ascending or descending) of sort key data, some other ordering, etc. The ordering determined in step 3750 may also involve ordering data associated with the sort key data (e.g., at least one set of semantic sub-keys separate from the sort key data, at least one set of statistical parameters separate from the sort key data, other data separate from the sort key data, etc.) in accordance with the ordering of the sort key data. And in one embodiment, step 3750 may involve generating and/or accessing a data structure (e.g., 3900A of FIG. 39A, 3900B of FIG. 39B, 3900C of FIG. 39C, etc.).

FIG. 39A shows exemplary data structure 3900A depicting a first ordering of data in accordance with one embodiment of the present invention. In one embodiment, data structure 3900A may be stored in a memory of, or coupled to, semantic key processor 340 and/or ranking component 360.

As shown in FIG. 39A, the data of data structure 3900A may be sorted or ordered based on an ordering of the sort key data of the left column (e.g., corresponding to the Semantic Sub-Key Set 1 of FIG. 38). For example, the sort key data (e.g., in the left column) may be sorted or ordered alphabetically. The data associated with the sort key data in the middle column (e.g., corresponding to the Semantic Sub-Key Set 2 of FIG. 38) and the right column (e.g., including statistical parameters associated with the middle column and/or the left column) may then be sorted in accordance with the ordering of the sort key data.

Each row of data structure 3900A may include related data in one embodiment. For example, at least one respective instance of each of the semantic sub-keys of the left and middle columns within a given row may occur within the same document, the same portion of a document, within a predetermined proximity from one another, etc. As another example, each of the statistical parameters in the right column may be associated with a respective quantity or percentage of search results including at least one instance of at least one corresponding semantic sub-key (e.g., of the left column and/or the middle column).

Data structure 3900A may be generated by consolidating or combining data from another data structure (e.g., 3800) in one embodiment. For example, where two or more rows of data structure 3800 include identical data (e.g., the fifth and sixth rows that include the semantic sub-keys "grapes" and "$3.99"), the data from the two or more rows may be consolidated or combined to form the row in data structure 3900A including the same data (e.g., the fourth row of data structure 3900A including the semantic sub-keys "grapes" and "$3.99" as well as the statistical parameter "20%").

In one embodiment, data structure 3900A may be generated by consolidating or combining data associated with another data structure (e.g., 3800). For example, where two or more rows of data structure 3800 include identical data (e.g., the fifth and sixth rows that include the semantic sub-keys "grapes" and "$3.99"), data associated with the data from the two or more rows (e.g., the statistical parameters corresponding to the two or more rows) may be consolidated or combined to form data in data structure 3900A. In this case, the statistical parameter of "20%" (e.g., in the fourth row of data structure 3900A) may be calculated or generated by adding the respective statistical parameters associated with each row of data within data structure 3800 which is also consolidated or combined. Although not shown in FIG. 38, the respective statistical parameters associated with each of the fifth and sixth rows of data structure 3800 (e.g., including the semantic sub-keys "grapes" and "$3.99") may be any combination of values adding to 20 percent (e.g., 10 percent and 10 percent to provide the statistical parameter of "20%" shown in fourth row of data structure 3900A, 5 percent and 15 percent to provide the statistical parameter of "20%" shown in fourth row of data structure 3900A, etc.).

FIG. 39B shows exemplary data structure 3900B depicting a second ordering of data in accordance with one embodiment of the present invention. In one embodiment, data structure 3900B may be stored in a memory of, or coupled to, semantic key processor 340 and/or ranking component 360.

As shown in FIG. 39B, the data of data structure 3900B may be sorted or ordered based on an ordering of the sort key data of the middle column (e.g., corresponding to the Semantic Sub-Key Set 2 of FIG. 38). For example, the sort key data (e.g., in the middle column) may be sorted or ordered numerically. The data associated with the sort key data in the left column (e.g., corresponding to the Semantic Sub-Key Set 1 of FIG. 38) and the right column (e.g., including statistical parameters associated with the middle column and/or the left column) may then be sorted in accordance with the ordering of the sort key data.

Each row of data structure 3900B may include related data in one embodiment. For example, at least one respective instance of each of the semantic sub-keys of the left and middle columns within a given row may occur within the same document, the same portion of a document, within a predetermined proximity from one another, etc. As another example, each of the statistical parameters in the right column may be associated with a respective quantity or percentage of search results including at least one instance of at least one corresponding semantic sub-key (e.g., of the left column and/or the middle column).

Data structure 3900B may be generated by consolidating or combining data from another data structure (e.g., 3800) in one embodiment. For example, where two or more rows of data structure 3800 include identical data (e.g., the fifth and sixth rows that include the semantic sub-keys "grapes" and "$3.99"), the data from the two or more rows may be consolidated or combined to form the row in data structure 3900B including the same data (e.g., the fifth row of data structure 3900B including the semantic sub-keys "grapes" and "$3.99" as well as the statistical parameter "20%").

In one embodiment, data structure 3900B may be generated by consolidating or combining data associated with another data structure (e.g., 3800). For example, where two or more rows of data structure 3800 include identical data (e.g., the fifth and sixth rows that include the semantic sub-keys "grapes" and "$3.99"), data associated with the data from the two or more rows (e.g., the statistical parameters corresponding to the two or more rows) may be consolidated or combined to form data in data structure 3900B. In this case, the statistical parameter of "20%" (e.g., in the fifth row of data structure 3900B) may be calculated or generated by adding the respective statistical parameters associated with each row of data within data structure 3800 which is also consolidated or combined. Although not shown in FIG. 38, the respective statistical parameters associated with each of the fifth and sixth rows of data structure 3800 (e.g., including the semantic sub-keys "grapes" and "$3.99") may be any combination of values adding to 20 percent (e.g., 10 percent and 10 percent to provide the statistical parameter of "20%" shown in fifth row of data structure 3900B, 5 percent and 15 percent to provide the statistical parameter of "20%" shown in fifth row of data structure 3900B, etc.).

FIG. 39C shows exemplary data structure 3900C depicting a third ordering of data in accordance with one embodiment of the present invention. In one embodiment, data structure 3900C may be stored in a memory of, or coupled to, semantic key processor 340 and/or ranking component 360.

As shown in FIG. 39C, the data of data structure 3900C may be sorted or ordered based on an ordering of the data of the right column (e.g., including statistical parameters associated with the Semantic Sub-Key Set 1 of FIG. 38 and/or the Semantic Sub-Key Set 2 of FIG. 38). For example, the sort key data (e.g., in the right column) may be sorted or ordered numerically. The data associated with the sort key data in the left column (e.g., corresponding to the Semantic Sub-Key Set 1 of FIG. 38) and the middle column (e.g., corresponding to the Semantic Sub-Key Set 2 of FIG. 38) may then be sorted in accordance with the ordering of the sort key data.

Each row of data structure 3900C may include related data in one embodiment. For example, at least one respective instance of each of the semantic sub-keys of the left and middle columns within a given row may occur within the same document, the same portion of a document, within a predetermined proximity from one another, etc. As another example, each of the statistical parameters in the right column may be associated with a respective quantity or percentage of search results including at least one instance of at least one corresponding semantic sub-key (e.g., of the left column and/or the middle column).

Data structure 3900C may be generated by consolidating or combining data from another data structure (e.g., 3800) in one embodiment. For example, where two or more rows of data structure 3800 include identical data (e.g., the fifth and sixth rows that include the semantic sub-keys "grapes" and "$3.99"), the data from the two or more rows may be consolidated or combined to form the row in data structure 3900C including the same data (e.g., the fourth row of data structure 3900C including the semantic sub-keys "grapes" and "$3.99" as well as the statistical parameter "20%").

In one embodiment, data structure 3900C may be generated by consolidating or combining data associated with another data structure (e.g., 3800). For example, where two or more rows of data structure 3800 include identical data (e.g., the fifth and sixth rows that include the semantic sub-keys "grapes" and "$3.99"), data associated with the data from the two or more rows (e.g., the statistical parameters corresponding to the two or more rows) may be consolidated or combined to form data in data structure 3900C. In this case, the statistical parameter of "20%" (e.g., in the fourth row of data structure 3900C) may be calculated or generated by adding the respective statistical parameters associated with each row of data within data structure 3800 which is also consolidated or combined. Although not shown in FIG. 38, the respective statistical parameters associated with each of the fifth and sixth rows of data structure 3800 (e.g., including the semantic sub-keys "grapes" and "$3.99") may be any combination of values adding to 20 percent (e.g., 10 percent and 10 percent to provide the statistical parameter of "20%" shown in fourth row of data structure 3900C, 5 percent and 15 percent to provide the statistical parameter of "20%" shown in fourth row of data structure 3900C, etc.).

Although FIG. 39A depicts data structure 3900A with a certain amount and type of data, it should be appreciated that data structure 3900A may include a different amount and/or type of data in other embodiments. For example, data structure 3900A may include a different number of rows and/or columns in other embodiments. As another example, data structure 3900A may include data associated with a different number of semantic sub-key sets and/or statistical parameters in other embodiments. As yet another example, data of data structure 3900A may be associated with different units (e.g., the middle column may be represented or otherwise associated with a different currency, the right column may be represented or otherwise associated with quantities instead of percentages, etc.) in other embodiments. Additionally, although FIG. 39A depicts data structure 3900A with a certain arrangement of data, it should be appreciated that data structure 3900A may include a different arrangement of data in other embodiments. For example, sort key data (and other data associated with the sort key data) may be ordered in an ascending order, descending order, etc.

Although FIG. 39B depicts data structure 3900B with a certain amount and type of data, it should be appreciated that data structure 3900B may include a different amount and/or type of data in other embodiments. For example, data structure 3900B may include a different number of rows and/or columns in other embodiments. As another example, data structure 3900B may include data associated with a different number of semantic sub-key sets and/or statistical parameters in other embodiments. As yet another example, data of data structure 3900B may be associated with different units (e.g., the middle column may be represented or otherwise associated with a different currency, the right column may be represented or otherwise associated with quantities instead of percentages, etc.) in other embodiments. Additionally, although FIG. 39B depicts data structure 3900B with a certain arrangement of data, it should be appreciated that data structure 3900B may include a different arrangement of data in other embodiments. For example, sort key data (and other data associated with the sort key data) may be ordered in an ascending order, descending order, etc.

Although FIG. 39C depicts data structure 3900C with a certain amount and type of data, it should be appreciated that data structure 3900C may include a different amount and/or type of data in other embodiments. For example, data structure 3900C may include a different number of rows and/or columns in other embodiments. As another example, data structure 3900C may include data associated with a different number of semantic sub-key sets and/or statistical parameters in other embodiments. As yet another example, data of data structure 3900C may be associated with different units (e.g., the middle column may be represented or otherwise associated with a different currency, the right column may be represented or otherwise associated with quantities instead of percentages, etc.) in other embodiments. Additionally, although FIG. 39C depicts data structure 3900C with a certain arrangement of data, it should be appreciated that data structure 3900C may include a different arrangement of data in other embodiments. For example, sort key data (and other data associated with the sort key data) may be ordered in an ascending order, descending order, etc.

Turning back to FIG. 37, step 3760 involves outputting, for presentation, data associated with the ordering of the semantic sub-keys (e.g., determined in step 3750). Accordingly, where the ordering of semantic sub-keys is output for presentation (e.g., via a graphical user interface along with associated search results that include at least one instance of the semantic sub-keys), the information may be presented in a manner that is easier to understand and interact with.

Step 3760 may involve generating and outputting data to cause at least a portion of a data structure (e.g., 3800, 3900A, 3900B, 3900C, etc.) to be presented using a region (e.g. 2730) of a graphical user interface (e.g., GUI 2700) in one embodiment. The graphical user interface (e.g., 2700) may be configured to contemporaneously display the at least a portion of a data structure (e.g., 3800, 3900A, 3900B, 3900C, etc.) contemporaneously with search results associated therewith (e.g., in region 2710 of GUI 2700). And in one embodiment, the data may be generated and output in step 3760 for presentation by a graphical data generator (e.g., 370 as search results output for presentation 375).

In one embodiment, a user interaction with or selection of a semantic sub-key (e.g., of or associated with a data structure such as data structure 3800, data structure 3900A, data structure 3900B, data structure 3900C, etc.) presented in the region (e.g., 2730) of the graphical user interface (e.g., 2700) may cause a new search to be performed (e.g., based on a new search query generated by modifying the previous search query to include the selected semantic sub-key), where search results generated responsive to the new search may be displayed in another region (e.g., 2710) of the graphical user interface (e.g., 2700). In one embodiment, the data presented in the region (e.g., 2730) may be updated based on the search results generated responsive to the new search (e.g., to include at least one new or different semantic sub-key associated with the new search results, to include at least one new or different statistical parameter associated with the new search results, etc.).

The data may be generated and/or output in step 3760 responsive to a system-generated input (e.g., 377 accessed by graphical data generator 370) in one embodiment. In one embodiment, the data may be generated and/or output in step 3760 responsive to a user input (e.g., 377 input via a graphical user interface and accessed by graphical data generator 370). And in one embodiment, step 3760 may be performed in accordance with step 280 of FIG. 2, step 430 of FIG. 4, step 2080 of FIG. 20, step 2880 of FIG. 28, step 3680 of FIG. 36, some combination thereof, etc.

Although process 3700 is depicted in FIG. 37 with a specific number of steps, it should be appreciated that process 3700 may include a different number of steps in other embodiments. Although process 3700 is depicted in FIG. 37 with a specific ordering of steps, it should be appreciated that process 3700 may include a different ordering of steps in other embodiments.

Ranking Data Utilizing Attributes Associated with Semantic Sub-Keys

Figure 40:
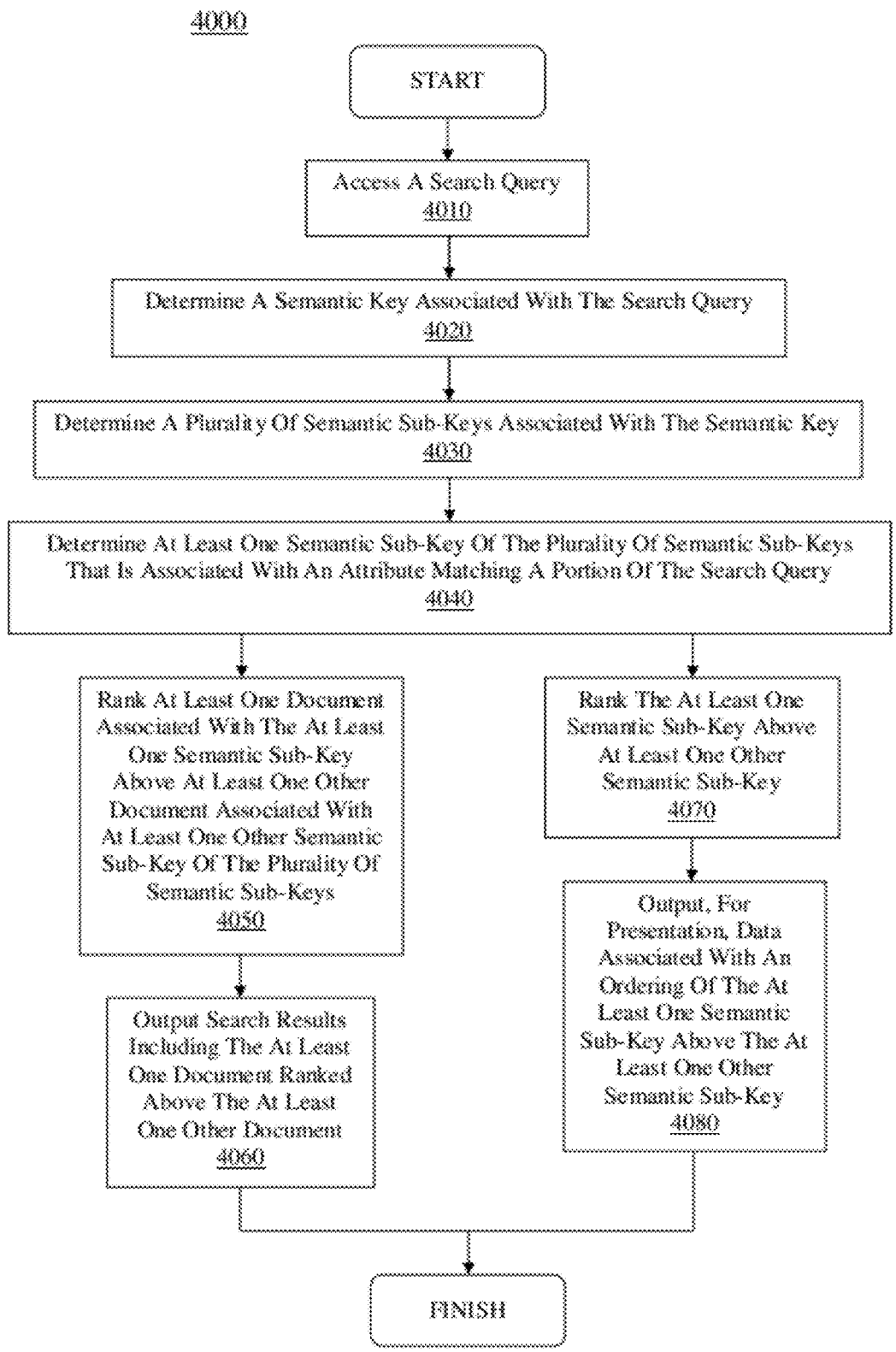
FIG. 40 shows a flowchart of an exemplary computer-implemented process for ranking data using an attribute associated with at least one semantic sub-key in accordance with one embodiment of the present invention.

FIG. 40 shows a flowchart of exemplary computer-implemented process 4000 for ranking data using an attribute associated with at least one semantic sub-key in accordance with one embodiment of the present invention. As shown in FIG. 40, step 4010 involves accessing a search query. In one embodiment, the search query (e.g., 3010) may be accessed in step 4010 by a search query processor (e.g., 3030 of FIG. 30, FIG. 31, FIG. 33, FIG. 34, etc.). In one embodiment, the search query (e.g., 2232, 2932, etc.) may be accessed in step 4010 by a search data processor (e.g., 2230 of FIG. 22, FIG. 29, etc.) as part of search data (e.g., 2210). And in one embodiment, the search query (e.g., 310) may be accessed in step 4010 by a grammatical analyzer (e.g., 330 of FIG. 3, FIG. 15, etc.).

Step 4020 involves determining a semantic key associated with the search query (e.g., accessed in step 4010). In one embodiment, step 4020 may involve determining (e.g., using a search query processor such as search query processor 3030 of FIG. 30, FIG. 31, FIG. 33, FIG. 34, etc.) that a portion of the search query includes the semantic key (e.g., in accordance with step 3210 of process 3200). In one embodiment, step 4020 may involve accessing (e.g., using a search data processor such as search data processor 2230 of FIG. 22, FIG. 29, etc.) the semantic key from search data (e.g., 2210) that includes the search query (e.g., 2232, 2932, etc.), where the semantic key may be input separately (e.g., by a user) from the search query (e.g., the semantic key and the search query are included in separate portions of the search data). And in one embodiment, step 4020 may involve determining (e.g., using a grammatical analyzer such as grammatical analyzer 330 of FIG. 3, FIG. 15, etc.) the semantic key based on the search query (e.g., in accordance with steps 220 and 230 of process 200), where the search query may be free of the semantic key.

As shown in FIG. 40, step 4030 involves determining a plurality of semantic sub-keys associated with the semantic key (e.g., determined in step 4020). Step 4030 may be performed by a semantic key processor (e.g., 340) in one embodiment. In one embodiment, step 4030 may involve determining a plurality of semantic sub-keys associated with the semantic key by indexing a semantic key database (e.g., 342) using the semantic key to access or retrieve the plurality of semantic sub-keys. And in one embodiment, each semantic sub-key of the plurality of semantic sub-keys may be associated with at least one respective attribute (e.g., as shown in FIG. 41).

FIG. 41 shows exemplary data structure 4100 including at least one attribute associated with at least one semantic sub-key in accordance with one embodiment of the present invention. In one embodiment, data structure 4100 may be stored in a semantic key database (e.g., 342).

As shown in FIG. 41, the middle column of data structure 4100 may include a plurality of semantic sub-keys associated with at least one semantic key in the left column (e.g., the semantic key "river"). Each semantic sub-key of the plurality of semantic sub-keys (e.g., in the middle column of data structure 4100) may be associated with at least one respective attribute (e.g., in the right column of data structure 4100).

Turning back to FIG. 40, step 4040 involves determining at least one semantic sub-key of the plurality of semantic sub-keys (e.g., determined in step 4130) that is associated with an attribute matching a portion of the search query. In one embodiment, the at least one semantic sub-key may be determined by indexing a database (e.g. that includes data structure 4100) and/or data structure (e.g., 4100) using the portion of the search query to access or retrieve the at least one semantic sub-key. For example, where the search query (e.g., accessed in step 4010) includes the words "asian river" and it is determined that "river" is a semantic key (e.g., in step 4020), data structure 4100 (or a database including data structure 4100) may be indexed using the word "asian" (e.g., a portion of the search query free of a semantic key, a portion of the search query that is separate from the portion of the search query including or associated with the semantic key "river," etc.) to access or retrieve the semantic sub-keys of "Yangtze River," Yellow River," and "Mekong River" (e.g., associated with the semantic key "river" determined in step 4020) that are each associated with a respective attribute (e.g., the attribute "Asian") matching a portion of the search query (e.g., the word "asian").

Accordingly, by utilizing attributes associated with semantic sub-keys, at least one semantic sub-key may be determined in step 4040 that is more relevant to the search query (e.g., accessed in step 4010) than at least one other semantic sub-key. For example, the semantic sub-keys "Yangtze River," Yellow River," and "Mekong River" of data structure 4100 may be more relevant to the search query "asian river" than the other semantic sub-keys of data structure 4100 (e.g., given that the other semantic sub-keys are associated with rivers located on continents other than Asia, and therefore, are not typically considered asian rivers).

Responsive to performing step 4040, process 4000 may proceed to step 4050 and/or to step 4070. As shown in FIG. 40, step 4050 involves ranking at least one document associated with the at least one semantic sub-key (e.g., determined in step 4040) above at least one other document associated with at least one other semantic sub-key of the plurality of semantic sub-keys (e.g., determined in step 4030). For example, with reference to FIG. 41, step 4050 may involve ranking at least one document including at least one instance of the at least one semantic sub-key (e.g., determined in step 4040 such as "Yangtze River," Yellow River," and "Mekong River") above at least one other document that does not include at least one instance of the at least one semantic sub-key and/or includes at least one instance of at least one other semantic sub-key (e.g., "Nile River," "Amazon River," "Mississippi River," "Yenisei River," etc.). In one embodiment, step 4050 may be performed by a ranking component (e.g., 360).

The at least one document and the at least one other document may be associated with search results (e.g., 322, 355, 2955, etc.) generated responsive to a search performed based on the search query (e.g., accessed in step 4010, etc.). In one embodiment, each document of the at least one document and the at least one other document may be selected from a group consisting of a webpage, an electronic document, an electronic file, and advertising content.

Accordingly, ranking of documents associated with search results may be improved by utilizing attributes of semantic sub-keys. For example, where attributes of semantic sub-keys are used to determine at least one semantic sub-key (e.g., in step 4040 such as "Yangtze River," Yellow River," and "Mekong River") that is more relevant to the search query (e.g., accessed in step 4010 such as "asian river") than at least one other semantic sub-key (e.g., given that the other semantic sub-keys are associated with rivers located on continents other than Asia, and therefore, are not typically considered asian rivers), at least one document that includes at least one instance of one or more of the at least one semantic sub-key (e.g., "Yangtze River," Yellow River," and "Mekong River") may be ranked in step 4050 above at least one other document that does not include at least one instance of the at least one semantic sub-key. In this manner, at least one document that is more relevant to the search query may be ranked above at least one other document that is less relevant to the search query.

As shown in FIG. 40, step 4060 involves outputting search results including the at least one document ranked above the at least one other document. The search results may be generated and output in step 4060 (e.g., by graphical data generator 370) for presentation (e.g., as search results output for presentation 375) in one embodiment. In one embodiment, the search results may be generated and/or output in step 4060 responsive to a system-generated input (e.g., 377 accessed by graphical data generator 370). In one embodiment, the search results may be generated and/or output in step 4060 responsive to a user input (e.g., 377 input via a graphical user interface and accessed by graphical data generator 370). And in one embodiment, step 4060 may be performed in accordance with step 280 of FIG. 2, step 430 of FIG. 4, step 2080 of FIG. 20, step 2880 of FIG. 28, some combination thereof, etc.

Step 4070 involves ranking the at least one semantic sub-key (e.g., determined in step 4040) above at least one other semantic sub-key (e.g., of the plurality of semantic sub-keys determined in step 4030). For example, with reference to FIG. 41, step 4070 may involve ranking or ordering the semantic sub-keys "Yangtze River," Yellow River," and "Mekong River" above at least one other semantic sub-key (e.g., "Nile River," "Amazon River," "Mississippi River," "Yenisei River," etc.). In one embodiment, step 4070 may be performed by a ranking component (e.g., 360) in one embodiment.

Accordingly, ranking of semantic sub-keys may be improved by utilizing attributes of the semantic sub-keys. For example, where attributes of semantic sub-keys are used to determine at least one semantic sub-key (e.g., in step 4040 such as "Yangtze River," Yellow River," and "Mekong River") that is more relevant to the search query (e.g., accessed in step 4010 such as "asian river") than at least one other semantic sub-key (e.g., given that the other semantic sub-keys are associated with rivers located on continents other than Asia, and therefore, are not typically considered asian rivers), step 4070 may be used to rank one or more of the at least one semantic sub-key that is more relevant to the search query above at least one other semantic sub-key that is less relevant to the search query.

As shown in FIG. 40, step 4080 involves outputting, for presentation, data associated with an ordering (or ranking) of the at least one semantic sub-key above the at least one other semantic sub-key. The data may be generated and output in step 4080 for presentation by a graphical data generator (e.g., 370 as search results output for presentation 375) in one embodiment. In one embodiment, the data may be generated and/or output in step 4080 responsive to a system-generated input (e.g., 377 accessed by graphical data generator 370). In one embodiment, the data may be generated and/or output in step 4080 responsive to a user input (e.g., 377 input via a graphical user interface and accessed by graphical data generator 370). And in one embodiment, step 4080 may be performed in accordance with step 280 of FIG. 2, step 430 of FIG. 4, step 2080 of FIG. 20, step 2880 of FIG. 28, some combination thereof, etc.

In one embodiment, one or more steps of process 4000 may be performed in parallel. For example, step 4050 may be performed in parallel with step 4070 and/or step 4080 in one embodiment. As another example, step 4060 may be performed in parallel with step 4070 and/or step 4080 in one embodiment. As yet another example, step 4070 may be performed in parallel with step 4050 and/or step 4060 in one embodiment. And as a further example, step 4080 may be performed in parallel with step 4050 and/or step 4060 in one embodiment. And in other embodiments, other steps of process 4000 may be performed in parallel.

Although process 4000 is depicted in FIG. 40 with a specific number of steps, it should be appreciated that process 4000 may include a different number of steps in other embodiments. For example, step 4030 may be optional and not performed in one embodiment. Although process 4000 is depicted in FIG. 40 with a specific ordering of steps, it should be appreciated that process 4000 may include a different ordering of steps in other embodiments.

Although FIG. 41 depicts data structure 4100 with a certain amount and type of data, it should be appreciated that data structure 4100 may include a different amount and/or type of data in other embodiments. For example, data structure 4100 may include a different number and/or type of semantic keys (e.g., in the left column), a different number and/or type of semantic sub-keys (e.g., in the middle column), a different number and/or type of attributes (e.g., in the right column), some combination thereof, etc. As another example, data structure 4100 may include a different number of semantic sub-keys and/or attributes associated with a given semantic key in other embodiments. Additionally, although FIG. 41 depicts data structure 4100 with a certain arrangement of data, it should be appreciated that data structure 4100 may include a different arrangement of data in other embodiments.

Computer System Platform

Figure 42:
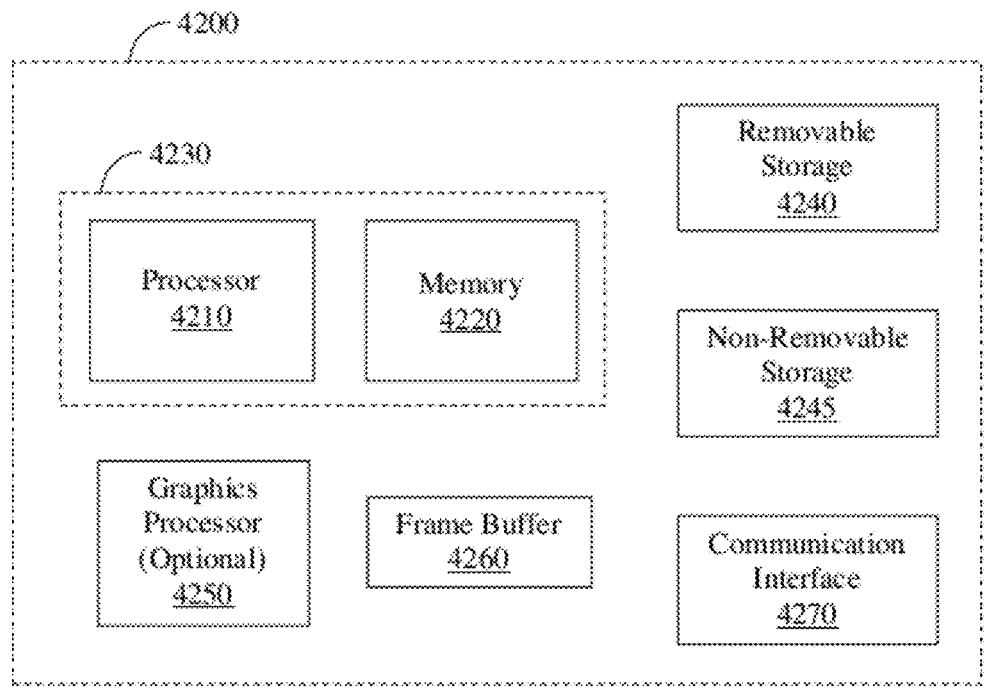
FIG. 42 shows an exemplary computer system platform upon which embodiments of the present invention may be implemented.

FIG. 42 shows exemplary computer system platform 4200 upon which embodiments of the present invention may be implemented. As shown in FIG. 42, portions of the present invention may be implemented by execution of computer-readable instructions or computer-executable instructions that may reside in components of computer system platform 4200 and which may be used as a part of a general purpose computer network. It is appreciated that computer system platform 4200 of FIG. 42 is merely exemplary. As such, the present invention can operate within a number of different systems including, but not limited to, general-purpose computer systems, embedded computer systems, laptop computer systems, hand-held computer systems, portable computer systems, or stand-alone computer systems.

In one embodiment, computer system platform 4200 may be used to implement server 110, computer system 120a, computer system 120b, some combination thereof, etc. And in one embodiment, one or more components of computer system platform 4200 may be disposed in and/or coupled with a housing or enclosure.

In one embodiment, depicted by dashed lines 4230, computer system platform 4200 may include at least one processor 4210 and at least one memory 4220. Processor 4210 may include a central processing unit (CPU) or other type of processor. Depending on the configuration and/or type of computer system environment, memory 4220 may include volatile memory (e.g., RAM), non-volatile memory (e.g., ROM, flash memory, etc.), or some combination of the two. Additionally, memory 4220 may be removable, non-removable, etc.

In other embodiments, computer system platform 4200 may include additional storage (e.g., removable storage 4240, non-removable storage 4245, etc.). Removable storage 4240 and/or non-removable storage 4245 may include volatile memory, non-volatile memory, or any combination thereof. Additionally, removable storage 4240 and/or non-removable storage 4245 may include CD-ROM, digital versatile disks (DVD) or other optical storage, magnetic cassettes, magnetic tape, magnetic disk storage or other magnetic storage devices, or any other medium which can be used to store information for access by computer system platform 4200.

As shown in FIG. 42, computer system platform 4200 may communicate with other systems, components, or devices via communication interface 4270. Communication interface 4270 may embody computer-readable instructions, data structures, program modules or other data in a modulated data signal (e.g., a carrier wave) or other transport mechanism. By way of example, and not limitation, communication interface 4270 may couple to wired media (e.g., a wired network, direct-wired connection, etc.) and/or wireless media (e.g., a wireless network, a wireless connection utilizing acoustic, radio frequency (RF), infrared, or other wireless signaling, etc.).

Communication interface 4270 may also couple computer system platform 4200 to one or more input devices (e.g., a keyboard, mouse, pen, voice input device, touch input device or touch screen, etc.). In one embodiment, communication interface 4270 may couple computer system platform 4200 to one or more output devices (e.g., a display, speaker, printer, etc.).

As shown in FIG. 42, graphics processor 4250 may perform graphics processing operations on graphical data stored in frame buffer 4260 or another memory (e.g., 4220, 4240, 4245, etc.) of computer system platform 4200. Graphical data stored in frame buffer 4260 may be accessed, processed, and/or modified by components (e.g., graphics processor 4250, processor 4210, etc.) of computer system platform 4200 and/or components of other systems/devices. Additionally, the graphical data may be accessed (e.g., by graphics processor 4250) and displayed on an output device coupled to computer system platform 4200. In one embodiment, memory 4220, removable storage 4240, non-removable storage 4245, frame buffer 4260, or a combination thereof, may be a computer-readable medium or computer-usable medium and may include instructions that when executed by a processor (e.g., 4210, 4250, etc.) implement a method of performing webpage searches (e.g., in accordance with process 200 of FIG. 2), determining a semantic key based upon a focus of a search query (e.g., in accordance with process 400 of FIG. 4), filtering webpage search results (e.g., in accordance with process 700 of FIG. 7A), filtering webpage search results using text generated from keyword search results (e.g., in accordance with process 800 of FIG. 8A), ranking webpage search results in accordance with a semantic sub-key frequency (e.g., in accordance with process 900 of FIG. 9), ranking webpage search results in accordance with a keyword frequency (e.g., in accordance with process 1000 of FIG. 10), ranking webpage search results in accordance with a proximity of semantic sub-keys and search query keywords (e.g., in accordance with process 1100 of FIG. 11), creating a semantic key database (e.g., in accordance with process 1600 of FIG. 16), performing a search (e.g., in accordance with process 2000 of FIG. 20), modifying a search query to further include at least one semantic sub-key (e.g., in accordance with process 2300 of FIG. 23), modifying a search query to further include a semantic key or a portion thereof (e.g., in accordance with process 2500 of FIG. 25), performing a search based on an altered search query (e.g., in accordance with process 2800 of FIG. 28), performing a search based on an automatically-generated search query (e.g., in accordance with process 3200 of FIGS. 32A and 32B), ranking data (e.g., in accordance with process 3600 of FIG. 36), determining an ordering (e.g., in accordance with process 3700 of FIG. 37), ranking data using an attribute associated with at least one semantic sub-key (e.g., in accordance with process 4000 of FIG. 40), some combination thereof, etc.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A computer-implemented method of automated generation of a search query, said method comprising:
   accessing a first search query;
   determining that a first portion of said first search query includes a semantic key, wherein said semantic key is associated with at least one semantic sub-key, and wherein said at least one semantic sub-key is a hyponym of said semantic key;
   responsive to said determining, automatically generating a second search query based on said first search query, wherein said second search query is free of said first portion;
   performing a first search based on said second search query, wherein first search results generated responsive to said first search comprise a plurality of documents, and wherein each document of said plurality of documents includes at least one respective instance of at least one semantic sub-key associated with said semantic key;
   performing a second search based on said first search query; accessing second search results generated responsive to said second search;
   analyzing said first and second search results to automatically determine third search results for output, wherein said third search results are selected from a group consisting of said first search results and said second search results; and
   responsive to a user input, outputting fourth search results, wherein said fourth search results are different from said third search results, and wherein said fourth search results are selected from a group consisting of said first search results and said second search results wherein said analyzing further comprises determining a ratio of a quantity associated with said first search results to a quantity associated with said second search results, and wherein said analyzing further comprises automatically determining said first search results as said third search results for output if said ratio exceeds a predetermined threshold;
   outputting said third search results;
   wherein said analyzing further comprises:
   determining a first score associated with said first search results;

determining a second score associated with said second search results;

determining said first search results as said third search results for output if said first score exceeds said second score; and determining said second search results as said third search results for output if said second score exceeds said first score.

2. The method of claim 1, wherein said determining said first score further comprises determining said first score based on a parameter selected from a group consisting of: a number of instances in said first search results of at least one semantic sub-key associated with said semantic key; a number of instances in said first search results of at least one keyword of said first search query; at least one proximity associated with a plurality of instances in said first search results of at least one semantic sub-key associated with said semantic key; and at least one proximity associated with a plurality of instances in said first search results of at least one keyword of said first search query.

3. The method of claim 1, wherein said determining said second score further comprises determining said second score based on a parameter selected from a group consisting of: a number of instances in said second search results of at least one semantic sub-key associated with said semantic key; a number of instances in said second search results of at least one keyword of said second search query; at least one proximity associated with a plurality of instances in said second search results of at least one semantic sub-key associated with said semantic key; and at least one proximity associated with a plurality of instances in said second search results of at least one keyword of said second search query.

4. The method of claim 1 further comprising:
performing at least one operation using a second portion of said first search query to determine whether to generate said second search query.

5. The method of claim 4, wherein said at least one operation comprises determining whether said first portion and said second portion are associated with a phrase, and wherein said generating is performed responsive to determining that said first portion and said second portion are not associated with said phrase.

6. The method of claim 4, wherein said at least one operation comprises determining whether said second portion is associated with a predetermined part of speech, and wherein said generating is performed responsive to determining that said second portion is associated with said predetermined part of speech.

7. The method of claim 6, wherein said predetermined part of speech is selected from a group consisting of a relative pronoun, an interrogative pronoun, a preposition, and a verb.

8. The method of claim 6, wherein said second search query is free of said first portion and said second portion.

9. A non-transitory computer-readable storage medium having computer-readable program code embodied therein for causing a computer system to perform a method of automated generation of a search query, said method comprising:
accessing a first search query;
determining that a first portion of said first search query includes a semantic key, wherein said semantic key is associated with at least one semantic sub-key, and wherein said at least one semantic sub-key is a hyponym of said semantic key responsive to said determining, automatically generating a second search query based on said first search query, wherein said second search query is free of said first portion; and performing a first search based on said second search query, wherein first search results generated responsive to said first search comprise a plurality of documents, and wherein each document of said plurality of documents includes at least one respective instance of at least one semantic sub-key associated with said semantic key;

performing a second search based on said first search query;

accessing second search results generated responsive to said second search; analyzing said first and second search results to automatically determine third search results for output, wherein said third search results are selected from a group consisting of said first search results and said second search results; and responsive to a user input, outputting fourth search results, wherein said fourth search results are different from said third search results, and wherein said fourth search results are selected from a group consisting of said first search results and said second search results, and wherein said analyzing further comprises determining a ratio of a quantity associated with said first search results to a quantity associated with said second search results, and wherein said analyzing further comprises automatically determining said first search results as said third search results for output if said ratio exceeds a predetermined threshold; and the outputting said third search results; wherein said analyzing further comprises:
determining a first score associated with said first search results;
determining a second score associated with said second search results;
determining said first search results as said third search results for output if said first score exceeds said second score; and
determining said second search results as said third search results for output if said second score exceeds said first score.

10. The computer-readable storage medium of claim 9, wherein said determining said first score further comprises determining said first score based on a parameter selected from a group consisting of: a number of instances in said first search results of at least one semantic sub-key associated with said semantic key; a number of instances in said first search results of at least one keyword of said first search query; at least one proximity associated with a plurality of instances in said first search results of at least one semantic sub-key associated with said semantic key; and at least one proximity associated with a plurality of instances in said first search results of at least one keyword of said first search query.

11. The computer-readable storage medium of claim 9, wherein said determining said second score further comprises determining said second score based on a parameter selected from a group consisting of: a number of instances in said second search results of at least one semantic sub-key associated with said semantic key; a number of instances in said second search results of at least one keyword of said second search query; at least one proximity associated with a plurality of instances in said second search results of at least one semantic sub-key associated with said semantic key; and at least one proximity associated with a plurality of instances in said second search results of at least one keyword of said second search query.

12. A system comprising a processor and a memory, wherein said memory comprises instructions for causing said processor to implement a method of automated generation of a search query, said method comprising:

accessing a first search query;

determining that a first portion of said first search query includes a semantic key, wherein said semantic key is associated with at least one semantic sub-key, and wherein said at least one semantic sub-key is a hyponym of said semantic key responsive to said determining, automatically generating a second search query based on said first search query, wherein said second search query is free of said first portion; and a performing a first search based on said second search query, wherein first search results generated responsive to said first search comprise a plurality of documents, and wherein each document of said plurality of documents includes at least one respective instance of at least one semantic sub-key associated with said semantic key;

performing a second search based on said first search query;

accessing second search results generated responsive to said second search;

analyzing said first and second search results to automatically determine third search results for output, wherein said third search results are selected from a group consisting of said first search results and said second search results;

responsive to a user input, outputting fourth search results, wherein said fourth search results are different from said third search results, and wherein said fourth search results are selected from a group consisting of said first search results and said second search results, and wherein said analyzing further comprises determining a ratio of a quantity associated with said first search results to a quantity associated with said second search results, and wherein said analyzing further comprises automatically determining said first search results as said third search results for output if said ratio exceeds a predetermined threshold; and outputting said third search results; wherein said analyzing further comprises:

determining a first score associated with said first search results;

determining a second score associated with said second search results;

determining said first search results as said third search results for output if said first score exceeds said second score; and determining said second search results as said third search results for output if said second score exceeds said first score.

13. The system of claim 12, wherein said determining said first score further comprises determining said first score based on a parameter selected from a group consisting of: a number of instances in said first search results of at least one semantic sub-key associated with said semantic key; a number of instances in said first search results of at least one keyword of said first search query; at least one proximity associated with a plurality of instances in said first search results of at least one semantic sub-key associated with said semantic key; and at least one proximity associated with a plurality of instances in said first search results of at least one keyword of said first search query.

14. The system of claim 12, wherein said determining said second score further comprises determining said second score based on a parameter selected from a group consisting of: a number of instances in said second search results of at least one semantic sub-key associated with said semantic key; a number of instances in said second search results of at least one keyword of said second search query; at least one proximity associated with a plurality of instances in said second search results of at least one semantic sub-key associated with said semantic key; and at least one proximity associated with a plurality of instances in said second search results of at least one keyword of said second search query.

* * * * *